(12) United States Patent
Auyang et al.

(10) Patent No.: US 11,241,063 B2
(45) Date of Patent: *Feb. 8, 2022

(54) FOOTWEAR STROBEL WITH BLADDER HAVING GROOVED FLANGE AND METHOD OF MANUFACTURING

(71) Applicant: NIKE, Inc., Beaverton, OR (US)

(72) Inventors: Arick Auyang, Portland, OR (US); Derek Houng, Portland, OR (US); Eric A. Schmalzer, Portland, OR (US); Matthew Temple, Beaverton, OR (US); Jeffrey S. To, Portland, OR (US); Geoffrey A. Weston, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 55 days.

This patent is subject to a terminal disclaimer.

(21) Appl. No.: 16/428,002

(22) Filed: May 31, 2019

(65) Prior Publication Data

US 2019/0365039 A1    Dec. 5, 2019

Related U.S. Application Data

(60) Provisional application No. 62/678,722, filed on May 31, 2018.

(51) Int. Cl.
*A43B 9/02* (2006.01)
*A43B 13/20* (2006.01)
(Continued)

(52) U.S. Cl.
CPC ............... *A43B 13/20* (2013.01); *A43B 9/02* (2013.01); *A43B 13/04* (2013.01); *A43B 13/122* (2013.01);
(Continued)

(58) Field of Classification Search
CPC .. A43B 9/02; A43B 9/06; A43B 13/20; A43B 13/38; A43B 13/386; A43B 13/39; A43B 13/40
See application file for complete search history.

(56) References Cited

U.S. PATENT DOCUMENTS 2,677,906 A    5/1954  Reed
3,291,085 A *  12/1966 Levy .................. D05B 93/00
                                                     112/475.09
(Continued)

FOREIGN PATENT DOCUMENTS

CN         1731942 A      2/2006
CN       102202537 A      9/2011
(Continued)

*Primary Examiner* — Sharon M Prange
(74) *Attorney, Agent, or Firm* — Quinn IP Law

(57) ABSTRACT

A strobel for an article of footwear comprises a polymeric bladder that defines an interior cavity. The polymeric bladder is configured to retain a fluid in the interior cavity. The polymeric bladder has a peripheral flange extending around at least a portion of a perimeter of the interior cavity. The peripheral flange defines a groove extending along the peripheral flange. The polymeric bladder may include a first polymeric sheet bonded to a second polymeric sheet at the peripheral flange and joined to the second polymeric sheet at a plurality of interior welds. Methods of manufacturing a strobel and manufacturing footwear are included.

12 Claims, 35 Drawing Sheets

(51) Int. Cl.
  *A43B 13/40* (2006.01)
  *A43B 13/04* (2006.01)
  *A43B 13/12* (2006.01)
  *B29D 35/14* (2010.01)
  *A43B 13/39* (2006.01)
  *A43B 13/28* (2006.01)
  *A43B 23/02* (2006.01)

(52) U.S. Cl.
  CPC .............. *A43B 13/28* (2013.01); *A43B 13/39* (2013.01); *A43B 13/40* (2013.01); *B29D 35/142* (2013.01); *A43B 23/0245* (2013.01)

(56) References Cited

U.S. PATENT DOCUMENTS

| | | | |
|---|---|---|---|
| 3,431,570 A * | 3/1969 | Murphy | A43B 9/06 12/142 D |
| 3,475,836 A * | 11/1969 | Brahm | A43B 17/08 36/3 R |
| 3,593,436 A * | 7/1971 | Vietas | A43B 13/04 36/32 R |
| 4,183,156 A | 1/1980 | Rudy | |
| 4,219,945 A | 9/1980 | Rudy | |
| 4,367,599 A * | 1/1983 | Diamant | A43B 7/1445 36/178 |
| 4,809,447 A | 3/1989 | Pacanowsky et al. | |
| 4,936,029 A | 6/1990 | Rudy | |
| 5,042,176 A | 8/1991 | Rudy | |
| 5,664,343 A | 9/1997 | Byrne | |
| 6,013,340 A | 1/2000 | Bonk et al. | |
| 6,082,025 A | 7/2000 | Bonk et al. | |
| 6,119,371 A | 9/2000 | Goodwin et al. | |
| 6,127,026 A | 10/2000 | Bonk et al. | |
| 6,203,868 B1 | 3/2001 | Bonk et al. | |
| 6,321,465 B1 | 11/2001 | Bonk et al. | |
| 6,463,612 B1 | 10/2002 | Potter | |
| 7,055,267 B2 | 6/2006 | Wilson et al. | |
| 7,244,483 B2 | 7/2007 | Tawney et al. | |
| 7,752,772 B2 | 7/2010 | Hatfield et al. | |
| 8,595,956 B2 | 12/2013 | Byrne | |
| 8,839,530 B2 | 9/2014 | Smith et al. | |
| 9,072,336 B2 | 7/2015 | Borel et al. | |
| 9,119,440 B2 * | 9/2015 | Lagneau | A43B 13/203 |
| 9,380,837 B2 | 7/2016 | Chon et al. | |
| 9,427,043 B2 | 8/2016 | Kodad | |
| 9,445,649 B2 | 9/2016 | Huffa et al. | |
| 9,468,258 B2 | 10/2016 | Ruiz et al. | |
| 9,474,326 B2 | 10/2016 | Langvin | |
| 2003/0163880 A1 | 9/2003 | Keidel et al. | |
| 2004/0049942 A1 | 3/2004 | Chen | |
| 2008/0016717 A1 | 1/2008 | Ruban | |
| 2008/0244934 A1 | 10/2008 | Covatch | |
| 2010/0180466 A1 * | 7/2010 | Ho | A43B 9/10 36/16 |
| 2013/0232818 A1 | 9/2013 | Wiener | |
| 2013/0232825 A1 | 9/2013 | Wiener et al. | |
| 2014/0223768 A1 * | 8/2014 | Berend | A43C 1/00 36/45 |
| 2015/0374070 A1 | 12/2015 | Tawney et al. | |
| 2016/0000187 A1 | 1/2016 | Chon et al. | |
| 2018/0064208 A1 | 3/2018 | Hurd et al. | |
| 2018/0332924 A1 * | 11/2018 | Bailey | A43B 13/04 |
| 2019/0365038 A1 | 12/2019 | Auyang et al. | |
| 2019/0365040 A1 | 12/2019 | Auyang et al. | |

FOREIGN PATENT DOCUMENTS

| | | |
|---|---|---|
| CN | 102726886 A | 10/2012 |
| DE | 19641842 A1 | 4/1998 |
| EP | 1579778 A1 | 9/2005 |
| EP | 3081110 A2 | 10/2016 |
| FR | 2377166 A1 | 8/1978 |
| FR | 2958508 A1 | 10/2011 |
| WO | 9209214 A1 | 6/1992 |
| WO | 0170062 A2 | 9/2001 |
| WO | 2012154360 A2 | 11/2012 |

* cited by examiner

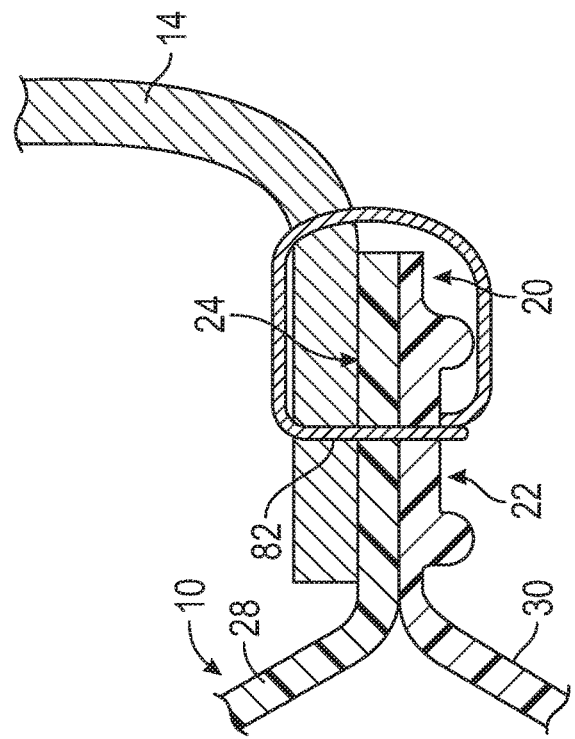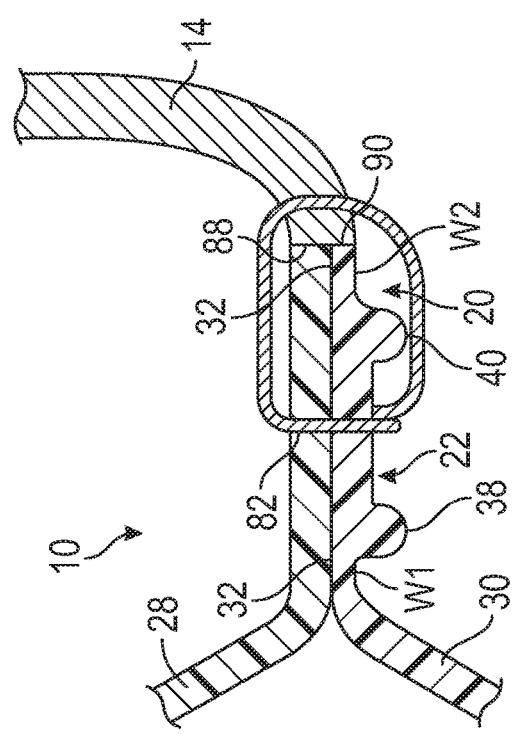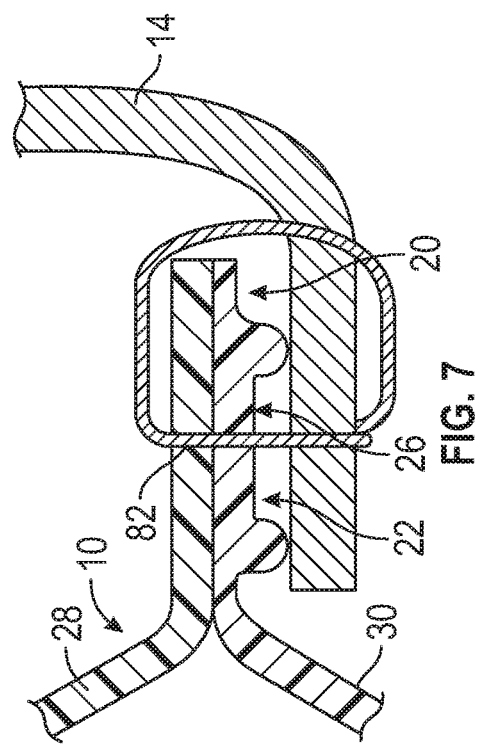

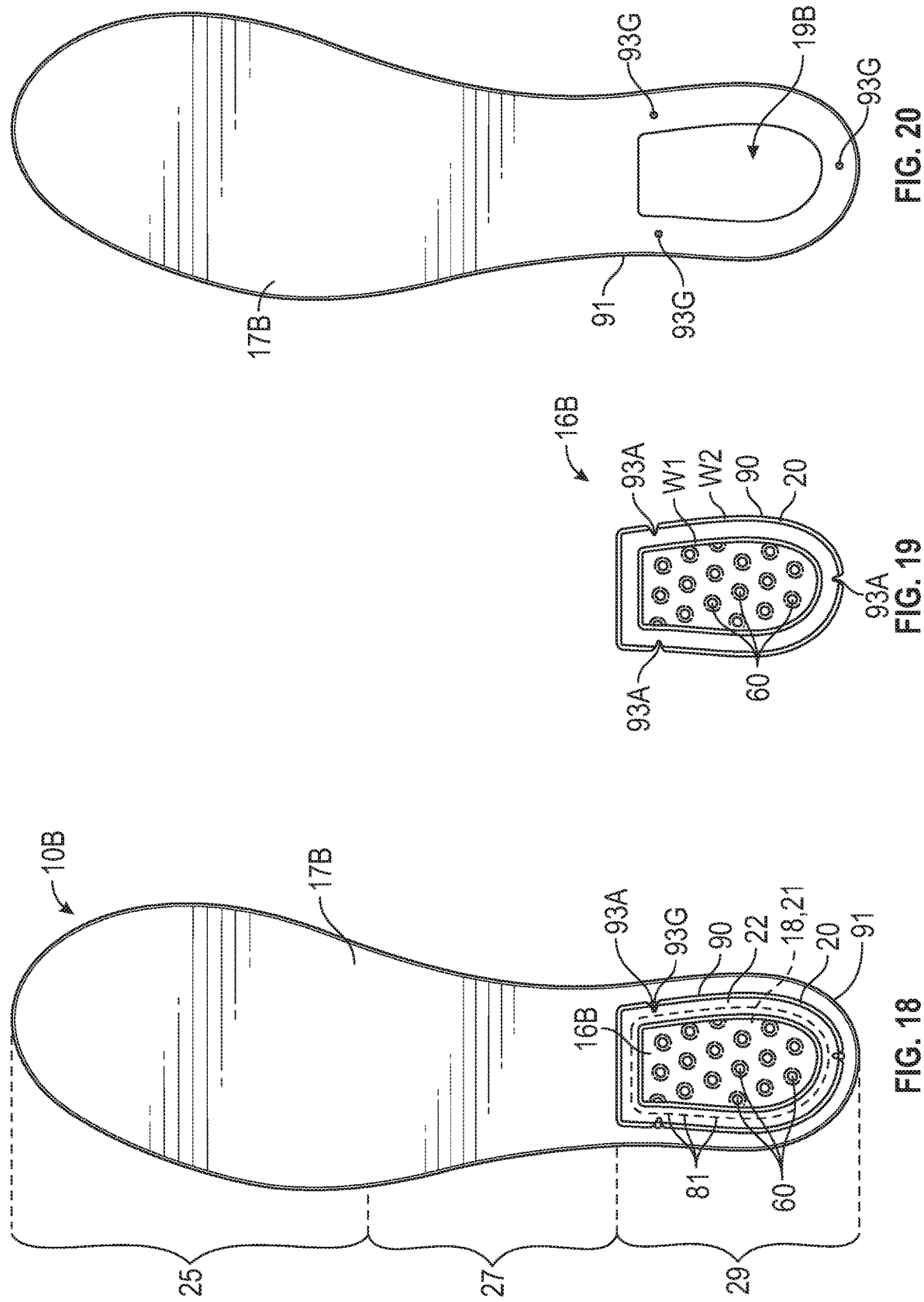

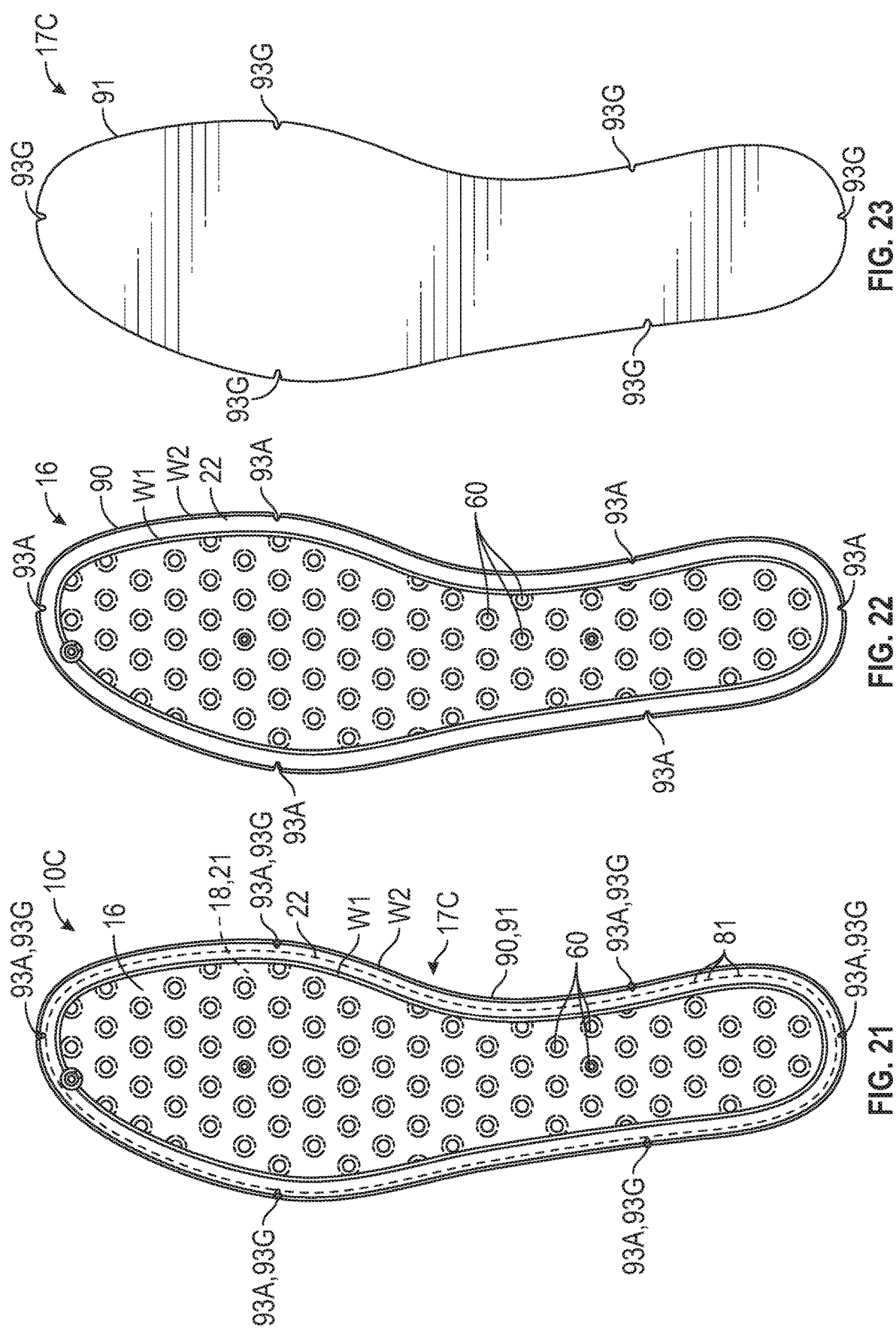

US 11,241,063 B2

FOOTWEAR STROBEL WITH BLADDER HAVING GROOVED FLANGE AND METHOD OF MANUFACTURING

CROSS-REFERENCE TO RELATED APPLICATIONS

This application claims the benefit of priority to U.S. Provisional Application No. 62/678,722, filed May 31, 2018 which is incorporated by reference in its entirety.

TECHNICAL FIELD

The present teachings generally include a strobel for an article of footwear and a method of manufacturing footwear.

BACKGROUND

Articles of footwear generally include two primary elements: an upper and a sole structure. The sole structure is configured to be located under a wearer's foot to space the foot away from the ground. One method of manufacturing an article of footwear involves the use of a lasting process. The upper is tightened around the last, thereby imparting the general shape of the foot to the void within the upper.

BRIEF DESCRIPTION OF THE DRAWINGS

FIG. 5 is a schematic illustration in fragmentary cross-sectional view of a flange of the strobel of FIG. 1 and an upper stitched to the flange in a first arrangement.

FIG. 6 is a schematic illustration in fragmentary cross-sectional view of the flange of the strobel of FIG. 1 and an upper stitched to the flange in a second arrangement.

FIG. 7 is a schematic illustration in fragmentary cross-sectional view of the flange of the strobel of FIG. 1 and an upper stitched to the flange in a third arrangement.

FIG. 18 is a schematic illustration in bottom view of a strobel including a polymeric bladder and a lasting component stitched to the polymeric bladder.

FIG. 19 is a schematic illustration in bottom view of the polymeric bladder of FIG. 18.

FIG. 20 is a schematic illustration in bottom view of the lasting component of FIG. 18.

FIG. 21 is a schematic illustration in bottom view of a strobel including a polymeric bladder and a lasting component stitched to the polymeric bladder.

FIG. 22 is a schematic illustration in bottom view of the polymeric bladder of FIG. 21.

FIG. 23 is a schematic illustration in bottom view of the lasting component of FIG. 21.

DESCRIPTION

Figure 1:
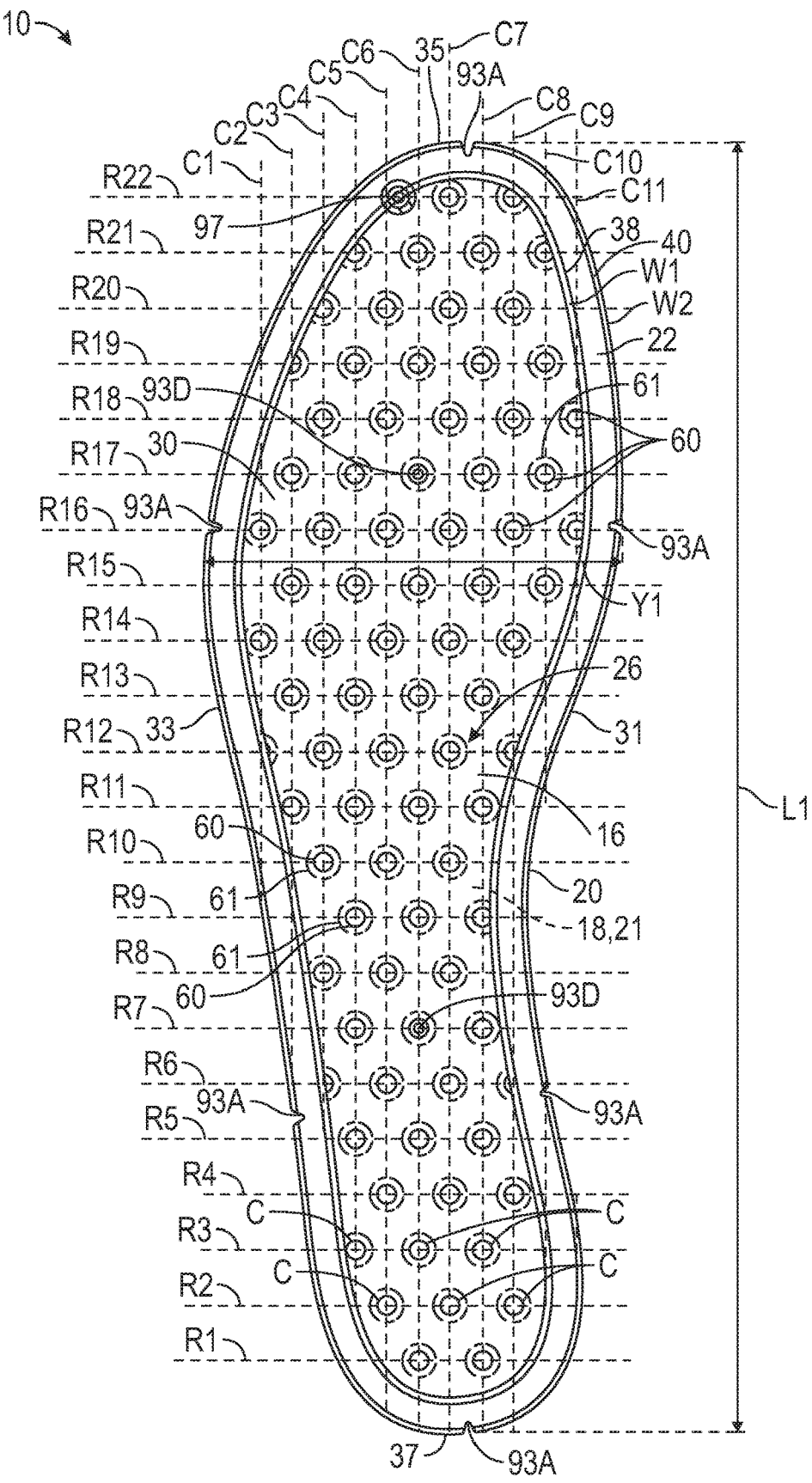
FIG. 1 is a schematic illustration in bottom view of a strobel for a first embodiment of an article of footwear.

Some footwear includes a strobel secured to a lower perimeter of the upper. Traditionally, a strobel is a relatively inelastic textile material. A strobel disclosed herein includes a bladder with a sealed, fluid-filled chamber, and may provide greater comfort, resiliency, and energy return than a strobel of a traditional material and configuration. A strobel configured as a bladder may be a polymeric material that may feel somewhat slippery and/or may be less flexible than traditional strobel material, making it more difficult to grip during manufacturing processes. Accordingly, it may be difficult to accurately stitch the strobel to the upper in a sufficiently short period of time that may be desired during mass production. Moreover, the desired overall height of a sole assembly is often targeted to a predetermined height, and inflated fluid-filled bladders may tend to expand relative to their initial height when stored prior to assembly or when heated during assembly, making control of the sole assembly height more difficult.

The strobel, the article of footwear, and a method of manufacturing footwear as disclosed and as configured herein solves these problems while providing the benefits of a strobel with a fluid-filled bladder.

More particularly, an article of footwear comprises a strobel that includes a polymeric bladder defining an interior cavity and configured to retain a fluid in the interior cavity. The polymeric bladder may have a peripheral flange extending around at least a portion of a perimeter of the interior cavity. The peripheral flange may define a groove extending along the peripheral flange. The groove may serve as a guide path for an operator or for a machine, including a robotic machine, to follow when stitching or otherwise securing the strobel to the upper.

In one or more embodiments, the polymeric bladder may include a first polymeric sheet and a second polymeric sheet. The first polymeric sheet may be bonded to the second polymeric sheet at the peripheral flange. The first polymeric sheet may be joined to the second polymeric sheet at a plurality of interior welds each of which extends only partway across the interior cavity. For example, the interior welds may be formed by a welding process such as radio frequency or ultrasonic welding using tooling that results in welds by thermal bonding of the sheets to one another. Alternatively, the interior welds may be formed by applying anti-weld material to the contacting surfaces of the first and second polymeric sheets (e.g., the inner surfaces) in a pattern that results in the interior welds. For example, the anti-weld material may be screen printed on the sheets.

In one or more embodiments, the interior welds may be arranged in a pattern of rows and columns, with the rows spaced in a longitudinal direction of the strobel and the columns spaced in a transverse direction of the strobel. Interior welds of any two consecutive rows may be offset from one another and interior welds of alternate rows may be aligned with one another. Additionally, interior welds of any two consecutive columns may be offset from one another and interior welds of alternate columns may be aligned with one another. The interior welds may be arranged to define equilateral triangles. More specifically, any two adjacent interior welds in one of the rows (therefore in alternate columns) and an interior weld in a consecutive one of the rows and in a column between the two adjacent interior welds may be positioned to define corners of an equilateral triangle. Moreover, at least a majority of the interior welds may be circular and may have an equal diameter.

By placing the interior welds in offset rows and offset columns to define equilateral triangles as described, and by providing interior welds of equal size (e.g., equal diameter), the polymeric bladder may more closely achieve a desirable geometry when in an inflated state. For example, this layout of interior welds may enable the lowest height of the inflated polymeric bladder for a given diameter of the interior welds. Additionally, the polymeric bladder may be less likely to twist about a longitudinal axis or transverse axis when inflated, as internal forces of the fluid in the interior cavity against the inner surfaces of the polymeric bladder may be more evenly distributed. In general, a greater number of smaller interior welds may provide better control of the height of the inflated strobel than would a smaller number of larger interior welds.

In one or more embodiments, the peripheral flange has a first weld and a second weld spaced apart from the first weld. The first weld and the second weld extend lengthwise along the peripheral flange. The groove may extend lengthwise along the peripheral flange between the first weld and the second weld. The first weld may be inward of the groove. The second weld may be outward of the groove.

In some embodiments, the groove is on a foot-facing side (proximal side) of the polymeric bladder, in other embodiments the groove is on a ground-facing side (distal side) of the polymeric bladder, and in still other embodiments, both the foot-facing side and the ground-facing side have such a groove. This helps enable use of the polymeric bladder for an article of footwear configured for a right foot, and also, alternatively, for an article of footwear configured for a left foot. Stated differently, the strobel may be secured to an upper configured for a right foot article of footwear or may be flipped over for securement to an upper configured for a left foot article of footwear. In either case, one of the two grooves will be in the same position relative to the upper in both instances (e.g., disposed outward (away from the upper)) to serve as a guide for stitching. The polymeric sheets may be transparent, in which case the groove would be visible at a distal side of the strobel and used as a guide path for stitching even in embodiments in which a groove is provided only on a proximal side of the strobel.

In one or more embodiments, the peripheral flange may include a first ridge protruding at an outer surface of the peripheral flange between the first weld and the groove. The peripheral flange may include a second ridge protruding at the outer surface of the peripheral flange between the second weld and the groove. The ridges may be due to material of the polymeric bladder displaced by the first and second welds. The ridges help to define the sides of the groove.

In one or more embodiments, the polymeric bladder may have a locating feature that is at least one of a notch in an outer edge of the peripheral flange, a protrusion at the outer edge of the peripheral flange, an aperture in the polymeric bladder, or a marking on the polymeric bladder. For example, a first aperture may extend through one of the interior welds, and a second aperture may extend through another one of the interior welds. The locating feature or features may be used for accurate alignment with an upper and/or a footwear last, as described herein.

The article of footwear may also include an upper, and the strobel may be secured to the upper. In one example, the strobel may be secured to the upper by a series of stitches extending through the peripheral flange in the groove. The series of stitches may further extend around an outer edge of the peripheral flange.

Within the scope of the present disclosure, an article of footwear may further comprise a lasting component disposed at the flange so that the series of stitches further extends through the lasting component. In one or more embodiments, the polymeric bladder and the lasting component are each disposed in at least one different one of a forefoot region, a midfoot region, and a heel region of the article of footwear, the lasting component is secured to the polymeric bladder by a first series of stitches extending transversely across the polymeric bladder and the lasting component, and the lasting component and the polymeric bladder are secured to the upper by a second series of stitches extending through the lasting component and through the polymeric bladder in the groove of the polymeric bladder.

In one or more embodiments, the lasting component is secured to the peripheral flange at the groove by a series of stitches extending through the lasting component and through the peripheral flange in the groove.

In one or more embodiments, the series of stitches is a first series of stitches, and the lasting component is secured to the upper at a second series of stitches that extends through the lasting component and the upper. The second series of stitches may extend only through the upper and the lasting component. Alternatively, the second series of stitches may further extend through the peripheral flange in the groove.

A midsole may be secured to at least one of the upper or the polymeric bladder. For example, after a last is placed in the upper (e.g., the upper with the strobel secured thereto is placed over the last), a midsole can be secured to at least one of the upper or the polymeric bladder, such as to a lower perimeter of the upper and a distal surface of the polymeric bladder. In some embodiments, the article of footwear may include a protective cover layer overlying a proximal surface of the polymeric bladder and secured to the polymeric bladder at the peripheral flange. The protective cover layer may protect the bladder from shear forces and sharp objects.

A method of manufacturing footwear may comprise forming a strobel by welding a first polymeric sheet and a second polymeric sheet to one another to define a polymeric bladder that has an interior cavity and is configured to retain a fluid in the interior cavity. A peripheral flange may extend around at least a portion of a perimeter of the interior cavity. The welding may be at the peripheral flange and the peripheral flange may define a groove extending along the peripheral flange.

Welding the first polymeric sheet and the second polymeric sheet to one another may include welding a plurality of interior welds each of which extends only partway across the interior cavity. The interior welds may be arranged in a pattern of rows and columns as described above, may define equilateral triangles as described, and may have equal diameters.

A strobel manufactured according to the method may be a first strobel corresponding to a first footwear size, and the method may further comprise manufacturing a second strobel corresponding to a second footwear size larger than the first footwear size by welding the same or different sheets to one another to define a polymeric bladder that has an interior cavity and is configured to retain a fluid in the interior cavity, and also has a peripheral flange extending around at least a portion of a perimeter of the interior cavity, the peripheral flange defining a groove extending along the peripheral flange. Welding the same or different sheets to one another may include welding interior welds including the same pattern of rows and columns as on the first strobel and with at least one additional row and/or column. The additional row or column may include one or more interior welds.

Welding the first polymeric sheet and the second polymeric sheet to one another may include welding a first weld and a second weld that are spaced apart from one another and extend lengthwise along the peripheral flange, with the groove extending lengthwise along the peripheral flange between the first weld and the second weld. For example, the first weld and the second weld may be provided simultaneously via the same welding tooling. Alternatively, the first weld and the second weld may be provided in succession by different tooling. In still other embodiments, the first weld and the second weld may be provided by applying anti-weld material to the interfacing surfaces of the first and second sheets around but not at the areas that will form the first weld W1 and the second W2.

The method of manufacturing may further comprise providing a locating feature on the strobel, wherein the locating feature is at least one of a notch in an outer edge of the peripheral flange, a protrusion at the outer surface of the peripheral flange, an aperture in the polymeric bladder, or a marking on the polymeric bladder.

A method of manufacturing footwear may comprise securing a strobel to an upper, such as by stitching a strobel to an upper along a groove in a peripheral flange of the strobel so that a series of stitches extends through the peripheral flange at the groove. The strobel may include a polymeric bladder that defines an interior cavity and is configured to retain a fluid in the interior cavity, and the peripheral flange may extend around at least a portion of a perimeter of the interior cavity. In one or more embodiments, the method may include disposing a lasting component at the flange prior to stitching the strobel to the upper, the series of stitches further extending through the lasting component when the strobel is stitched to the upper.

In one or more embodiments, the method of manufacturing footwear begins with the strobel already formed. In other embodiments, the method of manufacturing footwear also includes forming the strobel by welding a first polymeric sheet and a second polymeric sheet to one another to define the peripheral flange having the groove, and to define a plurality of interior welds each of which extends only partway across the interior cavity. The interior welds may be arranged in a pattern of rows and columns as described above to define equilateral triangles, and may have equal diameters.

The strobel manufactured according to the method of manufacturing may be a first strobel corresponding to a first footwear size, and the method of manufacturing footwear may further comprise manufacturing a second strobel corresponding to a second footwear size larger than the first footwear size by welding the same or different sheets to one another to define a polymeric bladder having an interior cavity, the polymeric bladder configured to retain a fluid in the interior cavity, and the polymeric bladder having a peripheral flange that extends around at least a portion of a perimeter of the interior cavity, the peripheral flange defining a groove extending along the peripheral flange. Welding the same or different sheets to one another may include welding interior welds in the pattern of rows and columns as on the first strobel with at least one additional row and/or column. Stated differently, the majority of the weld pattern is the same for the strobel of the first footwear size and the strobel of the second footwear size. Additional interior welds are also included for the strobel of the larger, second footwear size.

The method of manufacturing footwear may further comprise placing the upper with the strobel stitched thereto on a last (e.g., inserting a last into the upper). Placing the upper with the strobel stitched or otherwise secured thereto on the last may include aligning a locating feature on the strobel with a locating feature on the last. The locating feature on the strobel may be at least one of a notch in an outer edge of the peripheral flange, a protrusion from the outer edge of the peripheral flange, an aperture in the polymeric bladder, such as through one of the interior welds, or a marking on the polymeric bladder. The method of manufacturing footwear may further comprise securing a midsole to at least one of the upper or the strobel while the upper and the strobel are on the last.

The polymeric bladder may be in an uninflated state when the strobel is stitched to the upper, and the method of manufacturing footwear may further comprise inflating the polymeric bladder after the strobel is stitched to the upper, and then sealing the interior cavity after inflating the interior cavity. Placing the upper with the strobel stitched thereto on the last may be after inflating the polymeric bladder and sealing the interior cavity. In other embodiments, the strobel may be inflated prior to stitching the strobel to the upper and/or prior to placing the upper with the strobel stitched thereto on the last.

The above features and advantages and other features and advantages of the present teachings are readily apparent from the following detailed description of the modes for carrying out the present teachings when taken in connection with the accompanying drawings.

Figure 2:
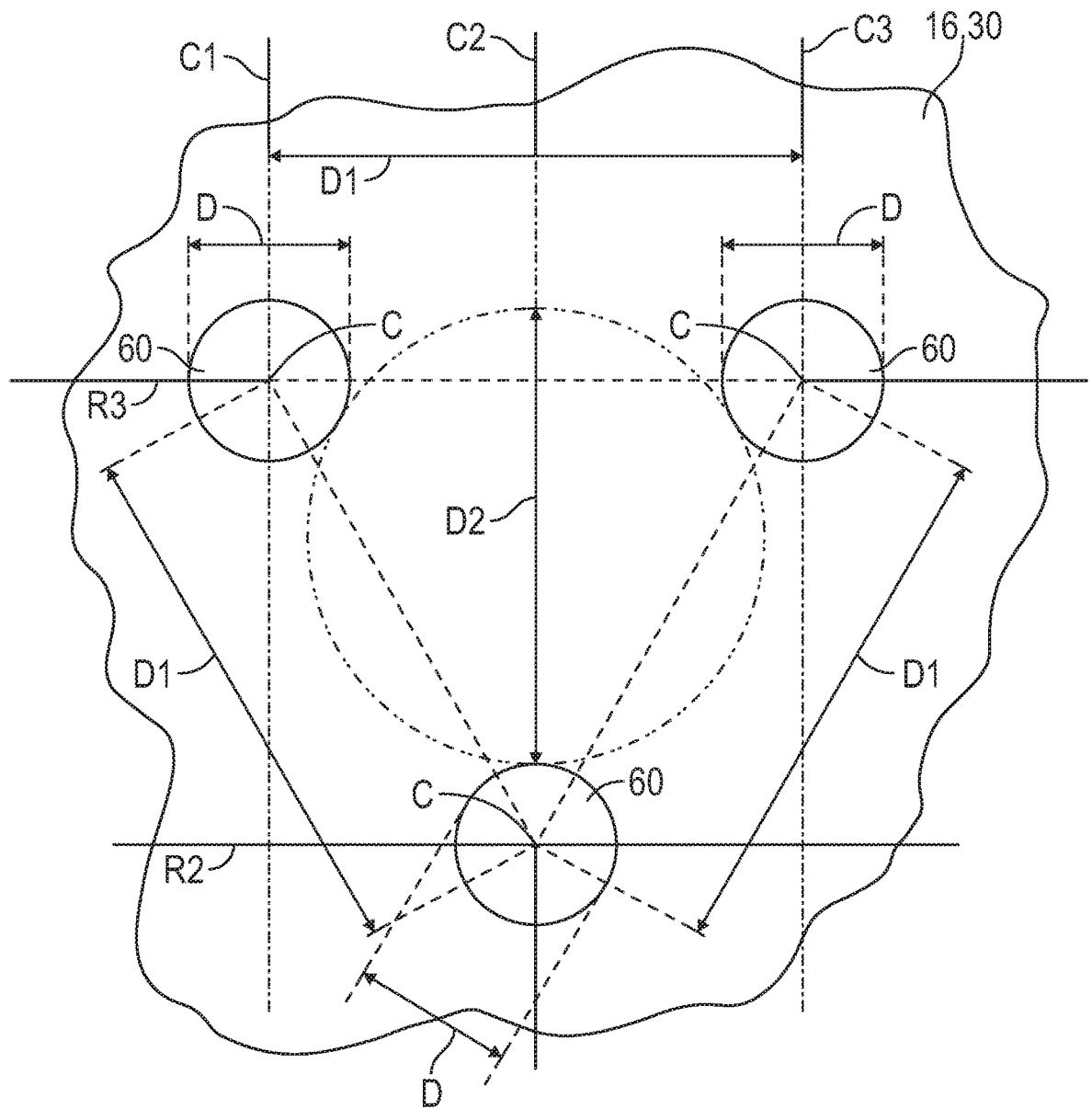
FIG. 2 is a schematic illustration in partial fragmentary bottom view of the strobel of FIG. 1 showing an orientation of interior welds.
Figure 3:
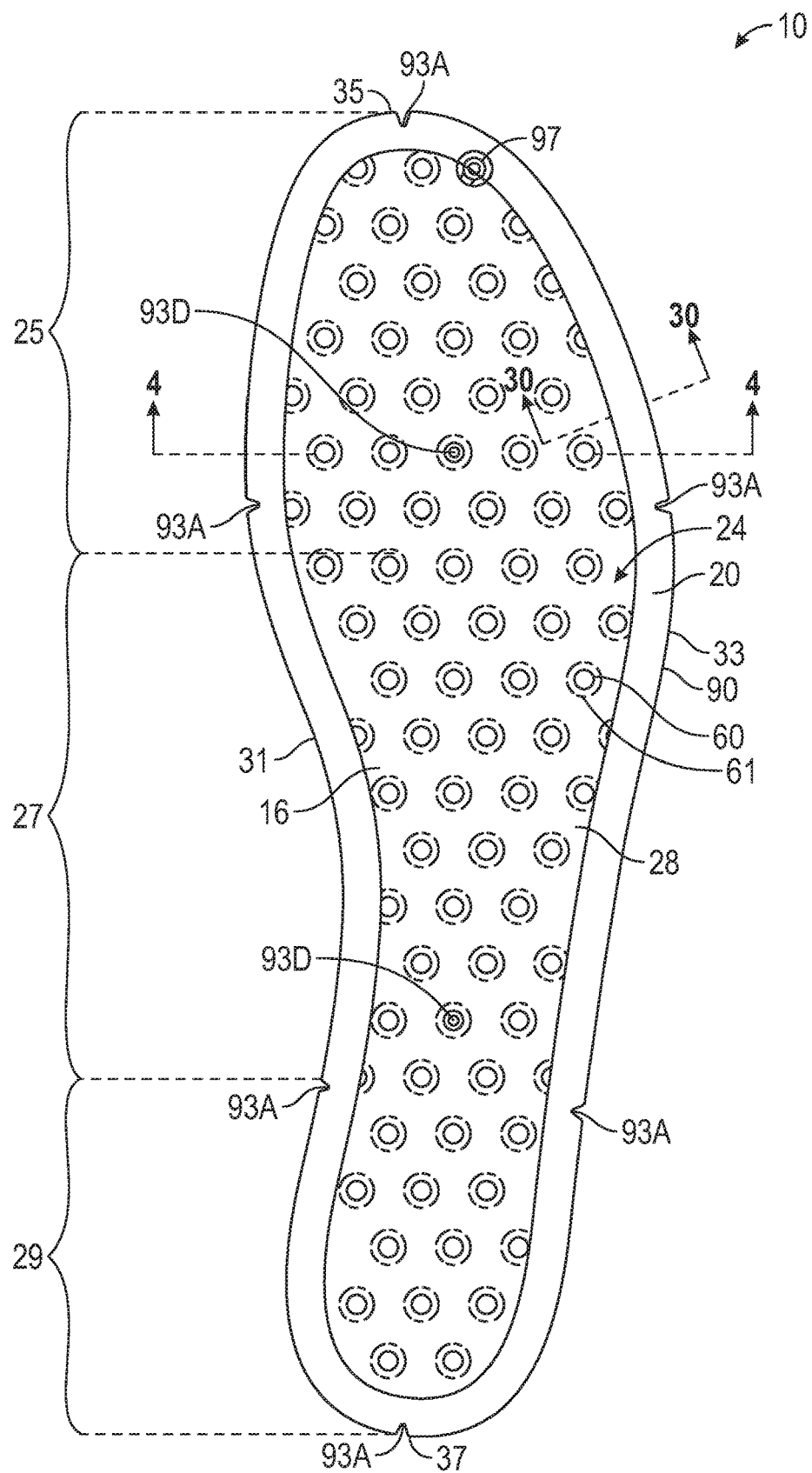
FIG. 3 is a schematic illustration in top view of the strobel of FIG. 1.
Figure 34:
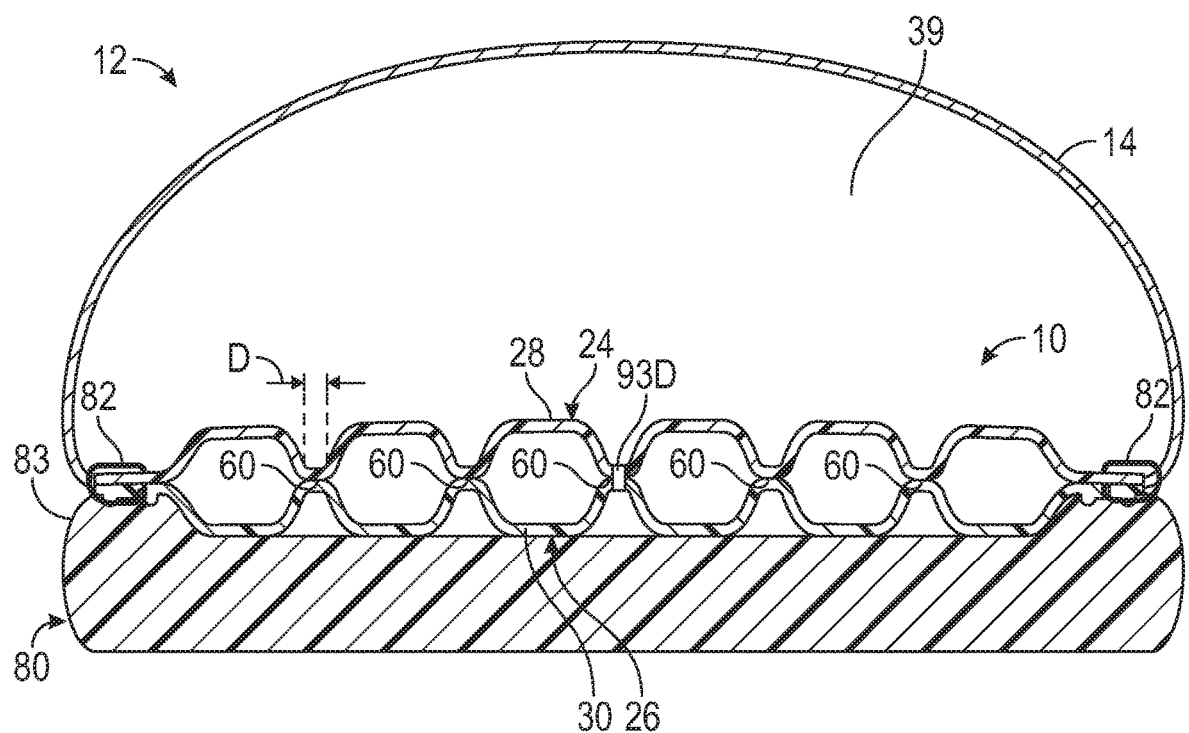
FIG. 34 is a schematic cross-sectional view of an article of footwear including the upper and strobel of FIG. 33 taken at lines 34-34 in FIG. 33, inverted relative to FIG. 33, and with a midsole secured thereto.

Referring to the drawings, wherein like reference numbers refer to like components throughout the views, FIGS. 1-3 show a strobel 10 for an article of footwear 12 that includes an upper 14, shown, for example, in FIG. 34. The strobel 10 comprises a polymeric bladder 16 that defines an interior cavity 18 and is configured to retain a fluid in the interior cavity. The polymeric bladder 16 has a peripheral flange 20 extending around at least a portion of a perimeter 21 of the interior cavity 18. In the embodiment shown, the peripheral flange 20 extends around the entire perimeter 21 (e.g., outwardly surrounding the interior cavity 18) generally in an X-Y plane of the strobel 10. The X-Y plane is a plane through the width and the length of the strobel 10, such as the plane of FIG. 1, and the Z plane is a plane though the height of the strobel 10, such as in FIG. 4, from a proximal surface 24 of the strobel 10 to a distal surface 26 of the strobel 10. The strobel 10 is a full length strobel having a forefoot region 25, a midfoot region 27, and a heel region 29. In other embodiments within the scope of the disclosure, the strobel may extend on only one or two of the regions, such as only in the heel region 29, only in the forefoot region 25, in both the forefoot and midfoot regions 25, 27 but not any of or not all of the heel region 29, or in both the heel and midfoot regions 27, 29 but not any of or not all of the forefoot region 25. The peripheral flange 20 extends around the forefoot region 25, the midfoot region 27, and the heel region 29 of the strobel 10.

The peripheral flange 20 defines a groove 22 extending along the peripheral flange 20. As further discussed herein, the groove 22 serves as a guide path for an operator or for a machine, including a robotic machine, to follow when stitching or otherwise securing the strobel 10 to the upper 14. As shown in FIG. 34, when the strobel 10 is secured to the upper 14 at its peripheral flange 20, the strobel 10 and the upper 14 together define a foot-receiving cavity 39. Dynamic compressive loading of the sole structure 80 by a foot in the foot-receiving cavity 39, as represented by forces FC in FIG. 35 may cause tension in the strobel 10 around the peripheral flange 20 in an outward direction as represented by outward forces FO, creating a trampoline like effect as the tension is subsequently relieved.

Figure 4:
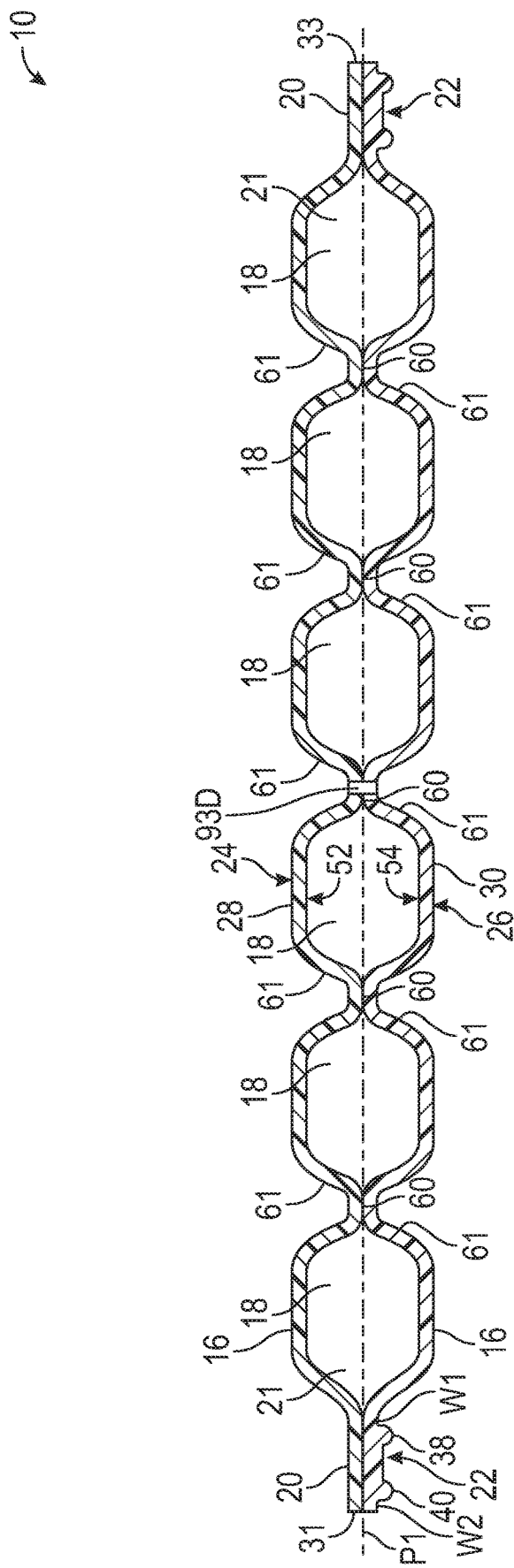
FIG. 4 is a schematic illustration in cross-sectional view of the strobel of FIG. 1 taken at lines 4-4 in FIG. 3.

Referring to FIG. 4, the polymeric bladder 16 includes a first polymeric sheet 28 and a second polymeric sheet 30. The first polymeric sheet 28 is secured to the second polymeric sheet 30 at the peripheral flange 20 to enclose the interior cavity 18. Stated differently, when the sheets 28, 30 are secured together at the peripheral flange 20 and the polymeric bladder 16 is sealed, the first polymeric sheet 28 and the second polymeric sheet 30 retain a fluid in the interior cavity 18. As used herein, a "fluid" filling the interior cavity 18 may be a gas, such as air, nitrogen, another gas, or a combination thereof.

The first and second polymeric sheets 28, 30 can be a variety of polymeric materials that can resiliently retain a fluid such as nitrogen, air, or another gas. Examples of polymeric materials for the first and second polymeric sheets 28, 30 include thermoplastic urethane, polyurethane, polyester, polyester polyurethane, and polyether polyurethane. Moreover, the first and second polymeric sheets 28, 30 can each be formed of layers of different materials including polymeric materials. In one embodiment, each of the first and second polymeric sheets 28, 30 is formed from thin films having one or more thermoplastic polyurethane layers with one or more barrier layers of a copolymer of ethylene and vinyl alcohol (EVOH) that is impermeable to the pressurized fluid contained therein such as a flexible microlayer membrane that includes alternating layers of a gas barrier material and an elastomeric material, as disclosed in U.S. Pat. Nos. 6,082,025 and 6,127,026 to Bonk et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. Additional suitable materials for the first and second polymeric sheets 28, 30 are disclosed in U.S. Pat. Nos. 4,183,156 and 4,219,945 to Rudy which are incorporated by reference in their entireties. Further suitable materials for the first and second polymeric sheets 28, 30 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the strobel 10, engineering properties such as tensile strength, stretch properties, fatigue characteristics, dynamic modulus, and loss tangent can be considered. For example, the thicknesses of the first and second polymeric sheets 28, 30 used to form the bladder can be selected to provide these characteristics.

Figure 30:
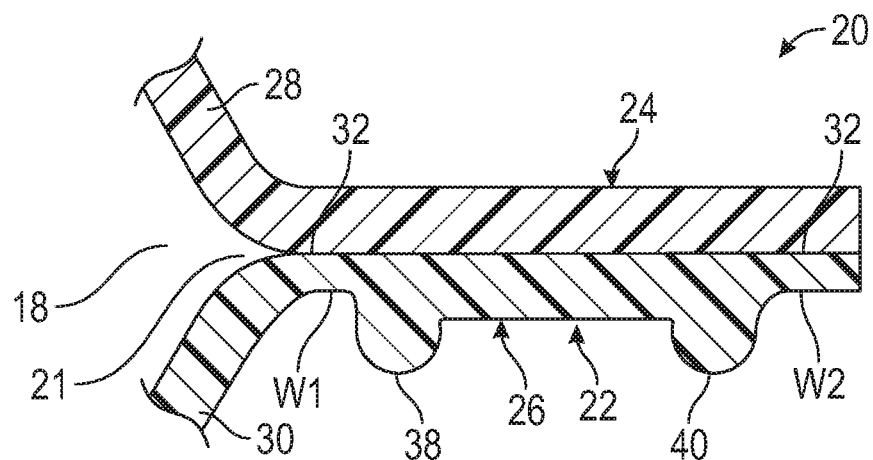
FIG. 30 is a schematic illustration in close-up cross-sectional view of a flange of the strobel of FIG. 3 taken at lines 30-30 in FIG. 3.

With reference to FIGS. 4 and 30, the peripheral flange 20 has a first weld W1 and a second weld W2 spaced apart from the first weld W1. The first and second polymeric sheets 28, 30 bond to one another at an interface 32 at the welds W1, W2. The sheets 28, 30 may or may not be bonded to one another at the portion of the interface 32 between the welds W1, W2. The welds W1 and W2 are formed by using a tooling assembly similar to that of FIGS. 42-43 or that of FIGS. 44-45. For example, the tooling assembly may include a first mold portion 34A and a second mold portion 34B, as shown and described in FIGS. 42-43. The mold portions 34A, 34B are closed together on the polymeric sheets 28, 30, and the polymeric sheets 28, 30 may then welded by radio frequency welding (also referred to as high frequency or dielectric welding) as a power source 36 supplies energy creating an alternating electric field that heats the polymeric sheets 28, 30 where the mold portions 34A, 34B contact the polymeric sheets 28, 30. Alternatively, the sheets 28, 30 may be secured to one another by another manner of thermal or adhesive bonding.

The first weld W1 and the second weld W2 extend lengthwise along the peripheral flange 20. As best shown in FIG. 1, the first weld W1 and the second weld W2 extend continuously along the entire peripheral flange 20 to completely surround (i.e., encircle) the interior cavity 18. The groove 22 extends lengthwise along the peripheral flange 20 between the first weld W1 and the second weld W2. The first weld W1 is inward of the groove 22, and the second weld W2 is outward of the groove 22, where inward is toward the center of the strobel 10 and outward is away from the center of the strobel 10.

Heating and pressure of the tooling assembly at the welds W1 and W2 may displace some of the material of the second polymeric sheet 30 so that the peripheral flange 20 may include a first ridge 38 protruding at an outer surface, e.g., the distal surface 26, of the peripheral flange 20 between the first weld W1 and the groove 22, and a second ridge 40 protruding at the distal surface 26 of the peripheral flange 20 between the second weld W2 and the groove 22. The ridges 38, 40 help to define the sides of the groove 22.

Figure 31:
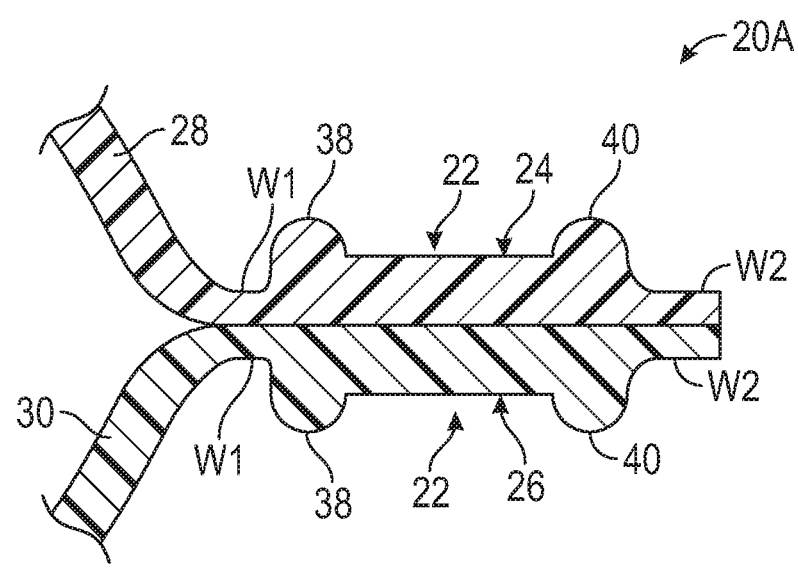
FIG. 31 is a schematic illustration in close-up cross-sectional view of a portion of an alternative embodiment of a strobel for an alternative embodiment of an article of footwear.

In some embodiments, such as in FIG. 30, the groove 22 is in the distal surface 26, which is the ground-facing side of the polymeric bladder 16 when the strobel 10 is secured to the upper 14. In other embodiments, the groove 22 may be on the proximal side (proximal surface 24), which is the foot-facing side of the polymeric bladder 16 when the strobel 10 is secured to the upper 14. Because the polymeric sheets 28, 30 may be transparent, the groove 22 would be visible through the peripheral flange 20 at the distal side in embodiments in which a groove 22 is provided only on the proximal side. Additionally, the strobel 10 of FIG. 1 has the groove 22 on the proximal side if used as a strobel for an article of footwear configured for a left foot and has the groove on the distal side if used as a strobel for an article of footwear configured for a right foot. In still other embodiments, both the distal surface 26 and the proximal surface 24 have such a groove 22, as shown on the flange 20A of FIG. 31. Providing both sides of the peripheral flange 20A with a groove 22 helps enable use of the polymeric bladder 16 for an article of footwear configured for a right foot, and also, alternatively, for an article of footwear configured for a left foot. Stated differently, a strobel 10 having the peripheral flange 20A may be secured to an upper 14 configured for a right foot article of footwear or may be flipped over for securement to an upper 14 configured for a left foot article of footwear. In either case, one of the two grooves 22 will be in the same position relative to the upper in both instances (e.g., disposed outward (away from the upper)) to serve as a guide for stitching. In embodiments having a groove 22 on only one of the sides of the peripheral flange 20, because the polymeric sheets 28, 30 may be transparent, the groove 22 would be visible at the distal side even in embodiments in which a groove 22 is provided only on the proximal side.

Referring to FIG. 4, the inner surface 52 of the first polymeric sheet 28 is joined to the inner surface 54 of the second polymeric sheet 30 at a plurality of interior welds 60 each of which is inward of the perimeter 21 of the interior cavity 18. For example, the interior welds 60 may be formed by a welding process such as radio frequency or ultrasonic welding using tooling that results in welds by thermal bonding of the polymeric bladder 16. Referring to FIG. 20, each interior weld 60 results from a respective pair of protrusions including one of the protrusions 72A of mold portion 34A, or of a mold insert 34C thereof, and one of the protrusions 72B of mold portion 34B, or of a mold insert 34D thereof. The protrusions 72A, 72B may also be referred to as weld posts. The mold inserts 34C, 34D may also be referred to as shims. Utilizing mold inserts 34C, 34D that include the protrusions 72A, 72B enables the inserts to be switched for inserts with different patterns of protrusions when a different pattern of interior welds is desired. Alternatively, the protrusions 72A, 72B may be integral with the mold portions 34A, 34B, respectively, rather than disposed on removable mold inserts.

During welding, the polymeric sheets 28, 30 are in contact with one another between each pair of protrusions 72A, 72B, and an interior weld 60 results where they are in contact. Prior to placing the polymeric sheets 28, 30 between the mold portions 34A, 34B and mold inserts 34C, 34D, anti-weld material may be placed on all portions of the interior surfaces 52, 54 where no weld is desired in order to ensure that a desired weld pattern is achieved.

In some embodiments, no tooling assembly or radio-frequency welding is used to create the welds W1 and W2 at the peripheral flange and the interior welds (e.g., no mold portions are used) as the use of anti-weld material alone is sufficient to achieve the welds W1 and W2 and the desired pattern of interior welds 60. For example, anti-weld material (also referred to as blocker ink) may be printed on or otherwise disposed on one or both of the inner surfaces of the first and second polymeric sheets 28, 30. The sheets 28, 30 may then be placed in a uniform press and will bond to one another at all portions of interfacing surfaces (e.g., inner surfaces) where the anti-weld material is not disposed.

Figure 35:
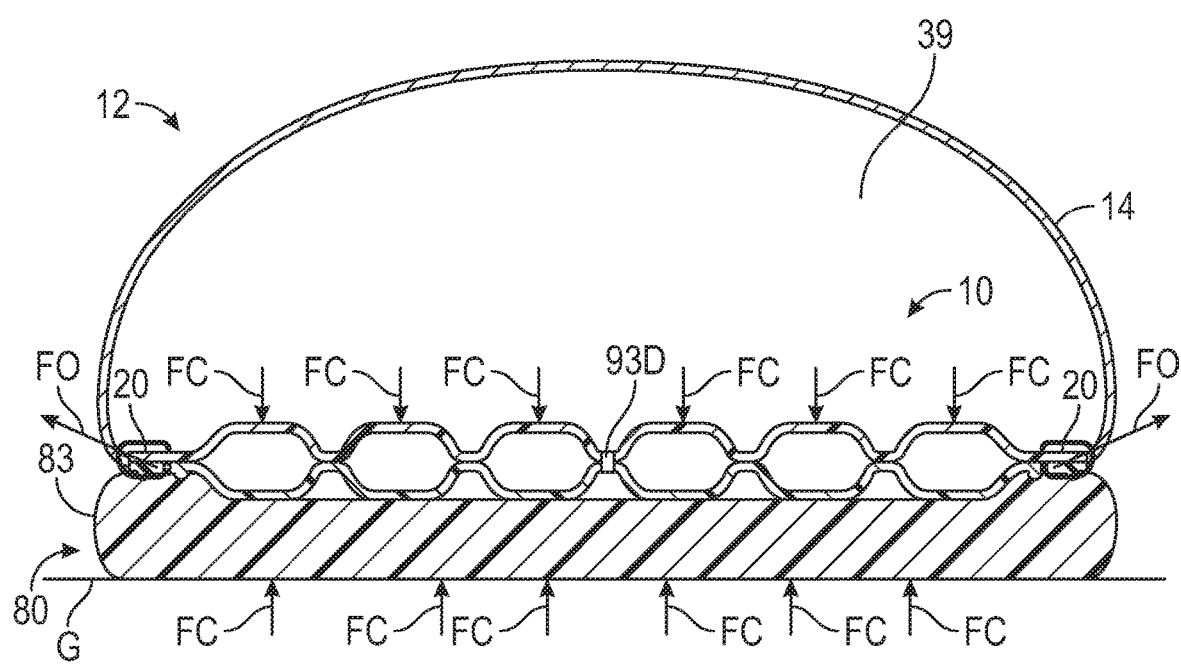
FIG. 35 is a schematic cross-sectional view of the upper and strobel of FIG. 34 under dynamic compressive loading.

The interior welds 60 restrain separation of the first and second polymeric sheets 28, 30 to the separated positions shown in FIG. 4, which depicts the strobel 10 with the interior cavity 18 inflated and sealed under a given inflation pressure of gas in the interior cavity 18, so that the strobel 10 is in an inflated state. It should be appreciated, however, that, in some embodiments of a method of manufacturing 200 the strobel 10 (or any of the other strobels described herein), the strobel 10 (e.g., the bladder 16) is not inflated and sealed until after it is secured to the upper 14. In other embodiments of the method 200, the strobel 10 may be inflated and sealed before it is secured to the upper 14. The outward force on the inner surfaces 52, 54 of the first and second polymeric sheets 28, 30 due to the pressurized gas in the interior cavity 18 places tension on the polymeric sheets 28, 30 around the interior welds 60, and the interior welds 60 prevent the polymeric sheets 28, 30 from further outward movement away from one another. When pressure is exerted on the strobel 10 such as due to compressive forces FC of a dynamic load of a wearer when the footwear 12 impacts the ground during running or other movements, as shown in FIG. 35, the strobel 10 is compressed, and the polymeric sheets 28, 30 move closer together in proportion to the load on the first and second polymeric sheets 28, 30.

Figure 42:
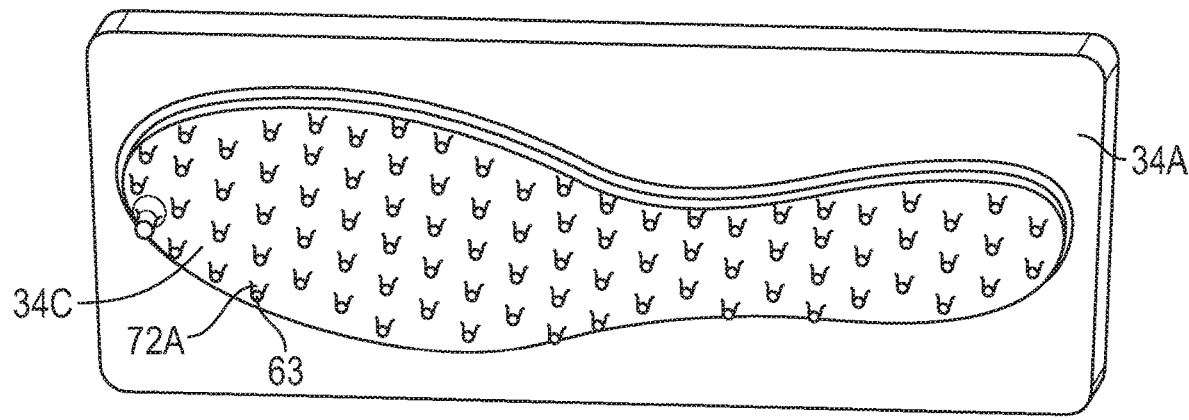
FIG. 42 is a schematic perspective illustration of a portion of the tooling assembly of FIG. 41.
Figure 43:
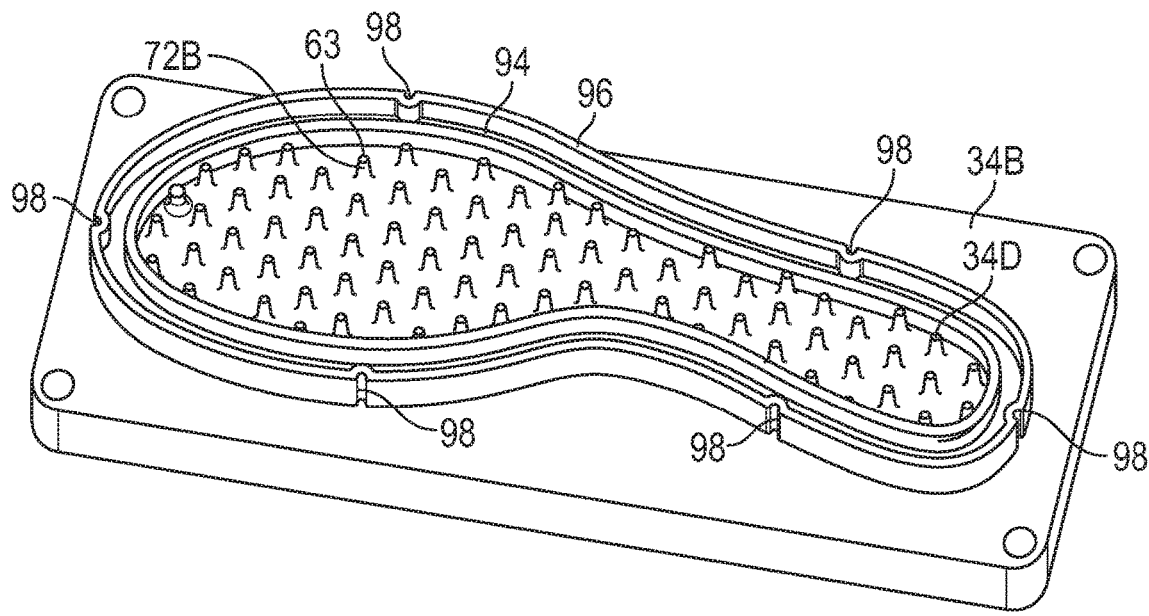
FIG. 43 is a schematic perspective illustration of another portion of the tooling assembly of FIG. 41.

The protrusions 72A and 72B are arranged in patterns that are mirror images of one another, so that when the protrusions 72A contact the first polymeric sheet 28 and the protrusions 72B contact the second polymeric sheet 30 during the portion 200A of the method of manufacturing 200 disclosed herein, the sets of protrusions 72A, 72B are aligned, pressing the polymeric sheets 28, 30 together between them. FIGS. 42 and 43 schematically depict representative protrusions 72A, 72B in patterns that result in the bond pattern of interior welds 60 shown in FIGS. 1-3.

Figure 32:
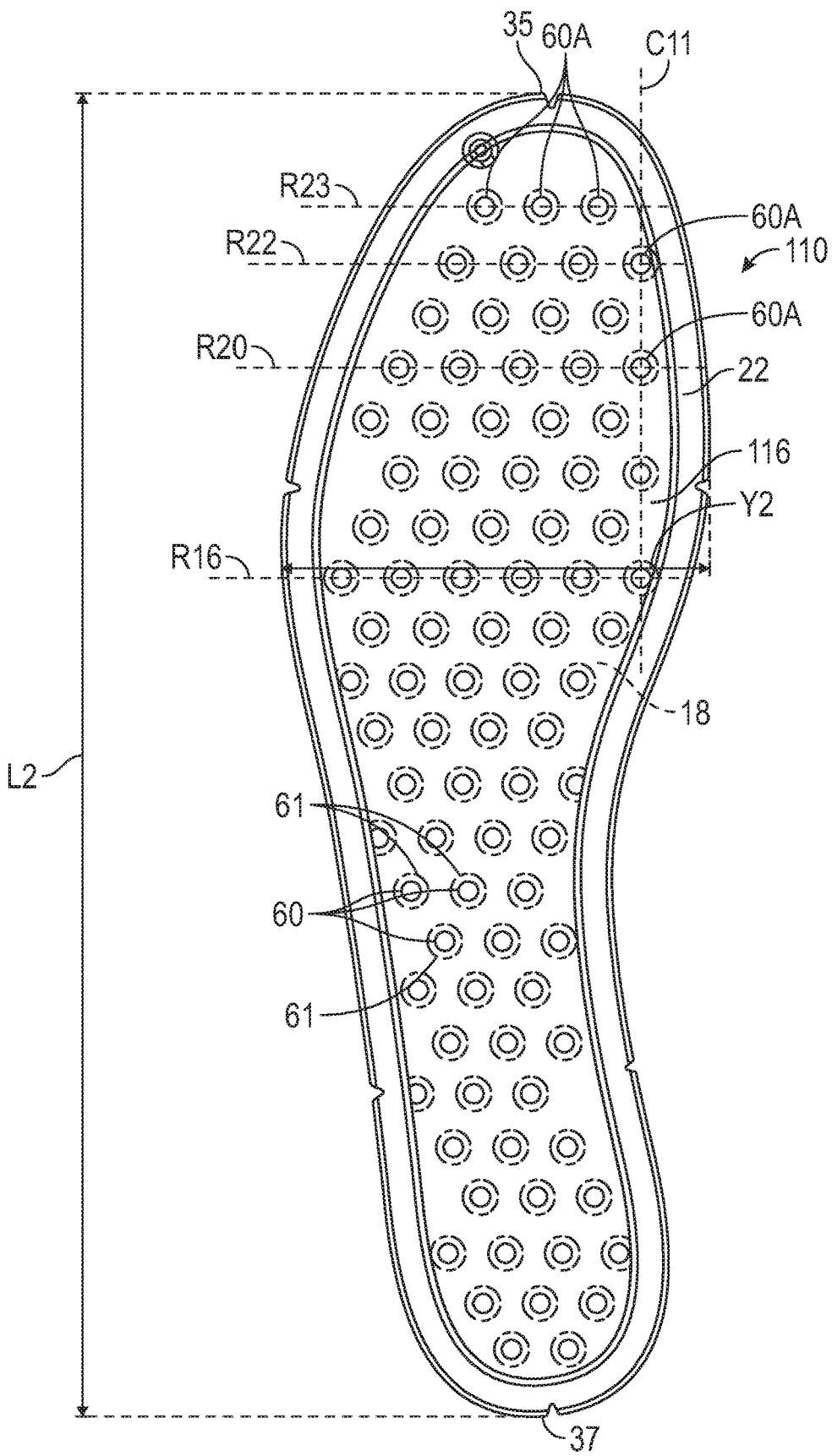
FIG. 32 is a schematic illustration in bottom view of an alternative embodiment of a strobel for an alternative embodiment of an article of footwear.

When the interior cavity 18 is inflated, the interior welds 60 cause dimples 61 at the proximal surface 24 (i.e., the outer surface) of the first polymeric sheet 28 and at the distal surface 26 (i.e., the outer surface) of the second polymeric sheet 30, as indicated in FIG. 4. Stated differently, the proximal surface 24 of the first polymeric sheet 28 at any one of the interior welds 60 is non-planar, and the distal surface 26 of the second polymeric sheet 30 at any one of the interior welds is non-planar. The broken lines around each of the interior welds 60 in FIGS. 1, 2, and 32, for example, represent the dimples 61, where the respective polymeric sheets 28, 30 curve inward along a generally toroidal surface to the interior weld 60. Only some of the interior welds 60 and some of the dimples 61 are labelled with reference numbers in the drawings.

The gas in the interior cavity 18 can fluidly communicate around each interior weld 60. Stated differently, the interior welds 60 do not create subchambers in the interior cavity 18. This allows the gas to be displaced in the interior cavity 18 around the interior welds 60 when compressive forces FC are applied to the strobel 10, such as during impact of the article of footwear 12 with the ground G in FIG. 35. For example, as a foot rolls forward from heel to toe during a foot strike, the gas may be displaced from rearward in the strobel 10 to a portion more forward in the strobel 10. Supportive cushioning provided by the fluid in the interior cavity 18 can thus be provided in areas most needed during use of the strobel 10.

As best shown in FIG. 1, each of the interior welds 60 has a circular diameter D due to circular contact surfaces 63 of the protrusions 72A, 72B, shown in FIGS. 42-43. The energy imparted by the welding process is delivered to the polymeric sheets 28, 30 over the circular area of the contact surfaces 63, resulting in circular welds 60. In embodiments in which only anti-weld material is used without a tooling assembly having protrusions, the anti-weld material is printed to leave circular areas uncovered, resulting in circular welds. As shown, the diameter D of each of the interior welds 60 is equal. In other embodiments, at least a majority (i.e., greater than or equal to one half) of the circular welds 60 have an equal diameter D. In other embodiments, the interior welds 60 may have a shape that is other than circular, such as oval, square, etc.

With reference to FIG. 1, the interior welds 60 are arranged in a pattern of rows and columns. In the embodiment of the strobel 10 shown, there are twenty-two rows labelled R1, R2, R3, R4, R5, R6, R7, R8, R9, R10, R11, R12, R13, R14, R15, R16, R17, R18, R19, R20, R21 and R22. The centers C of each of the interior welds 60 in a row fall along a common line representing the location of the row. The rows are all parallel to one another. There are eleven columns labelled C1, C2, C3, C4, C5, C6, C7, C8, C9, C10, and C11. The columns are all parallel to one another. The centers of each of the interior welds 60 in a column fall along a common line representing the location of the column. The rows are spaced in a longitudinal direction of the strobel 10 from the first row R1 to the twenty-second row R14. The longitudinal direction is the direction from the rearmost extent 37 of the strobel 10 to the foremost extent 35 of the strobel 10. The columns are spaced in a transverse direction of the strobel 10 from the first column C1 to the eleventh column C11. The transverse direction in which the columns are spaced is the direction from the lateral side 33 to the medial side 31.

The pattern of interior welds 60 is such that interior welds 60 of any two consecutive ones of the rows are offset from one another and interior welds of alternate ones of the rows are aligned with one another. For example, interior welds 60 of the odd-numbered rows R1, R3, R5, R7, R9, R11, R13, R15, R17, R19, and R21 are aligned with one another. Interior welds 60 of the even-numbered rows R2, R4, R6, R8, R10, R12, and R14 are aligned with one another. However, the interior welds 60 of the odd-numbered rows are offset from the interior welds 60 of the even-numbered rows.

Additionally, the pattern of interior welds 60 is such that interior welds 60 of any two consecutive columns are offset from one another and interior welds 60 of alternate columns are aligned with one another. For example, interior welds 60 of the odd-numbered columns C1, C3, C5, C7, C9, and C11 are aligned with one another. Interior welds 60 of the even-numbered columns C2, C4, C6, C8, and C10 are aligned with one another. However, the interior welds 60 of the odd-numbered columns are offset from the interior welds 60 of the even-numbered columns.

With this pattern of offset rows and columns, the interior welds 60 may be circular, of equal diameter D, and arranged to define equilateral triangles. As illustrated in FIG. 3, the centers C of any two adjacent interior welds in one of the rows (as depicted by interior welds 60 of row R3, which are in alternate columns C1, C3) and the center C of an interior weld 60 in a consecutive one of the rows R2 and in a column C2 between the two adjacent interior welds of row R3 are positioned to define corners of an equilateral triangle.

By placing the interior welds 60 in offset rows and offset columns to define equilateral triangles as described, and by providing interior welds of equal diameter D, may enable the lowest height in the Z direction of the inflated polymeric bladder for a given diameter D and number of interior welds 60. Additionally, the polymeric bladder 16 may be less likely to twist about a longitudinal or transverse axis through the bladder 16 when inflated, as internal forces of the fluid in the interior cavity 18 against the inner surfaces of the polymeric bladder 16 may be more evenly distributed. In general, a greater number of smaller interior welds may provide better control of the height of the inflated strobel than would a smaller number of larger interior welds.

The diameter of the interior welds 60 and the distance D1 between the centers C of the interior welds 60 determines the diameter D2 of the space between the interior welds 60 that form the equilateral triangle, which in turn is directly proportional to the greatest height in the Z direction between the outer surface 24 and the outer surface 26. The area of the contact surface 63 of each protrusion 72A, 72B in FIGS. 20-21 is equal to the area of each interior weld 60. With a circular contact surface 63 as shown, the diameter of the contact surface 63 is equal to the diameter of the interior weld 60. In one example, the diameter of the contact surface 63 of each protrusion 72A or 72B (or of each protrusion 172A or 172B in FIG. 45) and the diameter of each interior weld 60 may be from about 0.1 inches (in.) (2.54 millimeters (mm)) to about 0.3 in. (7.6 mm), or may be from about 0.14 in. (3.56 mm) to about 0.23 in. (5.84 mm). For example, each interior weld 60 may have a diameter of 0.1875 in. (4.762 mm). In another example, each interior weld 60 may have a diameter of about 0.2500 in.

In one example, a distance D1 between the centers C of any of the interior welds 60 forming an equilateral triangle as shown in FIG. 3 may be from about 0.4 in. (10.1 mm) to about 0.8 in. (20.3 mm), or may be from about 0.46 in. (11.68 mm) to about 0.77 in. (19.56 mm). In one example, the distance D1 may be 0.6125 in. (15.557 mm). In another example, the distance D1 may be 0.667 inches. Accordingly, the centers of two adjacent protrusions 72A or 72B that form the welds 60 are a corresponding distance apart.

In one example, the circular space between the three interior welds 60 forming an equilateral triangle (i.e., a circle tangent to each of the three interior welds 60) as shown in FIG. 3 may be of a diameter D2 from about 0.3 in. (7.62 mm) to about 0.7 in. (17.8 mm), and may be from about 0.39 in. (9.91 mm) to about 0.65 in. (16.51 mm). In one example, the diameter D2 may be 0.520 in. (13.20 mm). In an example, each interior weld 60 may have a diameter of 0.1875 in., the distance D1 between the centers C may be 0.6125 in., and the diameter D2 may be 0.520 in. In another example, each interior weld 60 may have a diameter of 0.2500 in., the distance D1 between the centers C may be 0.667 in., and the diameter D2 may be 0.520 in. Accordingly, a circle between and tangent to any three adjacent ones of the protrusions 72A or 72B that are arranged to form an equilateral triangle (or any three adjacent ones of the protrusions 172A, 172B that are arranged to form an equilateral triangle) has a corresponding diameter D2.

The inflated polymeric bladder 16 may remain along plane P1 (indicated in FIG. 4) from a foremost extent 35 to a rearmost extent 37 of the polymeric bladder 16, as well as from a medial side 31 to a lateral side 33 of the polymeric bladder 16. The plane P1 extends perpendicular to the cross-section shown. By spacing the interior welds 60 in the pattern as described, the strobel 10 is less likely to curl away from the plane P1 of FIG. 4 either in the transverse direction or the longitudinal direction when inflated, such that the plane P1 becomes instead a curved surface and the strobel 10 appears slightly concave or slightly convex when viewed as a whole at the proximal surface 24 or at the distal surface 26. Providing interior welds 60 with a diameter D (e.g., by providing protrusions 72A, 72B or 172A, 172B with a contact surface diameter D or by printing blocker ink around a circle of diameter D) and a distance D1 between centers C in the ranges set forth helps to prevent such curling.

The strobel 10 may be a first strobel corresponding to a first footwear size. The first footwear size may be indicated by a first length L1 from the foremost extent 35 to the rearmost extent 37, and/or a first width Y1 from the medial side 31 to the lateral side 33 at, for example, the sixteenth row R16, which may generally correspond with one of the widest areas of the strobel 10, configured to correspond with the metatarsal joints of a wearer's foot. A second strobel 110, shown in FIG. 32, may be manufactured according to the same method 200. Accordingly, the portion 200A of the method 200 discussed herein may include manufacturing a second strobel 110 corresponding to a second footwear size larger than the first footwear size by welding the same or different sheets 28, 30 to one another in the pattern of rows and columns included in the first strobel and with at least one additional row and/or column to form a polymeric bladder 116 otherwise identical to the polymeric bladder 16.

For example, the strobel 110 is of a second footwear size indicated by a second length L2 from the foremost extent 35 to the rearmost extent 37, where the second length L2 is greater than the first length L1, and/or a second width Y2 from the medial side 31 to the lateral side 33 that is greater than the first width Y1 when measured at the same row of each strobel 10, 110 (e.g., the sixteenth row R16). The interior welds 60 of the strobel 110 include all of the twenty-two rows and eleven columns of the first strobel 10 including the same pattern of interior welds 60 of the rows and columns, and also includes an additional interior weld 60 in each of the twentieth and twenty-second rows R20, R22, referred to with reference numeral 60A for clarity, as well as an additional row (the twenty-third row R23), with four interior welds referred to with reference numeral 60B for clarity. The additional interior welds 60A, 60B retain the pattern of offset rows and columns and have the same relative spacing as the interior welds 60 of the strobel 10, while maintaining the same overall maximum height in the Z direction when inflated as strobel 10.

Referring to FIGS. 5-11 and 33, although securing the strobel 10 to the upper 14 is not limited to stitching, the strobel 10 may be secured to the upper 14 by a series of stitches 82 extending through the peripheral flange 20 in the groove 22 (only some of the stitches 82 indicated by reference number). The stitching may occur prior to placing a last 84 in the opening 86 formed by the upper 14 (indicated in FIGS. 46 and 49). Stated differently, the upper 14 is not placed over the last 84 until after it has been secured to the strobel 10. It is desirable for manufacturing efficiency that securing the strobel 10 to the upper 14 is done accurately and relatively quickly. The groove 22 in the peripheral flange 20 helps to expedite the stitching process by serving as a visual path for the operator and/or a machine, including a robotic machine, to follow during the stitching process.

In FIGS. 5-11, various ways of stitching the strobel 10 to the upper 14 are shown. Although illustrated with respect to strobel 10, the various arrangements are also applicable to the strobel 110 and to any of the other strobels shown and described herein. In FIG. 5, an edge 88 of the upper 14 is abutted against the peripheral flange 20, and the stitches 82 extend through the peripheral flange 20 at the groove 22 (i.e., through both of the polymeric sheets 28, 30 at the peripheral flange 20), and are looped through the upper 14 and around an outer edge 90 of the peripheral flange 20. The strobel 10 is moved relative to the stitching needle, or vice versa so that the needle moves along the groove 22 with the stitches 82 proceeding along the groove 22 and around the polymeric bladder 16.

FIG. 6 shows another stitching arrangement in which the upper 14 is stacked on the peripheral flange 20 on the opposite side of the peripheral flange 20 from the groove 22 (i.e., on the proximal surface 24), and the stitches 82 extend through the upper 14, and both of the polymeric sheets 28, 30 at the groove 22, and proceed along the peripheral flange 20 in the groove 22. FIG. 7 shows another stitching arrangement in which the upper 14 is stacked on the peripheral flange 20 on the same side of the flange 20 as the groove 22 (i.e., on the distal surface 26), and the stitches 82 extend through the upper 14, and both of the polymeric sheets 28, 30 at the groove 22, and proceed along the peripheral flange 20 in the groove 22.

Figure 8:
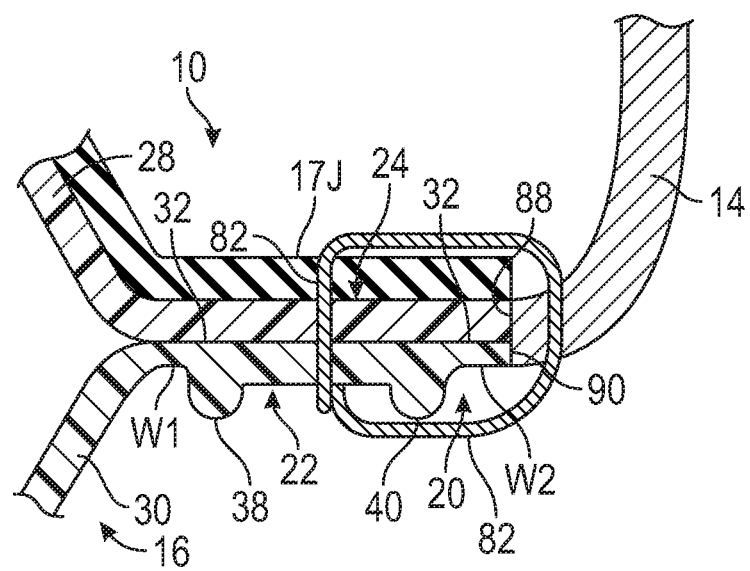
FIG. 8 is a schematic illustration in fragmentary cross-sectional view of the flange of the strobel of FIG. 1, a lasting component overlaying the strobel, and an upper stitched to the flange and to the lasting component.

FIGS. 8-29 show additional arrangements of securing a strobel to the upper 14 by including one or more lasting components that may be of a substantially inelastic material such as utilized for a traditional strobel. Stated differently, the strobels of FIGS. 8-19 include not only a polymeric bladder with the flange 20 as described herein, but also include a lasting component. More specifically, in a non-limiting example, the lasting component may be one or more of a woven or non-woven textile, an elastomer, or foam backed with a textile layer. The lasting component is thinner (i.e., less tall) than the height of the polymeric bladder and may be generally easier to grip than the bladder during stitching of the strobel to the footwear upper 14. By adding one or more lasting components, stress on the bladder (such as due to the stitches 82) may be minimized. In FIG. 8, a lasting component 17J overlays the entire bladder 16, including the flange 20 at the proximal surface 24. The upper 14 is stitched to the flange 20 in the groove 22 and to the lasting component 17J by the series of stitches 82.

Figure 9:
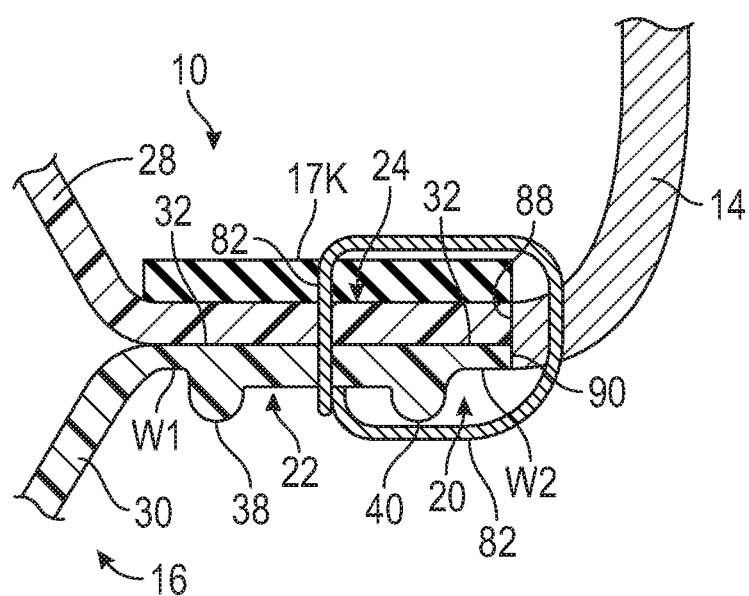
FIG. 9 is a schematic illustration in fragmentary cross-sectional view of the flange of the strobel of FIG. 1, a lasting component overlaying the flange, and an upper stitched to the flange and to the lasting component.

In FIG. 9, a lasting component 17K overlays only the flange 20 rather than the entire bladder 16. For example, the lasting component 17K may be an elongated strip in the shape of the flange 20 as it appears in FIG. 3 and may encircle the interior cavity 18 outward of the interior cavity 18. Alternatively, the lasting component 17K could underlie the flange 20. The upper 14 is stitched to the flange 20 in the groove 22 and to the lasting component 17K by the series of stitches 82.

Figure 10:
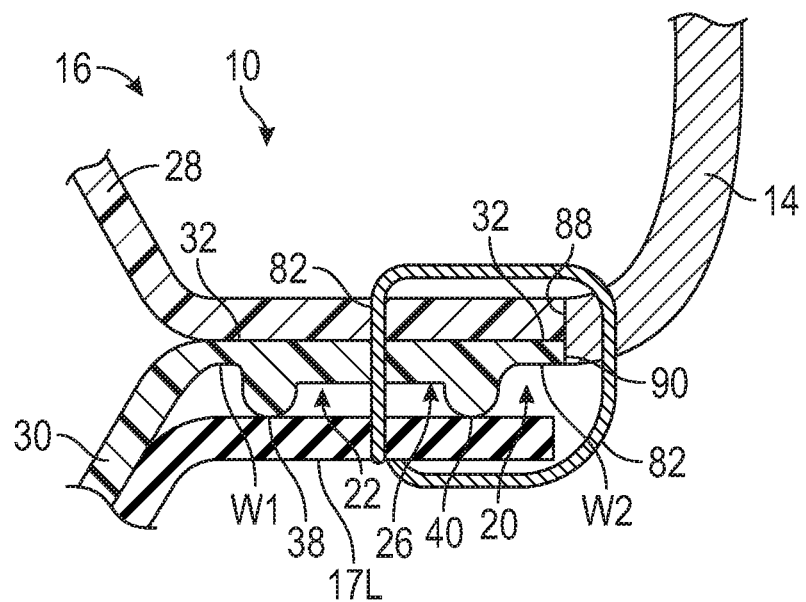
FIG. 10 is a schematic illustration in fragmentary cross-sectional view of the flange of the strobel of FIG. 1, a lasting component underlying the strobel, and an upper stitched to the flange and to the lasting component.
Figure 11:
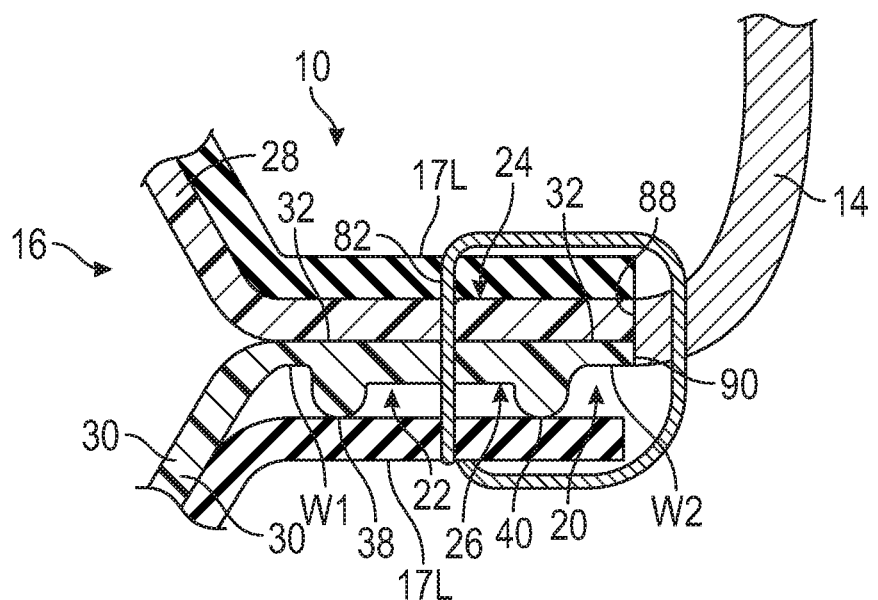
FIG. 11 is a schematic illustration in fragmentary cross-sectional view of the flange of the strobel of FIG. 1, a first lasting component overlaying the strobel, a second lasting component underlying the strobel, and an upper stitched to the flange and to the first and second lasting components.

In FIG. 10, a lasting component 17L underlies the entire bladder 16 at the distal surface 26, and the upper 14 is stitched to the flange 20 in the groove 22 and to the lasting component 17L by the series of stitches 82. In FIG. 11, a first lasting component 17L like that of FIG. 8 overlays the entire bladder 16 including the flange 20, and a second lasting component 17L like that of FIG. 10 underlies the entire bladder 16 including the flange 20. The upper 14 is stitched to the flange 20 in the groove 22 and to the first and second lasting components 17L by the series of stitches 82.

FIGS. 12-29 show various embodiments of strobels 10, 10AA, 10A, 10B, 10C, 10D, 10E, 10F, 10G, 10H, 10I, within the scope of the present teachings. The strobels each include a polymeric bladder 16, 16A, 16B, 16D, 16E, 16F, 16G, 16H, or 16I configured with a flange 20 having a groove 22, as described with respect to FIGS. 1-4. The strobels each also include a lasting component that is secured to the polymeric bladder. The polymeric bladder and the lasting component secured to the polymeric bladder together constitute a formed strobel that is subsequently secured to an upper as described herein.

Figure 14:
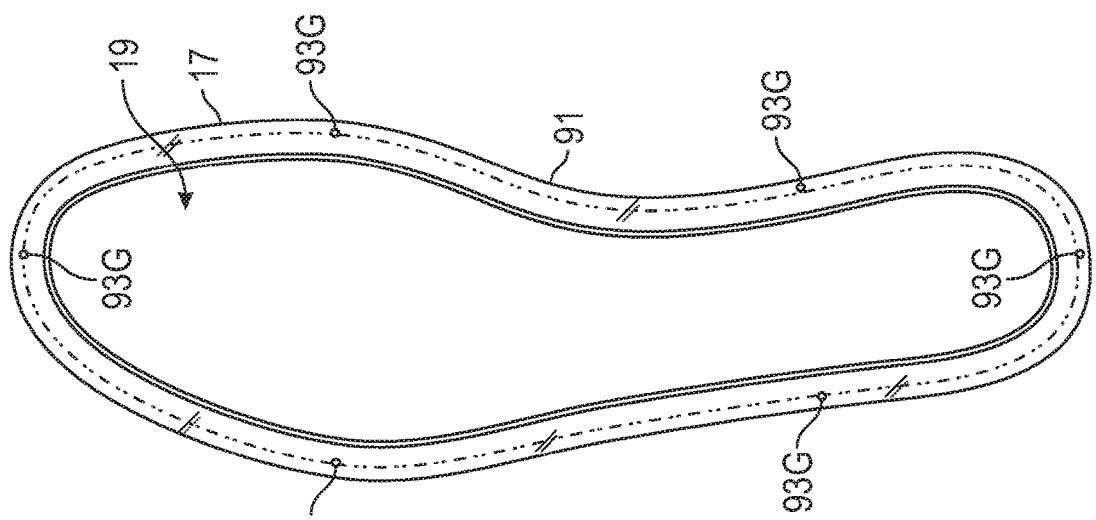
FIG. 14 is a schematic illustration in bottom view of the lasting component of FIG. 12
Figure 13:
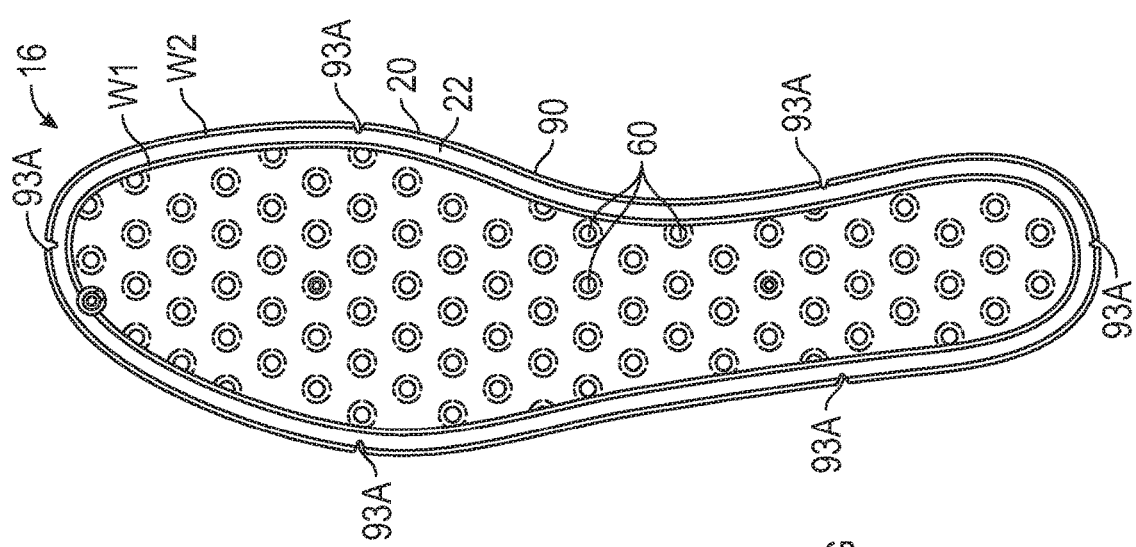
FIG. 13 is schematic illustration in bottom view of the polymeric bladder of FIG. 12.
Figure 12:
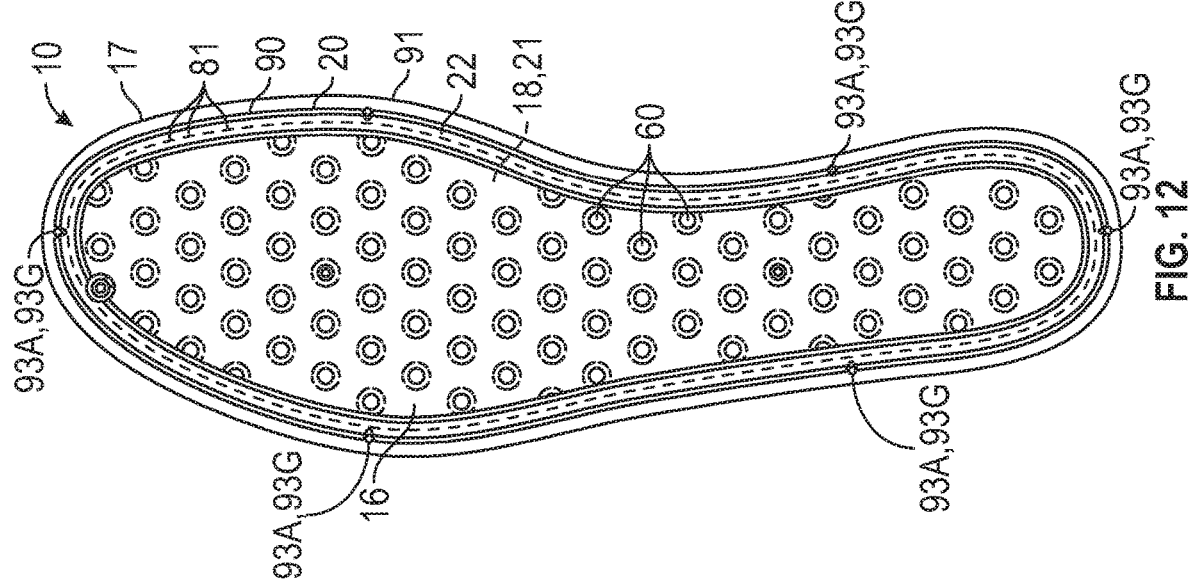
FIG. 12 is a schematic illustration in bottom view of a strobel including the polymeric bladder of FIG. 1 and a lasting component stitched to a peripheral flange of the polymeric bladder.

Referring to FIGS. 12-14, a strobel 10 includes the polymeric bladder 16 of FIGS. 1-4 and a lasting component 17 secured to the peripheral flange 20. As shown in FIG. 14, the lasting component 17 has an aperture 19. The aperture 19 is sized so that the polymeric bladder 16 extends partially through the aperture 19, and the peripheral flange 20 abuts the lasting component 17 around the aperture 19. For example, as shown in FIG. 12 (which is a bottom view), the lasting component 17 overlays and abuts the flange 20, and a portion of the second polymeric sheet 30 at the inflated portion of the polymeric bladder 16 extends through the aperture 19. The outer edge 90 of the flange 20 extends laterally outward of the aperture 19, and an outer edge 91 of the lasting component 17 extends laterally outward of the outer edge 90 of the flange 20. The outer edge 90 falls along the phantom boundary 91A in FIG. 14. Stated differently, the polymeric bladder 16 is wider than the aperture 19, and the lasting component 17 is wider than the polymeric bladder 16. The lasting component 17K of FIG. 9 is alike in all aspects as lasting component 17 except that it is the same width as the polymeric bladder 16 so that its outer edge 91 is aligned with the outer edge 90 of the polymeric bladder 16.

The lasting component 17 is configured to extend along the peripheral flange 20 around the perimeter 21 (indicated in FIG. 1) of the interior cavity 18 of the bladder 16. In the embodiment of FIGS. 12-14, the lasting component 17 has a forefoot region, a midfoot region, and a heel region corresponding with the forefoot region 25, the midfoot region 27, and the heel region 29 of the polymeric bladder 16 indicated in FIG. 3. The aperture 19 and the polymeric bladder 16 extend in each of the forefoot region 25, the midfoot region 27, and the heel region 29.

Figure 33:
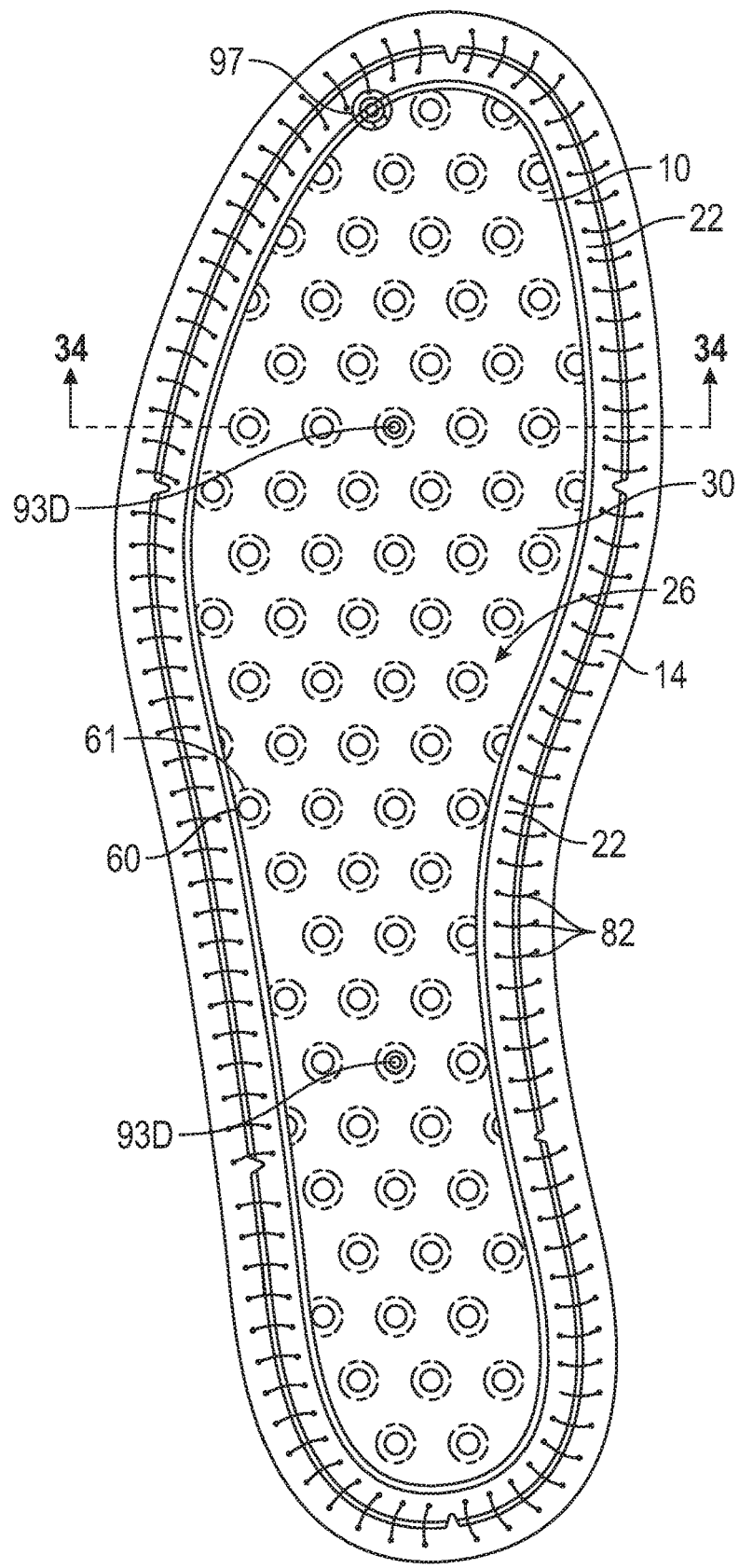
FIG. 33 is a schematic illustration in bottom view of the upper and strobel of FIG. 5.

The lasting component 17 has locating features 93G that may be apertures or markings in the lasting component 17, or notches in or protrusions at the outer edge of the lasting component 17 that are spaced from one another with the same relative spacing as the notches 93A or other locating features of the polymeric bladder 16. The locating features 93A are aligned with the locating features 93G when the polymeric bladder 16 is placed at the aperture 19. This positions the flange 20 correctly relative to the lasting component 17 for subsequent stitching through the flange 20. Alternatively, instead of or in addition to notches 93A, locating features on the polymeric bladder 16 may be one or more apertures 93D punched or otherwise provided through the bladder 16, as shown in FIG. 33.

The lasting component 17 is stitched or otherwise secured to the polymeric bladder 16 with stitches 81 that extend through the flange 20 at the groove 22. The groove 22 serves as a guide path for an operator or for a machine, including a robotic machine, to follow when stitching or otherwise securing the lasting component 17 to the polymeric bladder 16. As shown in FIG. 12, a first series of stitches 81 extend through the lasting component 17 and through the peripheral flange 20 in the groove 22 and secure the lasting component 17 to the polymeric bladder 16. The first series of stitches 81 and the groove 22 both extend completely around and outward of the perimeter 21 of the interior cavity 18 of the polymeric bladder 16. Only some of the stitches 81 are indicated with a reference number. The strobel 10 having the polymeric bladder 16 secured to the lasting component 17 may then be secured to the upper 14 by a second series of stitches that extend through the lasting component 17 and through the upper 14, but not through the polymeric bladder 16 (e.g., may extend through the lasting component 17 outward of the flange 20, or by a second series of stitches that extend through both the flange 20 and the lasting component 17 like the stitches 82 of FIG. 9.

Figure 17:
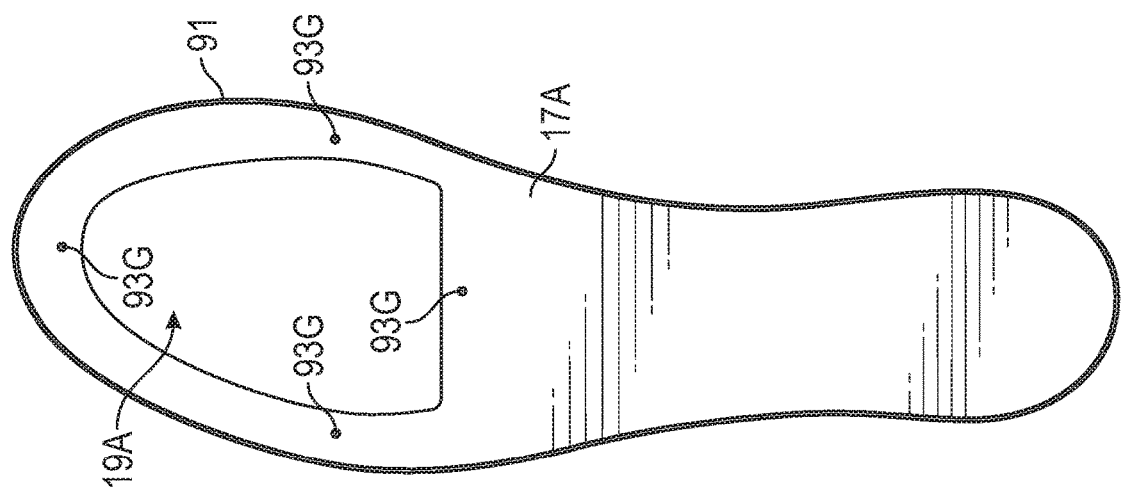
FIG. 17 is a schematic illustration in bottom view of the lasting component of FIG. 15.
Figure 16:
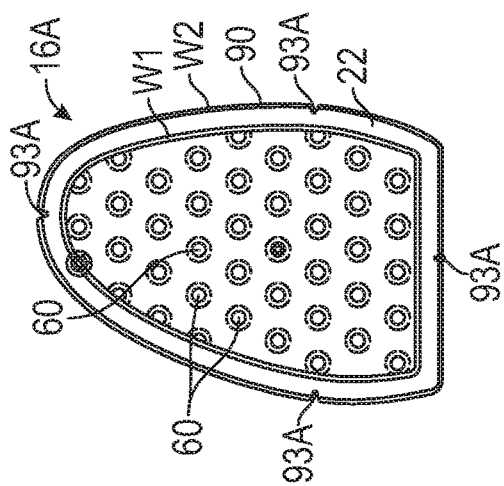
FIG. 16 is a schematic illustration in bottom view of the polymeric bladder of FIG. 15.
Figure 15:
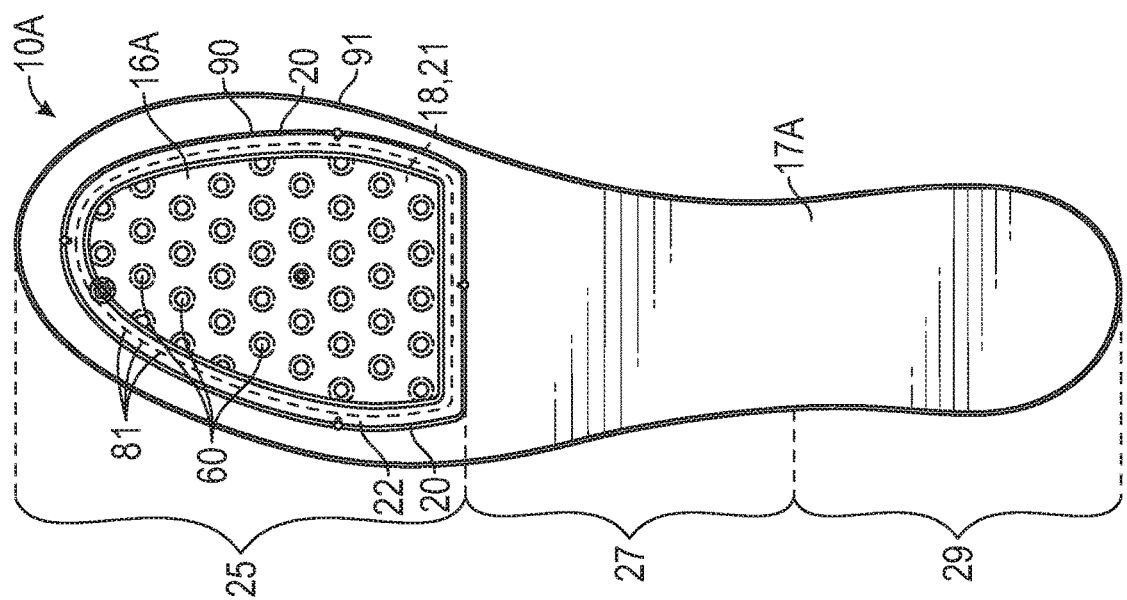
FIG. 15 is a schematic illustration in bottom view of a strobel including a polymeric bladder and a lasting component stitched to the polymeric bladder.

FIGS. 15-17 show another embodiment of a strobel 10A that includes a polymeric bladder 16A and a lasting component 17A secured to the peripheral flange 20 of the polymeric bladder 16A by a first series of stitches 81 that extend through the peripheral flange 20 and the lasting component 17A. The first series of stitches 81 and the groove 22 both extend completely around and outward of the perimeter 21 of interior cavity 18.

As shown in FIG. 17, the lasting component 17A has an aperture 19A. The aperture 19A is sized so that the polymeric bladder 16A extends partially through the aperture 19A, and the peripheral flange 20 abuts the lasting component 17A around the aperture 19A. The outer edge 90 of the flange 20 extends laterally outward of the aperture 19A, and an outer edge 91 of the lasting component 17A extends laterally outward of the outer edge 90 of the flange 20.

The lasting component 17A is configured to extend along the peripheral flange 20 around the perimeter 21 of the interior cavity 18 of the bladder 16A. In the embodiment of FIGS. 15-17, the lasting component 17A has a forefoot region 25, a midfoot region 27, and a heel region 29. The aperture 19A extends in the forefoot region 25 and may extend partially in the midfoot region 27. The polymeric bladder 16A is configured to extend in the forefoot region 25, and partially in the midfoot region 27 if the aperture extends into the midfoot region 27 but does not extend in the heel region 29.

The lasting component 17A has locating features 93G that may be apertures in or markings on the lasting component 17A, or notches in or protrusions at the inner peripheral edge of the lasting component 17A bounding the aperture 19A, that are spaced from one another with the same relative spacing as the notches 93A or other locating features of the polymeric bladder 16A. The locating features 93A are aligned with the locating features 93G when the polymeric bladder 16A is placed at the aperture 19A. Similar to lasting component 17, the lasting component 17A is stitched or otherwise secured to the polymeric bladder 16A with a first series of stitches 81 that extend through the flange 20 at the groove 22. The first series of stitches 81 and the groove 22 both extend completely around and outward of the perimeter 21 of interior cavity 18 of the polymeric bladder 16A. Similar to strobel 10, the strobel 10A having the polymeric bladder 16A secured to the lasting component 17A may be secured to the upper 14 by a second series of stitches 82 that extend through the lasting component 17A and the upper 14 but not through the polymeric bladder 16A.

FIGS. 18-20 show another embodiment of a strobel 10B that includes a polymeric bladder 16B and a lasting component 17B secured to the peripheral flange 20 of the polymeric bladder 16B by a first series of stitches 81 that extend through the peripheral flange 20 and the lasting component 17B. The first series of stitches 81 and the groove 22 both extend completely around and outward of the perimeter 21 of interior cavity 18.

As shown in FIG. 20, the lasting component 17B has an aperture 19B. The aperture 19B is sized so that the polymeric bladder 16B extends partially through the aperture 19B, and the peripheral flange 20 abuts the lasting component 17B around the aperture 19B, similarly to lasting component 17 and flange 20 shown in FIG. 25. The outer edge 90 of the flange 20 extends laterally outward of the aperture 19B, and an outer edge 91 of the lasting component 17B extends laterally outward of the outer edge 90 of the flange 20.

The lasting component 17B is configured to extend along the peripheral flange 20 around the perimeter 21 of the interior cavity 18. In the embodiment of FIGS. 18-20, the lasting component 17B has a forefoot region 25, a midfoot region 27, and a heel region 29. The aperture 19B extends in the heel region 29. The polymeric bladder 16B is configured to extend in the heel region 29 but does not extend in the midfoot region 27 or forefoot region 25.

The lasting component 17B has locating features 93G that may be apertures in or markings on the lasting component 17B, or notches in or protrusions at the inner peripheral edge of the lasting component 17B bounding the aperture 19B, that are spaced from one another with the same relative spacing as the notches 93A or other locating features of the polymeric bladder 16B. The locating features 93A are aligned with the locating features 93G when the polymeric bladder 16B is placed at the aperture 19B. The first series of stitches 81 and the groove 22 both extend completely around and outward of the perimeter 21 of interior cavity 18 of the polymeric bladder 16B. Similar to strobel 10, the strobel 10B having the polymeric bladder 16B secured to the lasting component 17B may be secured to the upper 14 by a second series of stitches 82 that extend through the lasting component 17B and through the upper 14, but not through the polymeric bladder 16B.

FIGS. 21-23 show another embodiment of a strobel 10C that includes the polymeric bladder 16 and a lasting component 17C secured to the peripheral flange 20 of the polymeric bladder 16 by a first series of stitches 81 that extend through the peripheral flange 20 and the lasting component 17C. The first series of stitches 81 and the groove 22 both extend completely around and outward of the perimeter 21 of interior cavity 18.

As shown in FIG. 21, the lasting component 17C is sized so that the peripheral flange 20 abuts the surface of the lasting component 17C, and the lasting component 17C overlays and extends across the polymeric bladder 16 between a medial side of the polymeric bladder 16 and a lateral side of the polymeric bladder 16. As best shown in FIG. 21, the outer edge 90 of the flange 20 is aligned with the outer edge 91 of the lasting component 17C as the polymeric bladder 16 and the lasting component 17C are the same width. The lasting component 17C is configured to extend along the peripheral flange 20 around the perimeter 21 of the interior cavity 18 and over one side of the bladder 16 (e.g., over the top of the bladder 16 or under the bottom of the bladder 16 depending upon the side of the bladder on which the lasting component 17C is disposed). In the embodiment of FIGS. 21-23, the lasting component 17C and the polymeric bladder 16 both have a forefoot region 25, a midfoot region 27, and a heel region 29, and the lasting component 17C does not have an aperture through which the polymeric bladder 16 extends.

The lasting component 17C has locating features 93G that are apertures or notches in or protrusions at the outer periphery of the lasting component 17C spaced from one another with the same relative spacing as the notches 93A or other locating features of the polymeric bladder 16. The locating features 93A are aligned with the locating features 93G when the lasting component 17C is placed against the polymeric bladder 16, and the lasting component 17C is stitched to the polymeric bladder 16 with a first series of stitches 81 that extend through the flange 20 and the lasting component 17C at the groove 22. The first series of stitches 81 and the groove 22 both extend completely around and outward of the perimeter 21 of interior cavity 18 of the polymeric bladder 16. The strobel 10C is secured to the upper 14 by a second series of stitches that extend through the lasting component 17C and through the upper 14, and also through the flange 20 of the polymeric bladder 16 in the groove 22 similar to stitches 82 in FIG. 8. Both the first series of stitches 81 and the second series of stitches 82 extend through the polymeric bladder 16 in the groove 22.

In some embodiments, both the lasting component and the polymeric bladder extend the entire width of the strobel, but neither extends the entire length, and the lasting component and the polymeric bladder are arranged longitudinally along the strobel. For example, in the embodiments of FIGS. 24-29, the polymeric bladder and the lasting component are each disposed in at least one different one of a forefoot region, a midfoot region, and a heel region of the strobel, and the lasting component is secured to the polymeric bladder by a first series of stitches extending transversely across the polymeric bladder and the lasting component.

Figure 24:
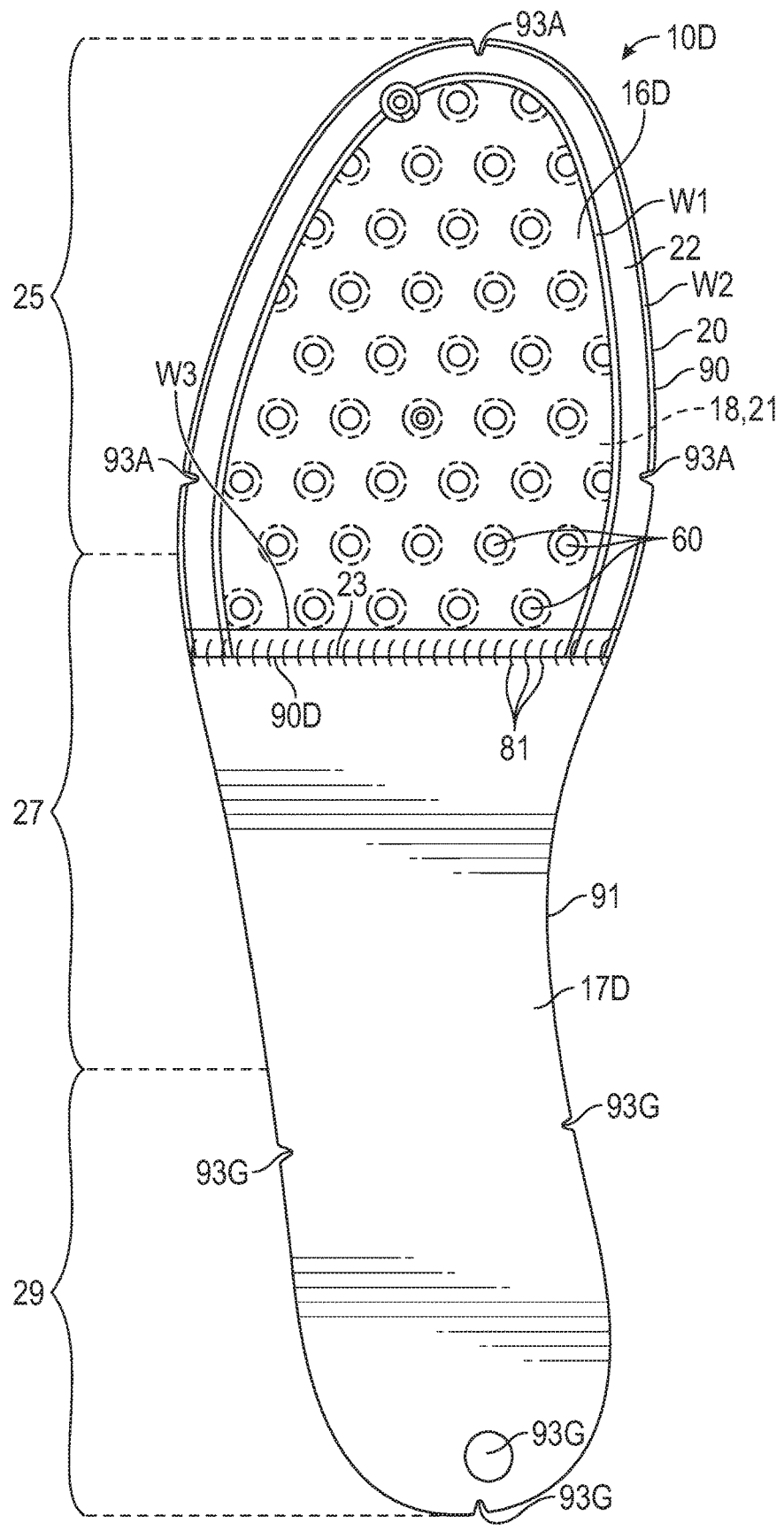
FIG. 24 is a schematic illustration in bottom view of a strobel including a polymeric bladder and a lasting component stitched to the polymeric bladder.

Referring to FIG. 24, the polymeric bladder 16D is disposed in the forefoot region 25 and may extend slightly into the midfoot region 27. The lasting component 17D extends in the heel region 29 and in the midfoot region 27 where a forward transverse edge 23 of the lasting component 17D abuts or slightly overlaps a rearward transverse edge 90D of the polymeric bladder 16D. The groove 22 does not extend across the polymeric bladder 16D (e.g., from the medial side to the lateral side) at the rearward transverse edge 90D. The polymeric bladder 16D may be formed by cutting the polymeric bladder 16 and adding a transversely-extending weld W3 to seal the interior cavity 18 where cut. The first series of stitches 81 extends transversely across the strobel 10D through the polymeric bladder 16D rearward of the weld W3 to secure the lasting component 17D to the polymeric bladder 16D. A subsequent second series of stitches to secure the strobel 10D to the upper 14 would extend through the polymeric bladder 16D in the groove 22 around the polymeric bladder 16D to the rearward transverse edge 90D and would continue around the periphery of the lasting component 17D near the outer edge 91, rearward of the series of stitches 81.

The locating features of the polymeric bladder 16D (e.g., the notches 93A) and locating features 93G of the lasting component 17D are used to align the strobel 10D to the upper 14 when the strobel 10D is secured to the upper 14. The outer edge 90 of the polymeric bladder 16D forms the outer edge of the strobel 10D in the forefoot region 25 and in a forward part of the midfoot region 27, and the outer edge 91 of the lasting component 17D forms the outer edge of the strobel 10D in the rearward part of the midfoot region 27 and in the heel region 29. In the forefoot region 25, the strobel 10D includes only the polymeric bladder 16D. In the heel region, the strobel 10D includes only the lasting component 17D. An article of footwear may include a sole structure such as the midsole 83 of FIG. 50 secured to the distal side of the polymeric bladder 16D and a lower extent of the upper 14 at the polymeric bladder 16D, and to the distal side of the lasting component 17D and a lower extent of the upper 14 at the lasting component 17D.

Figure 25:
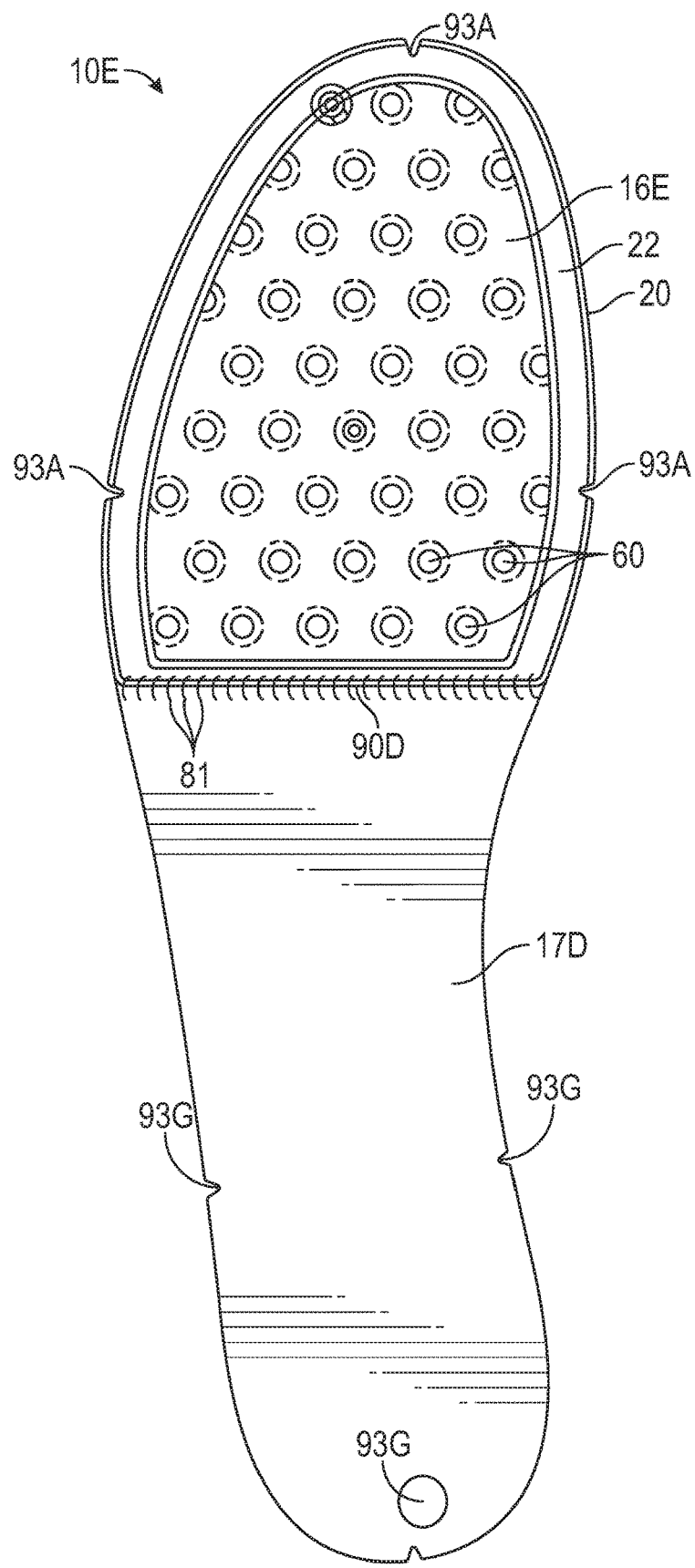
FIG. 25 is a schematic illustration in bottom view of a strobel including a polymeric bladder and a lasting component stitched to the polymeric bladder.

FIG. 25 shows a strobel 10E configured the same as described with respect to strobel 10D except that the polymeric bladder 16D is replaced with a polymeric bladder 16E that has a flange 20 with a groove 22 that extends completely around the polymeric bladder 16E, including at the rearward transverse edge 90D. In other words, the polymeric bladder 16E is formed to the size shown, rather than being cut from a longer polymeric bladder 16 and then welded at weld W3. The first series of stitches 81 securing the lasting component 17D at the rearward transverse edge 90D extend through the flange 20 at the groove 22.

Figure 26:
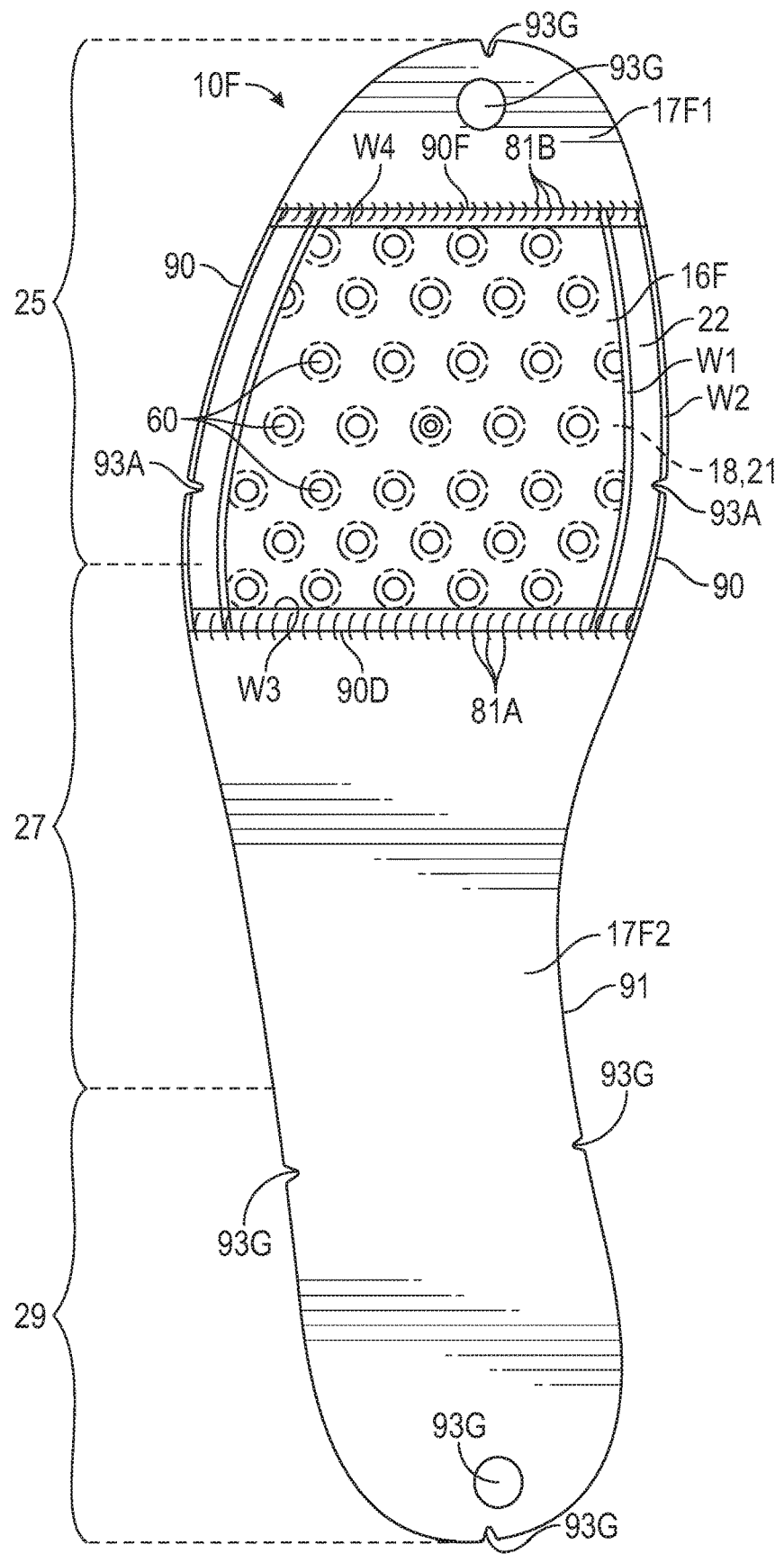
FIG. 26 is a schematic illustration in bottom view of a strobel including a polymeric bladder and a lasting component stitched to the polymeric bladder.

FIG. 26 shows a strobel 10F with a polymeric bladder 16F cut from the polymeric bladder 16 at rearward transverse edge 90D and also at a forward transverse edge 90F. The polymeric bladder 16F is welded at weld W3 and also at weld W4 to seal the interior cavity 18. The first series of stitches includes stitches 81A that extend transversely across the strobel 10F through the polymeric bladder 16F rearward of the weld W3 to secure a rear lasting component 17F2 to the polymeric bladder 16F. The first series of stitches also includes stitches 81B that extend transversely across the strobel 10F through the polymeric bladder 16F forward of the weld W4 to secure a front lasting component 17F1 to the polymeric bladder 16F. A subsequent second series of stitches to secure the strobel 10F to the upper 14 would extend through the polymeric bladder 16F in the groove 22 at the medial side and the lateral side of the polymeric bladder 16F and would continue around rear lasting component 17F2 near the outer edge 91 rearward of the series of stitches 81A, and around the lasting component 17F1 forward of the stitches 81B. The outer edges 91 of the lasting components 17F1 and 17F2 and the outer edges 90 of the polymeric bladder 16F form the outer edge of the strobel 10F. The lasting components 17F1, 17F2 each have at least one locating feature 93G that is an aperture or a notch (or a protrusion or marking) that can be aligned with similarly spaced locating features on the upper 14, as can notches 93A or other locating features in the polymeric bladder 16F, when the strobel 10F is stitched to the upper 14.

Figure 27:
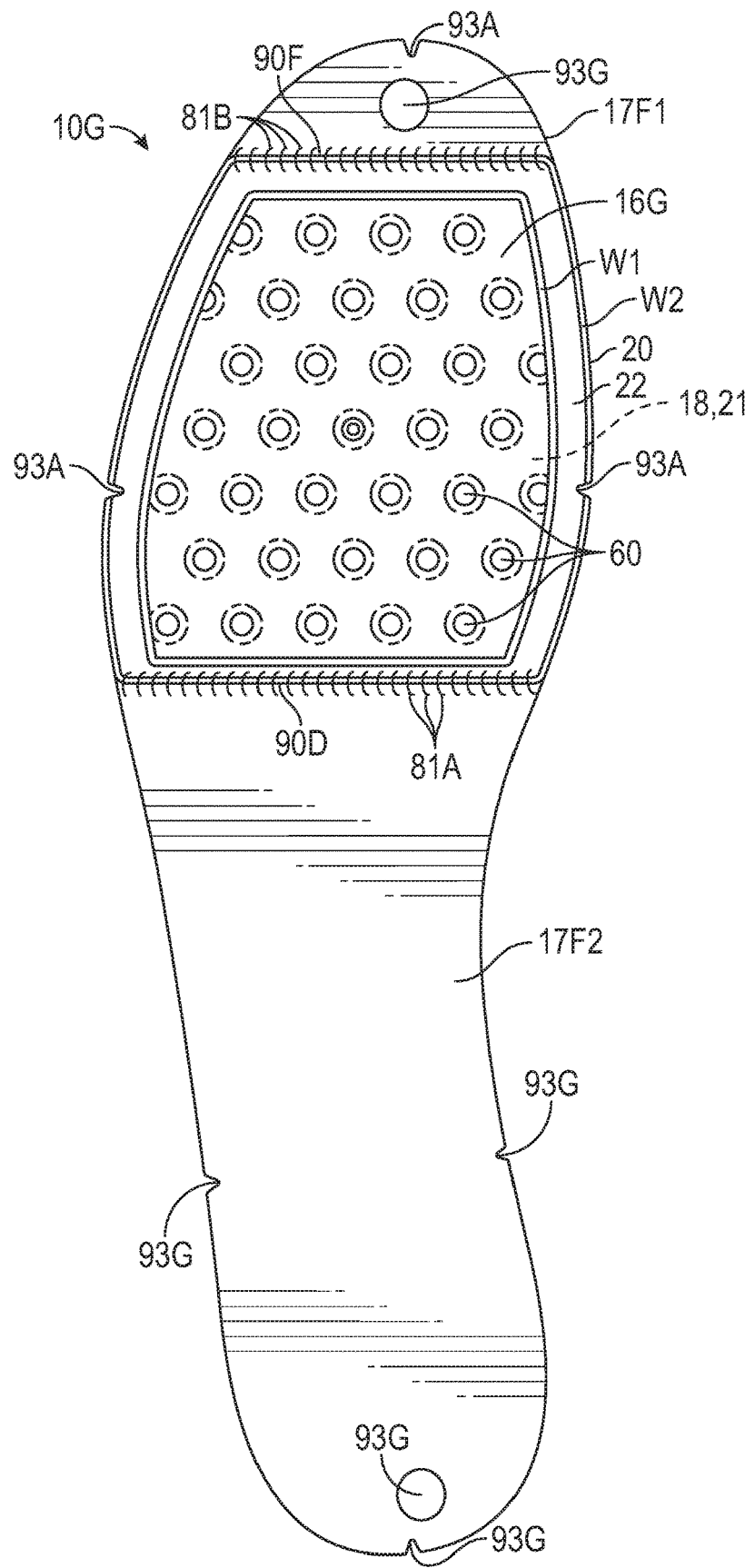
FIG. 27 is a schematic illustration in bottom view of a strobel including a polymeric bladder and a lasting component stitched to the polymeric bladder.

FIG. 27 shows a strobel 10G configured the same as described with respect to strobel 10F except that the polymeric bladder 16F is replaced with a polymeric bladder 16G that has a flange 20 with a groove 22 extending completely around the polymeric bladder 16G, including at the rearward transverse edge 90D and the forward transverse edge 90F. In other words, the polymeric bladder 16G is formed to the size shown, rather than being cut from a longer polymeric bladder 16 and then welded at welds W3 and W4. The first series of stitches 81A, 81B securing the lasting components 17F2, 17F1 at the rearward transverse edge 90D and the forward transverse edge 90F, respectively, extend through the flange 20 at the groove 22.

Figure 28:
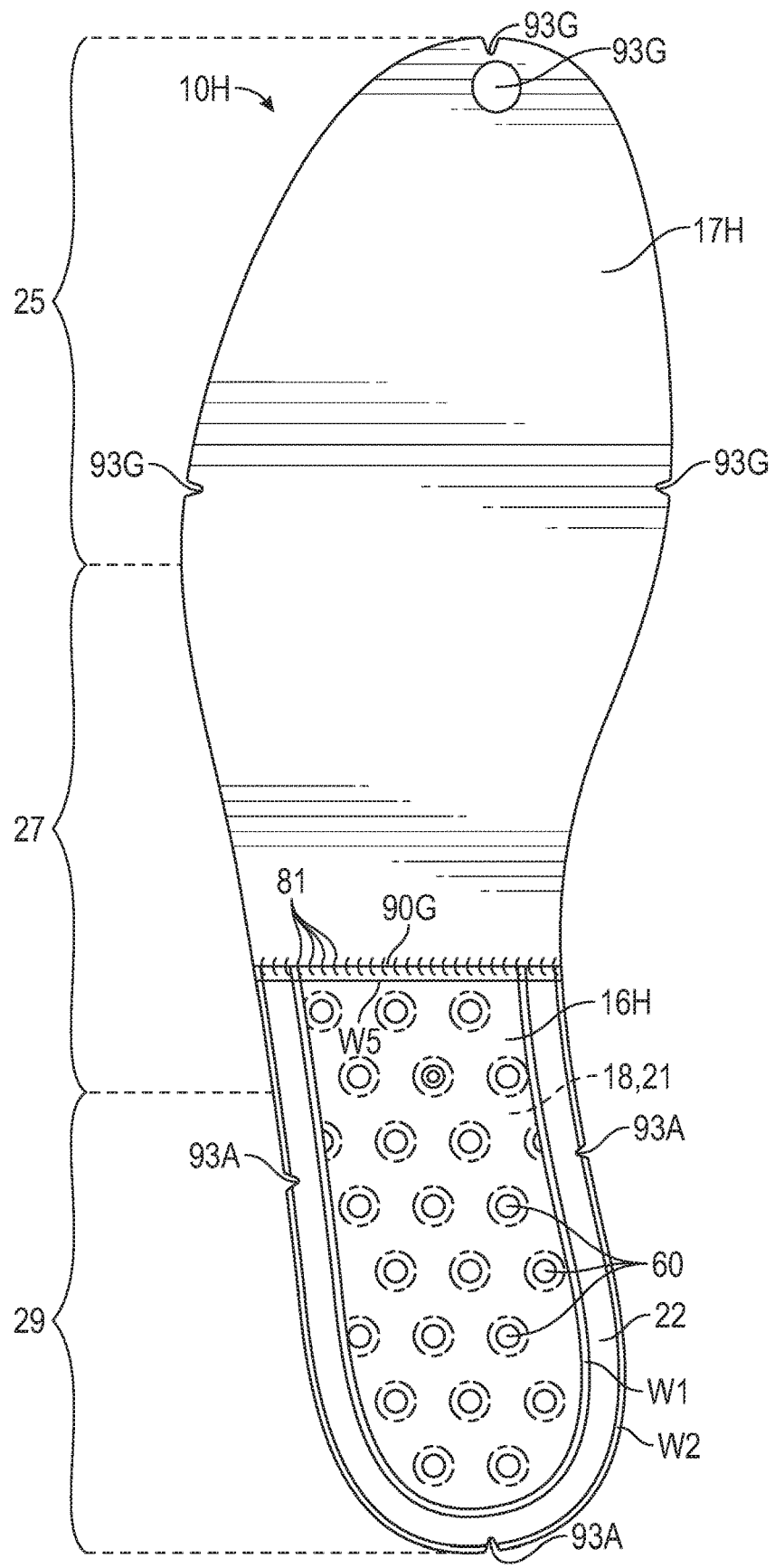
FIG. 28 is a schematic illustration in bottom view of a strobel including a polymeric bladder and a lasting component stitched to the polymeric bladder.

FIG. 28 shows a strobel 10H configured similarly to strobel 10D except that the polymeric bladder 16H is in the heel region 29 and a rear portion of the midfoot region 27, and the lasting component 17H is in the forefoot region 25 and a forward portion of the midfoot region 27. The polymeric bladder 16H may be cut from the polymeric bladder 16 and welded at transverse weld W5 to seal the interior cavity 18, and then the lasting component 17H is stitched to the polymeric bladder 16H at a forward transverse edge 90G of the polymeric bladder 16H with a first series of stitches 81 that extend transversely across the strobel 10H from the medial side to the lateral side of the polymeric bladder 16H, and are forward of the weld W5.

Figure 29:
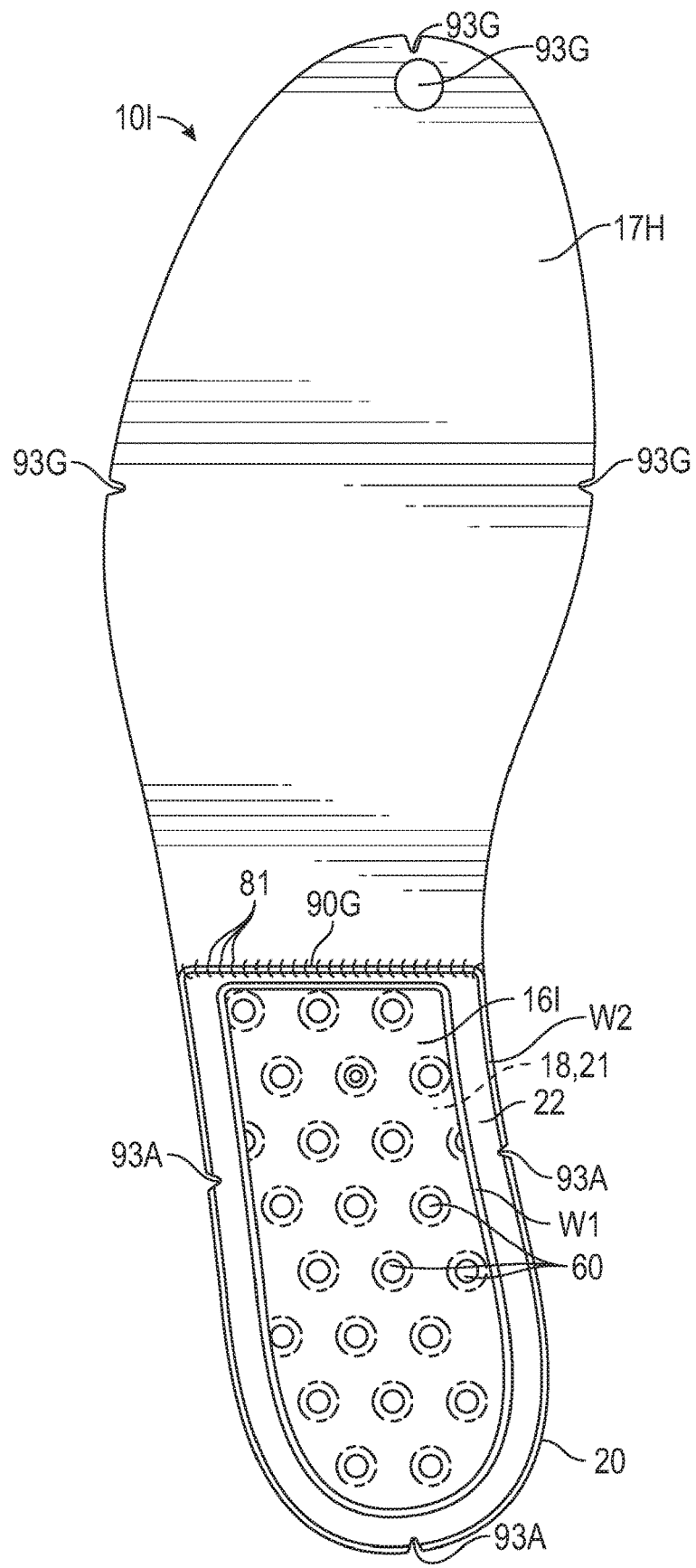
FIG. 29 is a schematic illustration in bottom view of a strobel including a polymeric bladder and a lasting component stitched to the polymeric bladder.

FIG. 29 shows a strobel 10I configured the same as described with respect to strobel 10H except that the polymeric bladder 16H is replaced with a polymeric bladder 16I that has a flange 20 with a groove 22 extending completely around the polymeric bladder 16I, including at the forward transverse edge 90G. In other words, the polymeric bladder 16I is formed to the size shown, rather than being cut from a longer polymeric bladder 16 and then welded at weld W5. The first series of stitches 81 securing the lasting component 17H to the polymeric bladder 16I extend through the flange 20 at the groove 22 near the forward transverse edge 90G.

In the articles of footwear described herein, the polymeric bladders may be secured directly to the upper 14 by stitches (such as stitches 82) extending through the flange 20 at the groove 22. These configurations will tend to constrain the polymeric bladder in the X-Y plane during dynamic compression to a greater extent than will configurations in which the polymeric bladder is not directly secured to the upper 14 but is instead secured to a lasting component by a first series of stitches (such as stitches 81) and then the lasting component is secured to the upper by a second series of stitches (such as stitches 82) that extend only through the lasting component and the upper 14.

Figure 49:
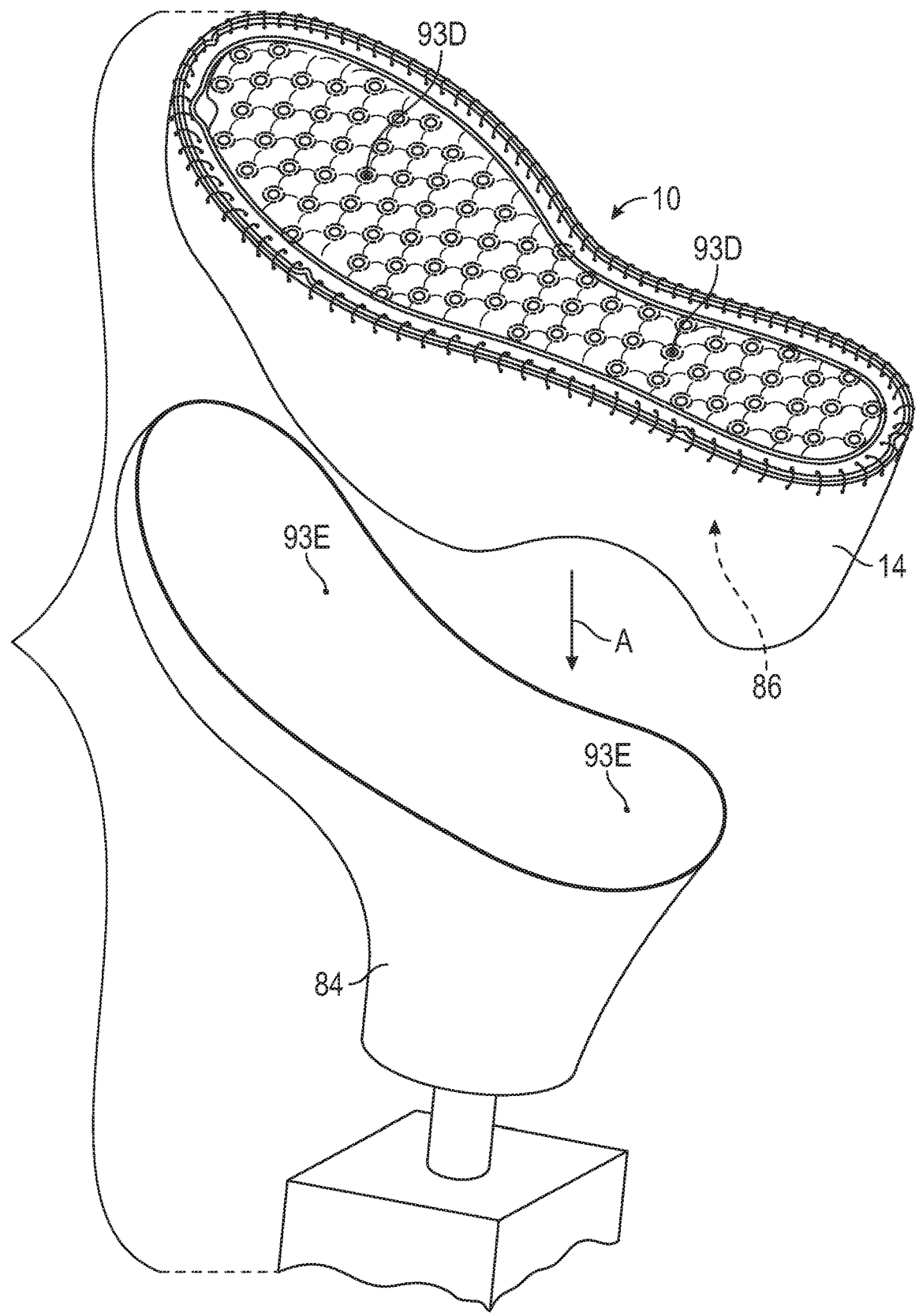
FIG. 49 is a schematic illustration of the strobel and upper of FIG. 48 being moved toward a footwear last.

In each of the embodiments described herein, the strobel may be secured to the upper 14 as described, prior to placing a last 84 in the opening 86 formed by the upper 14 as illustrated in FIG. 49. Stated differently, the upper 14 is not placed over the last 84 until after it has been secured to the strobel. It is desirable for manufacturing efficiency that securing the strobel to the upper 14 is done accurately and relatively quickly. During this process, the strobel is moved relative to the stitching needle, or vice versa so that the needle moves along and the stitches 82 proceed along the lasting component and/or the groove 22 (depending on the embodiment, as described herein).

Figure 36:
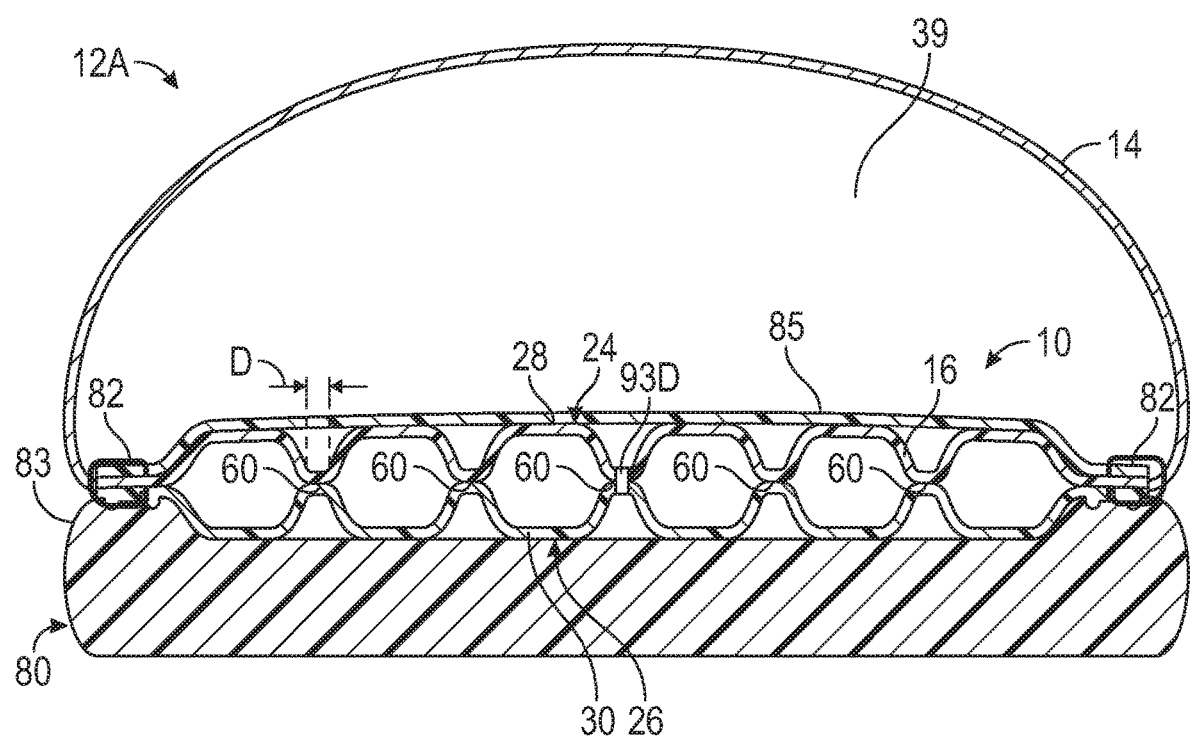
FIG. 36 is a schematic cross-sectional view of the article of footwear of FIG. 34 including an added layer overlying the strobel.

FIG. 36 shows an embodiment of the footwear 12A in which a protective cover layer 85 is secured over the proximal side of the strobel 10. The protective cover layer 85 will thus be disposed within the foot-receiving cavity 39. The protective cover layer 85 may be an abrasion resistant material to protect the bladder 16 from shear forces and/or from sharp objects. The protective cover layer may be formed from, for example, a polymeric sheet, a fabric layer, or other protective layer that may protect the bladder 16 from shear forces (e.g., by minimizing (or keeping sufficiently low) a coefficient of friction between the abrasion resistant material of the protective cover layer 85 and the bladder 16) in addition to protecting the bladder 16 from sharp objects. The protective cover layer 85 may be secured to the bladder 16 only at the flange 20 by stitches or otherwise. In embodiments having a lasting component surrounding the bladder, the cover layer 85 may instead be secured to the lasting component. The same stitches used to secure the cover layer 85 to the bladder and/or the lasting component (in embodiments that include a lasting component) may also extend through and secure the strobel with cover layer to the upper 14. Alternatively, the cover layer 85 may first be secured to the bladder and/or the lasting component (in embodiments that include a lasting component) and then the strobel with the cover layer 85 secured thereto may be secured to the upper.

Figure 37:
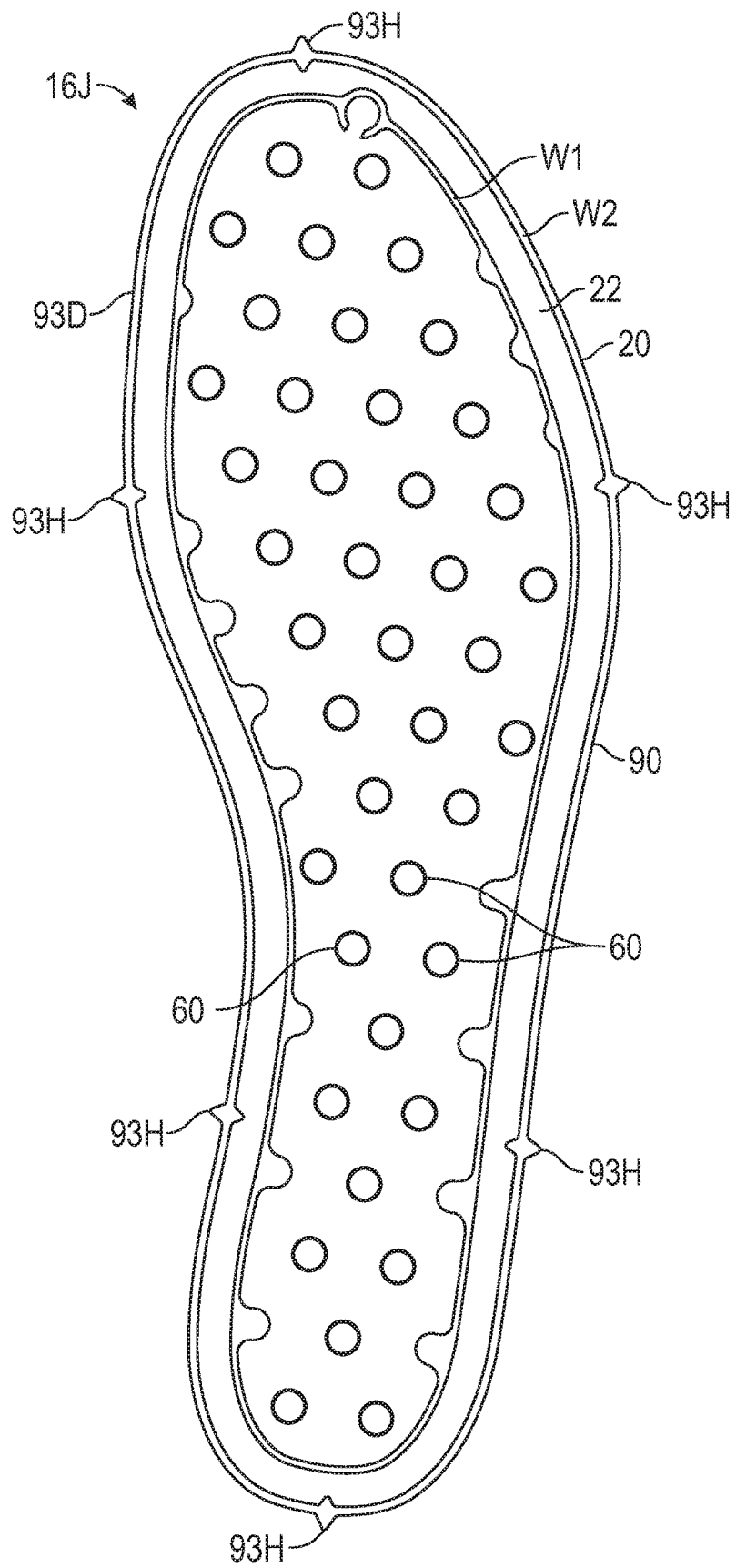
FIG. 37 is a schematic illustration in bottom view of a polymeric bladder.
Figure 44:
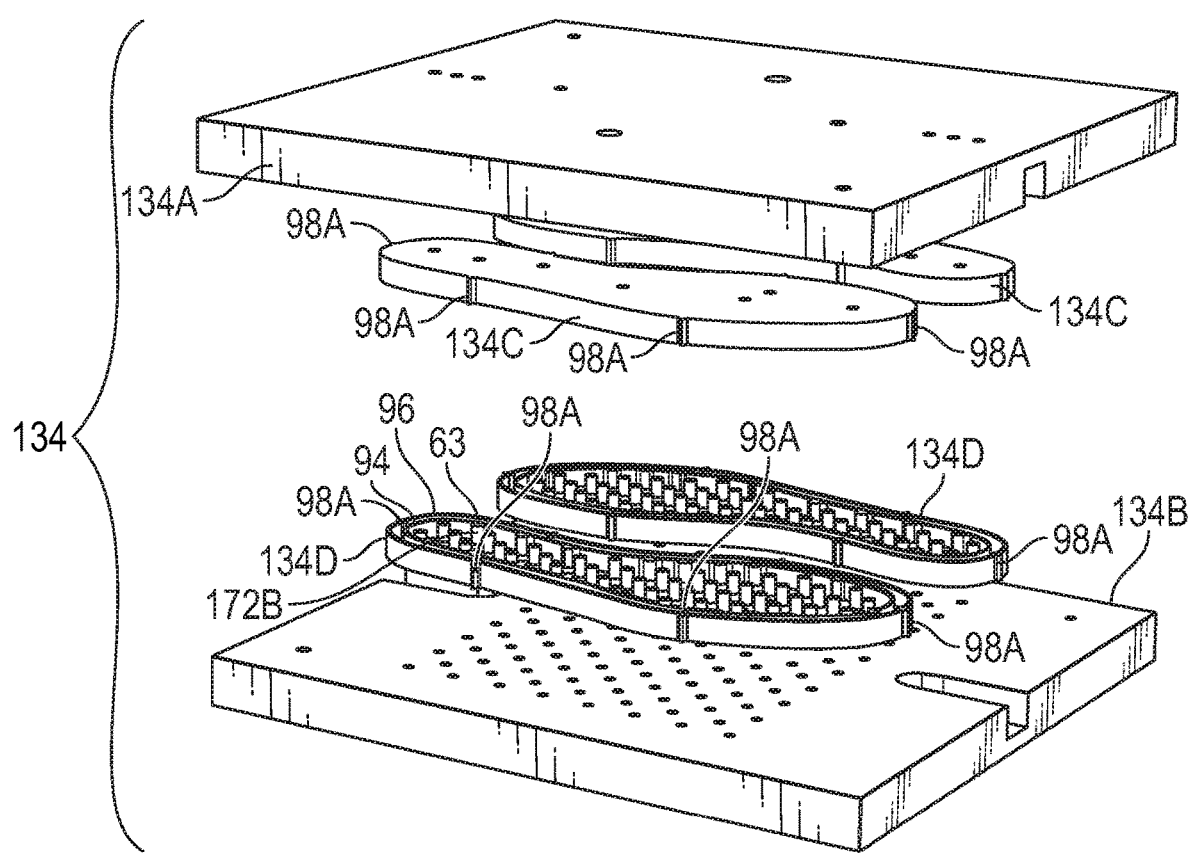
FIG. 44 is a schematic illustration in exploded view of an alternative tooling assembly.

FIG. 37 shows a bladder 16J within the scope of the disclosure that may be formed from the tooling 134 of FIG. 44 described herein, for example. The bladder 16J has circular interior welds 60 arranged as equilateral triangles as discussed with respect to FIG. 2. The bladder 16J also has locating features 93H that are protrusions at the outer peripheral edge 90 of the bladder 16J. The protrusions 93H are triangular in shape and may be aligned with similarly-spaced locating features on a lasting component, on an upper 14, or on the last 84.

Figure 45:
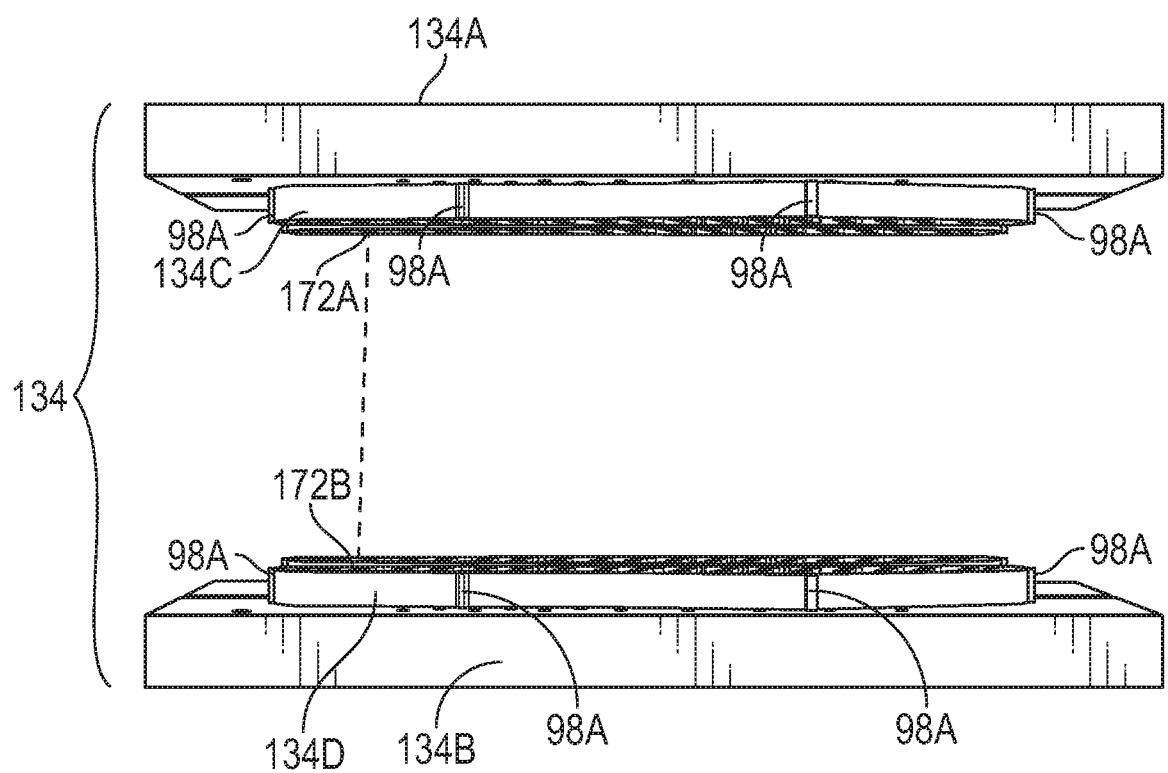
FIG. 45 is a schematic illustration in a perspective view of the tooling assembly of FIG. 44 with the tooling assembly in an open position.

FIGS. 44 and 45 show the tooling 134 for radio frequency welding of the polymeric sheets 28, 30 to form bladders 16J. An upper mold portion 134A and a lower mold portion 134B are shown. A mold insert 134C may be secured to the mold portion 134A, and a mold insert 134D may be secured to mold portion 134B. The mold inserts 134C, 134D may be mirror images of one another. FIG. 44 shows a second pair of mold inserts 134C, 134D secured to mold portions 134A and 134B in alignment with one another so that two bladders 16J may be formed simultaneously. Each mold insert 134C, 134D includes protrusions and ridges 94, 96. The protrusions 172A of mold insert 134C are identical to the protrusions 172B of mold insert 134D in geometry and arrangement. For example, they may be configured to form the circular welds 60 arranged as equilateral triangles. The protrusions 172A, 172B (only some of which are indicated with reference numbers in FIG. 45) and ridges 94, 96 of mold insert 134D are in alignment with those of mold insert 134C. In some embodiments, the mold inserts 134C, 134D may be integral with the respective mold portions 134A, 134B as one-piece components. The welding may be radio frequency welding accomplished when the mold portions 134A, 134B (and mold inserts 134C, 134D) are closed together on the polymeric sheets 28, 30 and a power source 36 supplies energy creating an alternating electric field that heats the polymeric sheets 28, 30, creating welds W1, W2 and interior welds 60 where the mold portions 134A, 134B and/or mold inserts 34C, 34D are applied to the polymeric sheets 28, 30.

As shown, each bladder 16J results from compression of first and second polymeric sheets 28, 30 disposed between the mold inserts 134C, 134D. Each mold insert 134C, 134D includes six triangular protrusions 98A at the outer periphery of the ridge 96 that result in the triangular protrusions 93H of the bladder 16J. In other embodiments, there may be fewer or more protrusions 98A of the mold insert and resulting protrusions 93H on the bladder 16J, and they may have different shapes.

Figure 38:
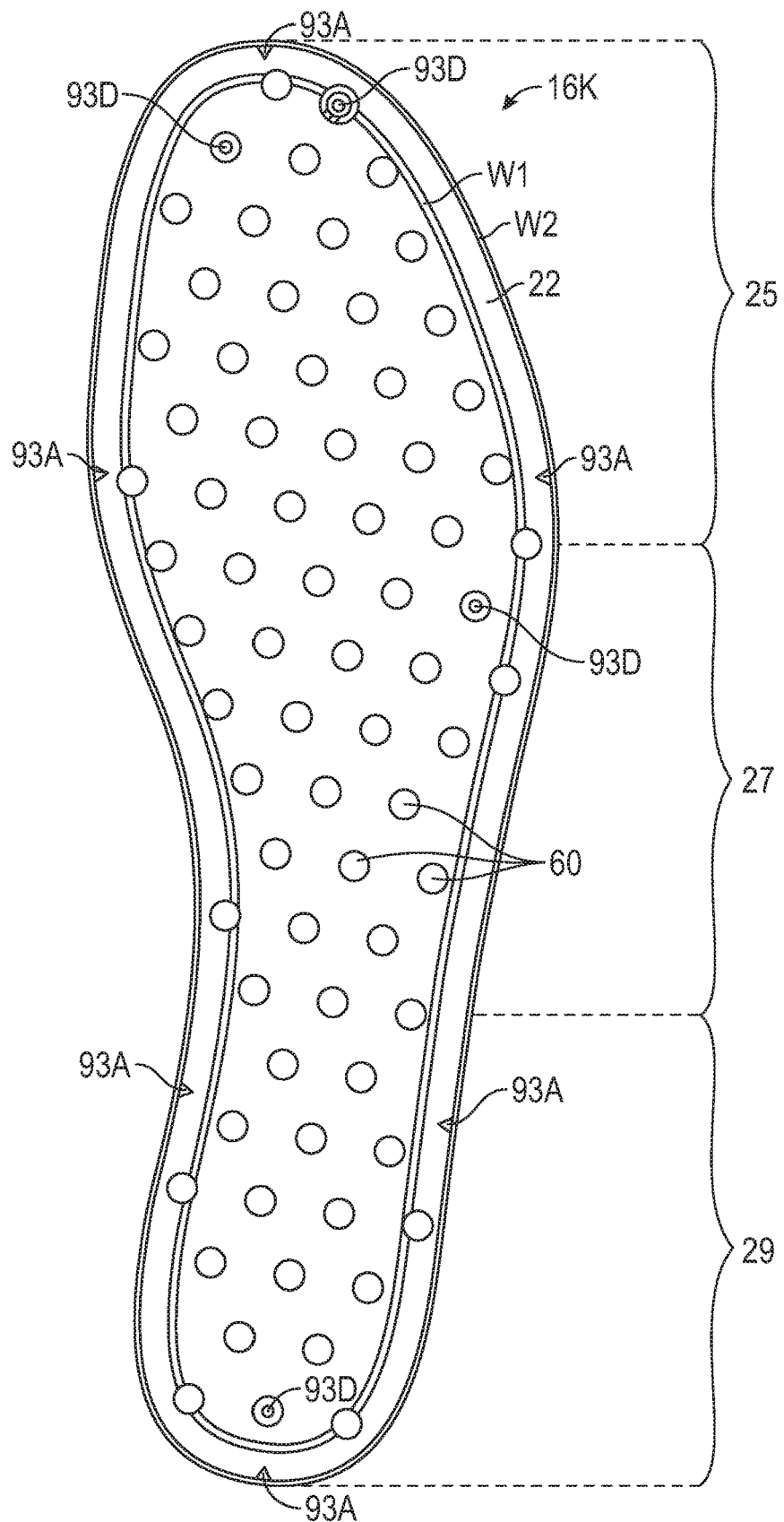
FIG. 38 is a schematic illustration in bottom view of a polymeric bladder.

FIG. 38 shows another embodiment of a bladder 16K that has all of the features described with respect to bladder 16 except has a different arrangement of the locating features that are apertures 93D (e.g., through holes) extending through one or more of the interior welds 60, and therefore through both of the polymeric sheets 28, 30. For example, two are shown in the forefoot region 25, one is in the midfoot region 27, and one is in the heel region 29. Providing location features in each of these regions may enable more accurate positioning of the bladder 16K relative to a lasting component, an upper, or a last. It should be appreciated that, in the embodiment of FIG. 38 and in many of the other embodiments shown herein, some of the interior welds are shown disposed partially on the flange 20. This may occur with certain tooling or when anti-weld material (e.g., blocker ink) is disposed to provide interior welds positioned in such a manner. When the same number of interior welds are used for different grades of footwear, some of the interior welds may fall partially onto the flange 20 for certain grades.

To further improve the efficiencies of stitching the upper 14 to the strobel 10 (or any of the other strobels discussed herein), the strobel 10 may be in an uninflated state when the stitching occurs. When in the uninflated state, the strobel 10 is more flexible, making it easier to manipulate the strobel 10 relative to the sewing machine that provides the stitches 82. After the upper 14 is secured to the strobel 10 by the series of stitches 82, the strobel 10 is inflated to a predetermined pressure, or is left at ambient pressure without inflating, and the interior cavity 18 is then sealed such as by plugging a port 97 or fill tube of the polymeric bladder 16. The port 97 is shown, for example, in FIG. 1. Although the port 97 is shown partially disposed in the flange 20, the port 97 may be disposed elsewhere on the strobel 10. Inflating and sealing occurs prior to placing the upper 14 with the strobel 10 stitched thereto on the last 84 because, in its inflated state, the strobel 10 and upper 14 are more representative of their final relative configuration and can therefore enable a more accurate placement on the last 84 when a midsole 83 of the sole structure 80 is subsequently secured to the distal surface 26 of the strobel 10 and/or the lower periphery of the upper 14 such as at a lower perimeter edge 88 (see FIG. 46) of the upper 14. In other embodiments, the polymeric bladder such as bladder 16 may be inflated and sealed prior to securing the bladder 16 to the upper 14.

To increase the speed and precision with which the strobel 10 (or any of the other strobels described herein) and the upper 14 are positioned on the last 84, the strobel 10 may be configured with a locating feature, as discussed. For example, as shown in FIG. 1, the strobel 10 has notches 93A spaced around the outer edge 90 of the peripheral flange 20. The notches 93A in the bladder 16 may be formed by the mold portions 34A, 34B or the mold inserts 34C, 34D or may otherwise be provided. As shown in FIG. 43, the mold portion 34B has continuous inner and outer ridges 94, 96 that are spaced apart from one another, and together create the welds W1 and W2 with the groove 22 between the welds W1, W2. The outer ridge 96 has notches 98 that at least partially form the notches 93A of the strobel 10. In general, the various locating features described herein may be provided, for example, by welding, cutting, punching, printing, dyeing, etc. Alternatively or in addition to the notches 93A, the strobel 10 may have locating features that are apertures 93D extending through one or more of the interior welds 60, and therefore through both of the polymeric sheets 28, 30 as shown in FIGS. 1 and 4. In other embodiments that locating features of the bladder such as bladder 16 or the locating features of the lasting component such as lasting component 17 may be protrusions, apertures, printed markings, etc. In some embodiments, a combination of notches and protrusions, or other markings may be used.

Still further, lasers could be used to align features of the strobel such as strobel 10 with the last 84. The strobel 10 could be aligned with the perimeter of the upper 14 using a separate jig. In some embodiments, the heel center (e.g., at the outer edge of the peripheral flange) could be aligned with a feature on the last. Additionally, in some embodiments, a pattern could be printed on the strobel that can then be aligned with a pattern on the last 84. For example, the distal side of the strobel 10 could have an alignment pattern printed on it, as this side will be adhered to the midsole 83 so that the printed pattern will not be visible in the finished article of footwear.

Figure 46:
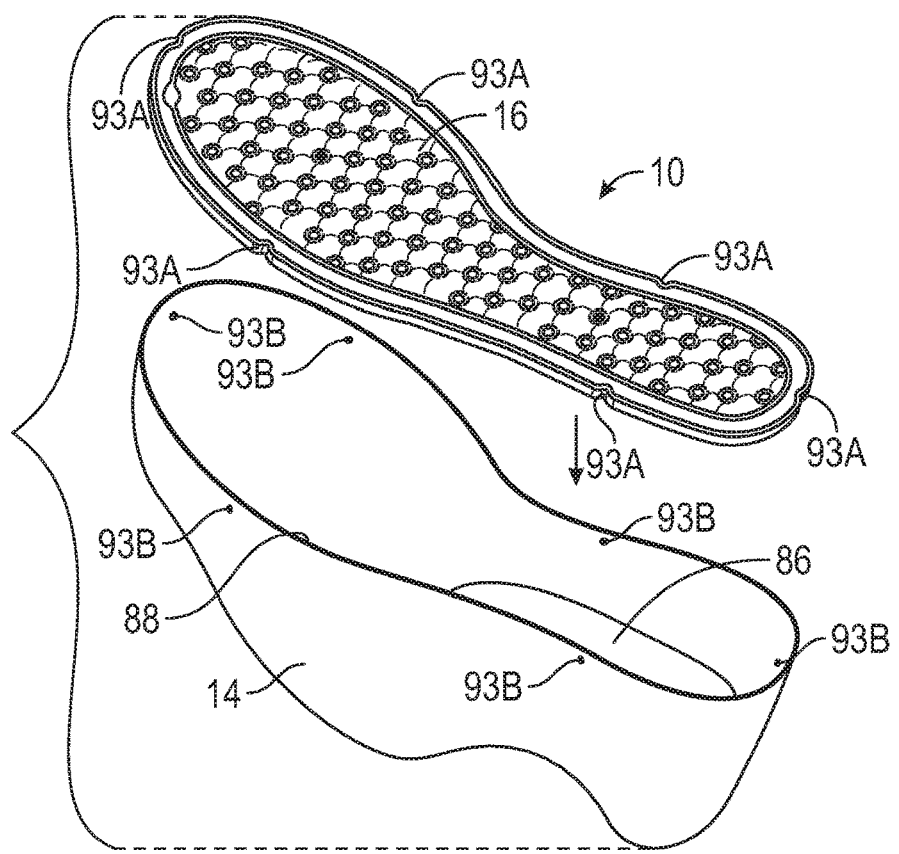
FIG. 46 is a schematic perspective illustration in exploded view of the strobel and upper of FIG. 5 before the strobel is stitched to the upper, and the strobel in an uninflated state.
Figure 47:
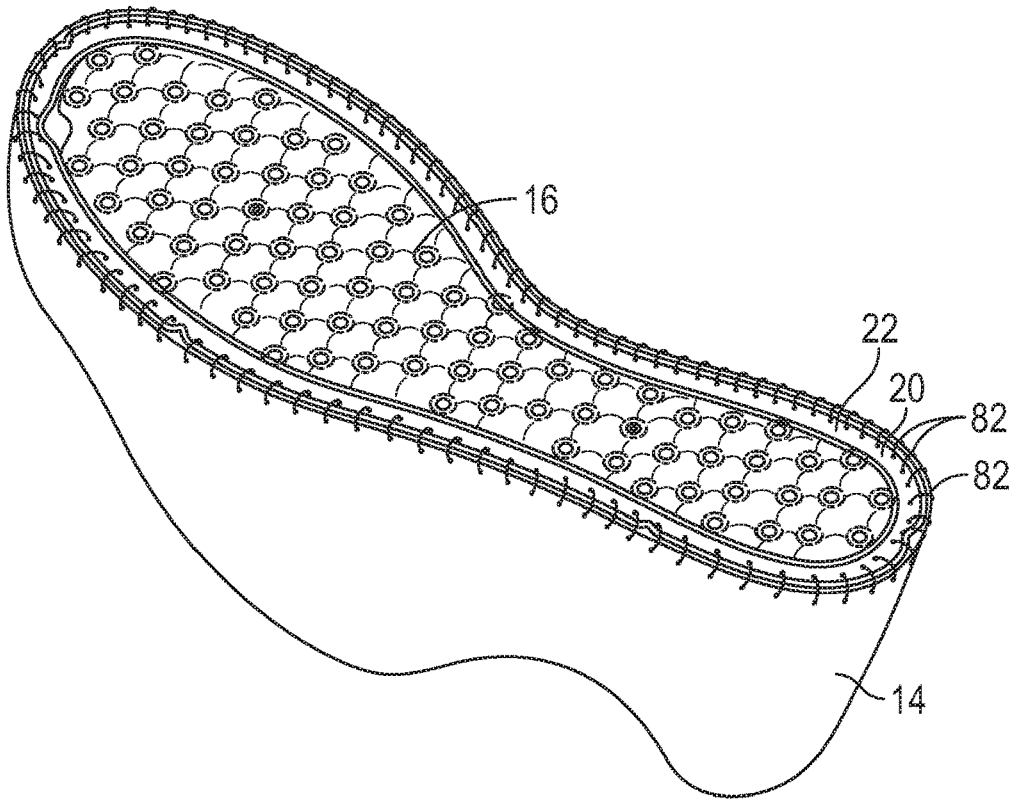
FIG. 47 is a schematic perspective illustration of the strobel and upper of FIG. 5 with the strobel stitched to the upper, and the strobel in an uninflated state.

The upper 14 may have locating features that are spaced markings, notches, protrusions, or apertures along its lower periphery near where it is stitched to the strobel 10. The locating features of the upper 14 have a relative spacing identical to that of the locating features (e.g., the notches 93A and/or apertures 93D) of the strobel 10. The locating features of the upper 14 may be aligned with those of the strobel 10 prior to stitching so that the upper 14 and strobel 10 are properly aligned with one another when stitching along the groove 22. In FIG. 46, the upper 14 is shown with locating features (e.g., markings or apertures 93B) that can be aligned with locating features (e.g., notches 93A) of the strobel 10 for this purpose.

Figure 39:
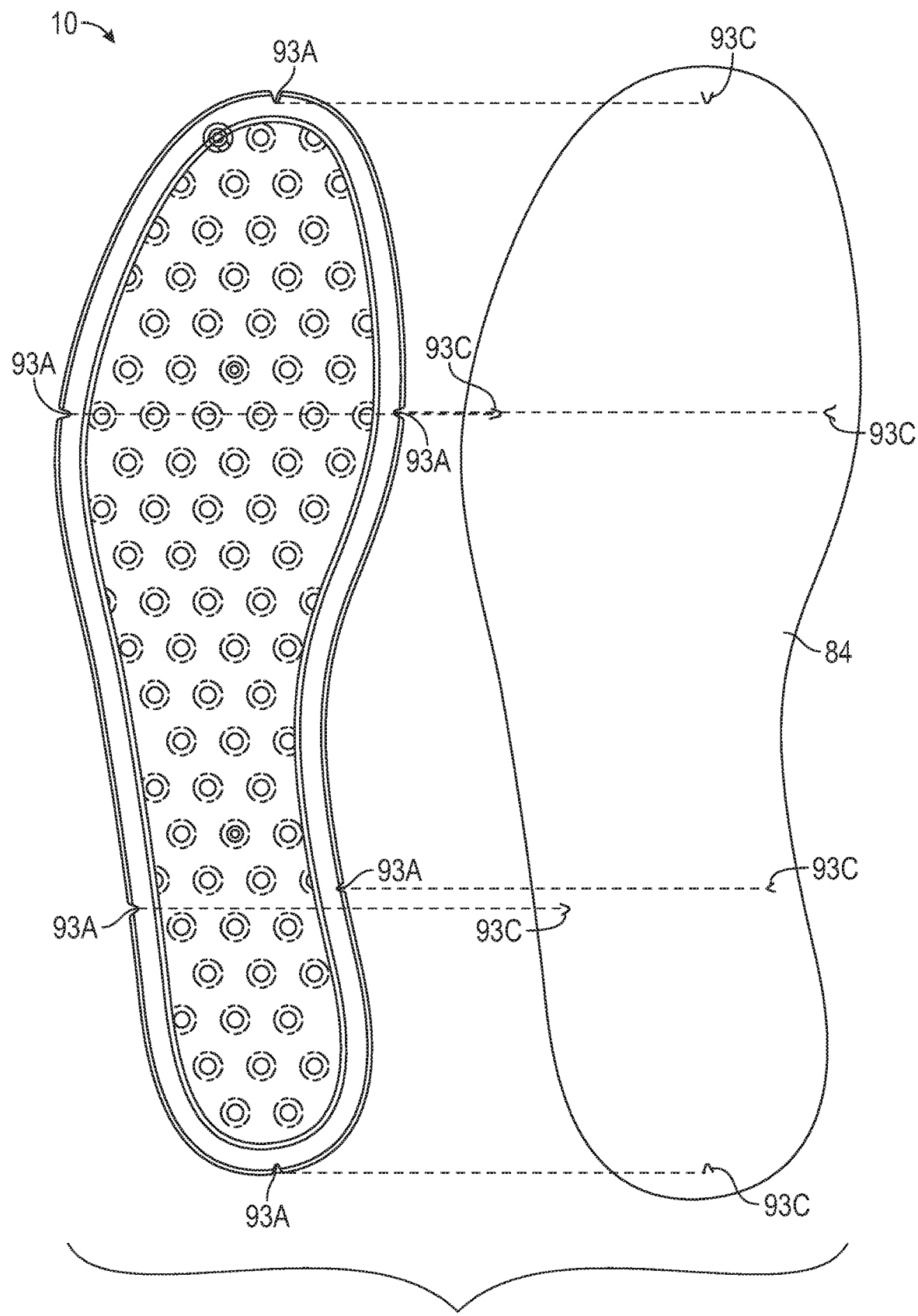
FIG. 39 is a schematic illustration in bottom view of the strobel of FIG. 1 and a last with alignable locating features.
Figure 40:
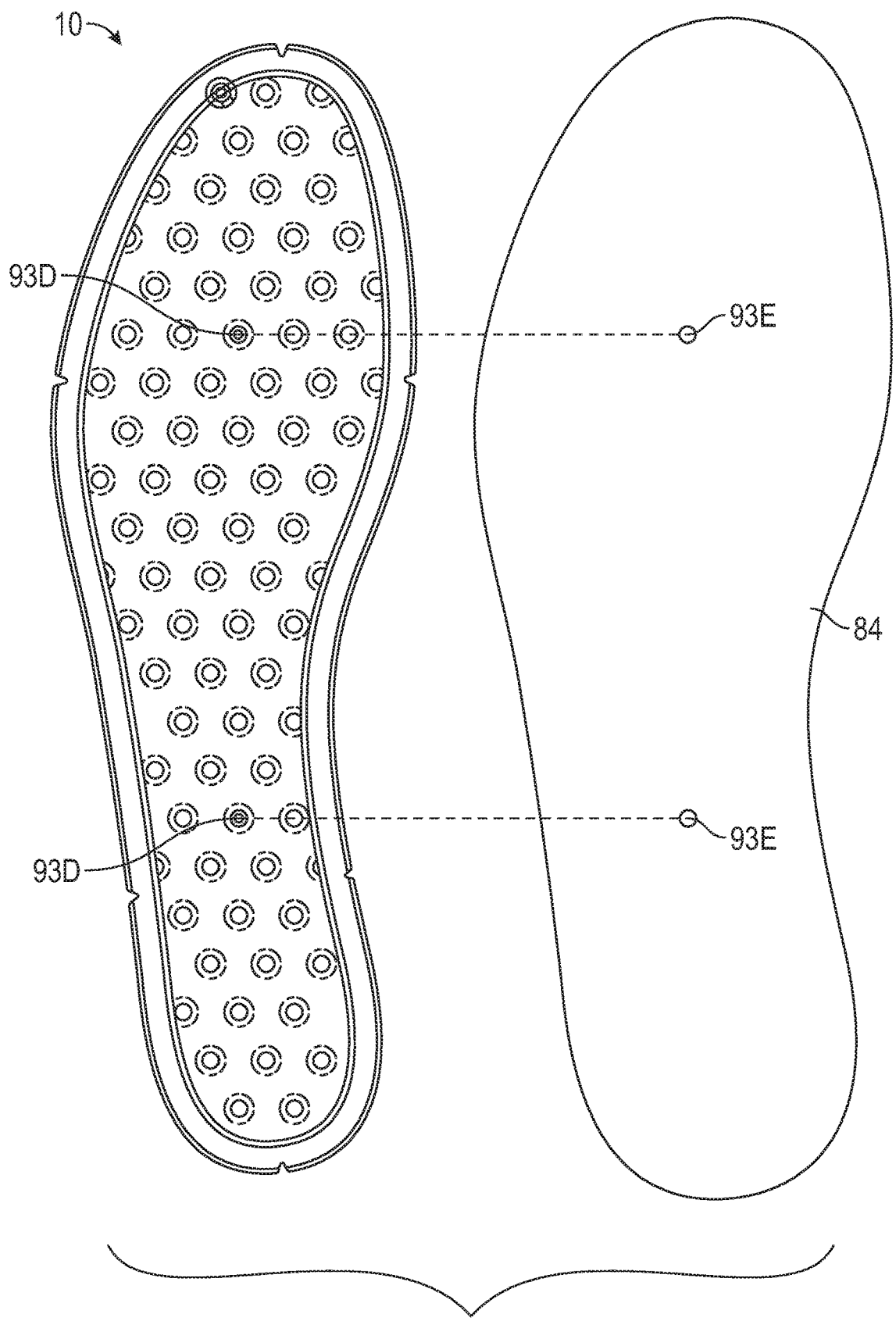
FIG. 40 is a schematic illustration in bottom view of the strobel of FIG. 1 and a last with alternative alignable locating features.
Figure 41:
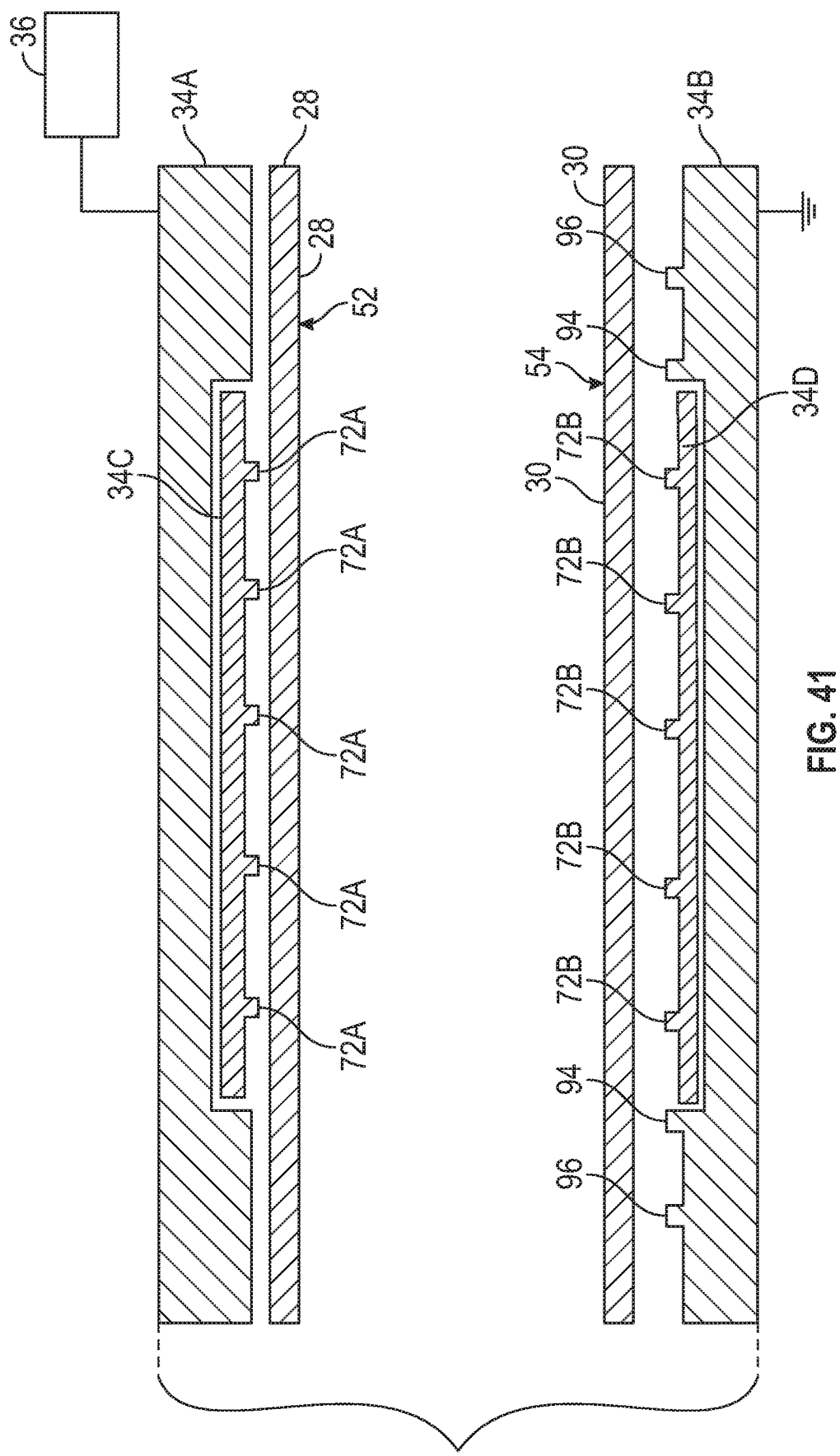
FIG. 41 is a schematic illustration in exploded view of polymeric sheets of the strobel of FIG. 1 and a tooling assembly.

Alternatively, or in addition, the last 84 can be configured with locating features that have the same relative spacing as the locating features of the strobel 10. As shown in FIGS. 39, 40 and 49, the locating features 93C or 93E may be, for example, markings on or apertures in the last 84 that align with locating features 93A or 93C of the strobel 10. In FIGS. 39 and 40, the upper 14 is not shown for clarity. In the embodiment of FIG. 39, the last 84 has locating features 93D that are markings or apertures that are spaced relative to one another at the same relative spacing as the locating features 93A. In the embodiment of FIGS. 40 and 49, the last 84 has locating features 93E that are markings or apertures that are spaced at the same relative spacing as the locating features 93D. It should be appreciated that the locating features on the strobel 10 have a slightly different relative spacing when the strobel 10 is in the uninflated state than when the strobel 10 is in the inflated state. Accordingly, the locating features on the strobel 10 may have a relative spacing in the inflated state that is identical to the relative spacing of the locating features on the last 84 if the strobel 10 is secured to the upper 14 when in the uninflated state and is placed on the last 84 when in the inflated state, as described herein.

Figure 51:
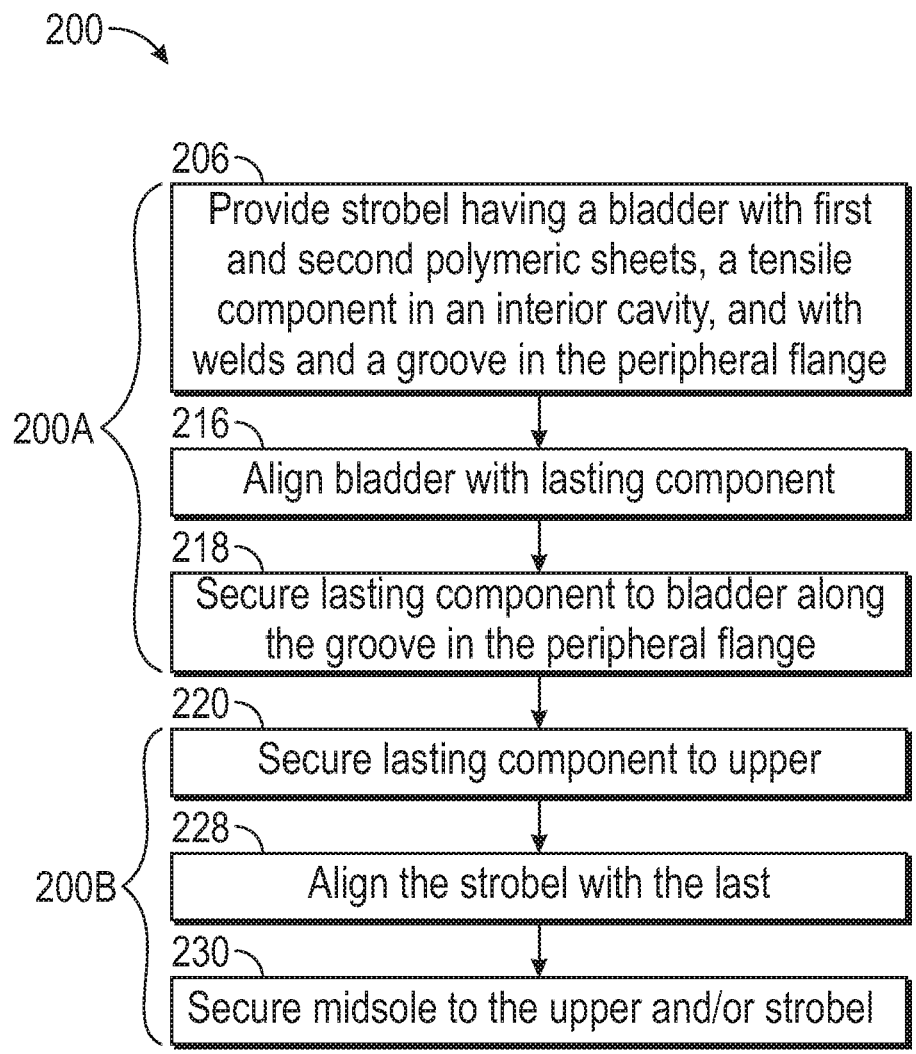
FIG. 51 is a flow diagram of a method of manufacturing footwear.

The steps of the method 200 of manufacturing footwear including any of the strobels and articles of footwear described herein are shown in the flowchart of FIG. 51. Portion 200A of the method 200 includes the step 206 of providing the strobel, such as strobel 10, etc. Providing the strobel may include forming the strobel. In other embodiments of the method 200, the strobel may be already in a formed state when provided in step 206 (e.g., the strobel may be obtained in a formed state under step 206). Accordingly, the entity providing the strobel may both form the strobel and assemble it in the footwear, or a separate entity may form the strobel and the entity carrying out the method 200 may obtain the formed strobel to carry out the method 200. The providing step 206 thus may or may not include forming the strobel.

In embodiments that include forming the strobel, step 206 may include a sub-step in which the first and second polymeric sheets 28, 30 are welded together at the first and second welds W1, W2 in the peripheral flange 20 to form the polymeric bladder 16 with the interior cavity 18, and, because the welds W1, W2 create the ridges 38, 40, the groove 22 is formed in the peripheral flange 20. As previously discussed, the welding may be radio frequency welding accomplished when the mold portions, such as mold portions 34A, 34B and mold inserts 34C (or mold portions 134A, 134B and mold inserts 13C, 134D) are closed together on the polymeric sheets 28, 30 and a power source 36 supplies energy creating an alternating electric field that heats the polymeric sheets 28, 30, creating welds where the mold inserts 34C (or 134C, 134D) are applied to the polymeric sheets 28, 30.

Separately or simultaneously with the sub-step of welding the first and second welds W1, W2, step 206 may include a sub-step of welding the interior welds 60 by the radio frequency welding via the protrusions 72A, 72B. For example, the interior welds 60 will be provided simultaneously with the welds W1, W2 if the portions of the tooling assembly having the ridges 94, 96 (e.g., the mold portions 34A, 34B or 134C, 134C) and the portions having the protrusions 72A, 72B (e.g., mold inserts 34C, 34D), or the protrusions 172A, 172B (e.g., mold inserts 134C, 134D) are applied to the sheets 28, 30 simultaneously.

The portion 200A of the method 200 may include a step in which one or more locating features are provided on the strobel 10, such as notches 93A, protrusions 93H, or markings or apertures, both represented as locating features 93D. In some embodiments, the locating features may be provided during the radio frequency welding included in step 202 of providing the strobel as described. Alternatively, the notches 93A, protrusions 93H, or the apertures 93D or markings could be cut, punched, printed, or otherwise formed in a separate subsequent step.

For some of the strobels, the portion 200A of the method 200 may include a step of cutting an aperture in the lasting component, such as apertures 19, 19A, 19B, in lasting components 17, 17A, 17B, respectively. The portion 200A of the method 200 may include a step of placing the polymeric bladder at the aperture, such as polymeric bladder 16, 16A, 16B at the aperture 19, 19A, 19B, respectively. The portion 200A of the method 200 may include step 216, aligning the polymeric bladder with the lasting component, such as by aligning one or more locating features 93A of the polymeric bladder 16, 16A, 16B, etc., with one or more locating features 93G of the lasting component 17, 17A, 17B, etc.

The portion 200A of the method 200 includes the step 218 of securing the lasting component to the bladder along the groove in the peripheral flange. For example, once the polymeric bladder and the lasting component are aligned in step 216, the portion 200A of the method 200 may proceed to step 218, and the lasting component may be secured to the polymeric bladder, such as at the peripheral flange 20 or at the edges 90D, 90F, 90G, as described with respect to the different embodiments, such as by stitching a first series of stitches 81 through the lasting component and the polymeric bladder.

The strobel 10 manufactured according to the portion 200A of the method 200 may be a first strobel corresponding to a first footwear size, such as strobel 10. The portion 200A of the method 200 may be repeated to manufacture a second strobel (e.g., strobel 110 of FIG. 32) corresponding to a second footwear size larger than the first footwear size and with interior welds 60 including the same pattern of rows and columns as on the first strobel with at least one additional column or row of interior welds 60A as described herein with respect to FIG. 32. The second strobel may be formed from the same polymeric sheets 28, 30, for example, at a different location on the polymeric sheets 28, 30 than the first footwear strobel. Alternatively, a different set of polymeric sheets including a first sheet and a second sheet like first polymeric sheet 28 and second polymeric sheet 30 may be used. Repeating the same pattern of interior welds 60 as on the smaller strobel for a first footwear size and adding interior welds 60A only to one or more of the existing rows or columns of interior welds 60 or adding an additional row of interior welds 60A and/or an additional column of interior welds 60A while maintaining the same spacing between adjacent interior welds as described with respect to FIG. 2. This may provide consistent cushioning characteristics in different footwear sizes.

The method 200 of manufacturing footwear depicted in the flow diagram of FIG. 51 may include forming the strobel 10 according to the portion 200A of the method 200 of manufacturing a strobel 10 (i.e., may include steps 206-218 and any or all of the sub-steps described with respect thereto) and then proceed to the portion 200B of the method 200 of manufacturing the article of footwear, or may include only the portion 200B of the method 200 of manufacturing the article of footwear by starting with a pre-formed strobel (i.e., beginning at step 220).

With reference to FIG. 46, locating features (e.g., notches 93A) of the strobel 10 may be aligned with locating features (e.g., apertures or markings 93B) of the upper 14. Then in step 220, the strobel 10 may be secured to the upper 14 such as by the series of stitches 82 extending through the bladder 16 at the groove 22 (and/or through a lasting component in embodiments in which the upper 14 is secured to the lasting component). Stated differently, the stitches 82 (referred to as a second series of stitches) may extend only through the bladder and the upper 14 in some embodiments, while in other embodiments, the stitches 82 may also extend through the bladder, the upper, and a lasting component, and in still other embodiments, the stitches 82 may extend only through a lasting component, as the bladder is secured to the lasting component with a separate series of stitches.

Prior to or contemporaneously with step 220, a protective cover layer 85 may be secured to the strobel 10 such as by stitching, as shown in FIG. 36. In an example embodiment, the protective cover layer 85 may overlay the strobel, and may be secured to the strobel 10 only at the flange 20, for example, with stitching at or near stitching 82. The stitching may be computer stitching or may be hand stitching.

Figure 48:
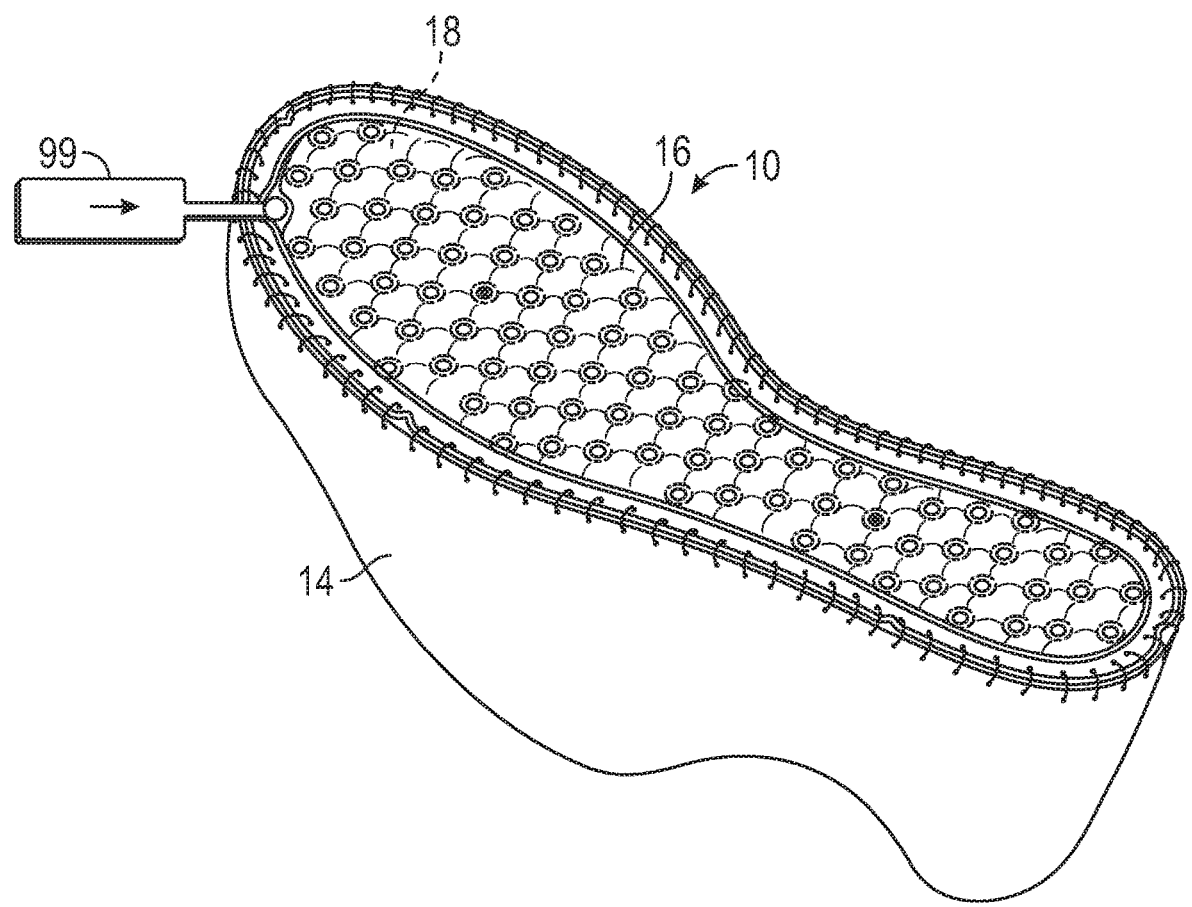
FIG. 48 is a schematic illustration of the strobel and upper of FIG. 47 during inflation of the strobel.

Next, the portion 200B of the method 200 may proceed to an inflation step in which the polymeric bladder is inflated as shown with respect to the bladder 16 in FIG. 48, such as by a source 99 of pressurized fluid, which may be nitrogen, air, or another gas. The method 200B may then proceed to a sealing step, in which the interior cavity 18 is sealed by sealing an inflation port or other opening in the polymeric bladder to retain the fluid in the interior cavity 18. Alternatively, if it is desired that the polymeric bladder 16 is at ambient pressure when the footwear is assembled, the portion 200B of method 200 may skip the inflating step. An ambient polymeric bladder 16 may even be sealed by the welding of step 206, in which case the portion 200B of the method 200 may also skip the sealing step. In other embodiments, the bladder 16 may already be inflated before the portion 200B of the method 200 begins (e.g., the bladder 16 may already be inflated and sealed when provided under step 206).

The upper 14 with the strobel 10 (or other strobel described herein) stitched thereto may then be placed on the last 84. This may be by placing the last 84 into the opening 86 of the upper 14, or moving the upper 14 over the last 84 so that the last 84 is in the opening 86, as represented by FIG. 49 in which the upper 14 and strobel 10 are moved in the direction of arrow A. In step 228, which may occur simultaneously with placing the strobel 10 on the last 84 or may be subsequent to an adjustment of the strobel 10 on the last 84, the one or more locating features (e.g., notches 93A, protrusions 93H, markings or apertures 93D) of the strobel are aligned with corresponding one or more locating features (e.g., markings or apertures 93C, 93E) of the last 84. There may be some predetermined tolerance range of the locating features on the last 84, such as by making the locating features on the last 84 larger than those on the strobel 10 (or any of the other strobels described herein), so that as long as the locating features of the strobel to some extent overlap the locating features of the last 84, the components are considered to be sufficiently accurately aligned. If the locating features of the strobel and the last 84 are not sufficiently aligned, however, the upper 14 with strobel may be removed and then placed again onto the last 84 to see if better alignment can be achieved. If not, the strobel and upper 14 are considered to be outside of the assembly tolerance range and may be recycled.

Figure 50:
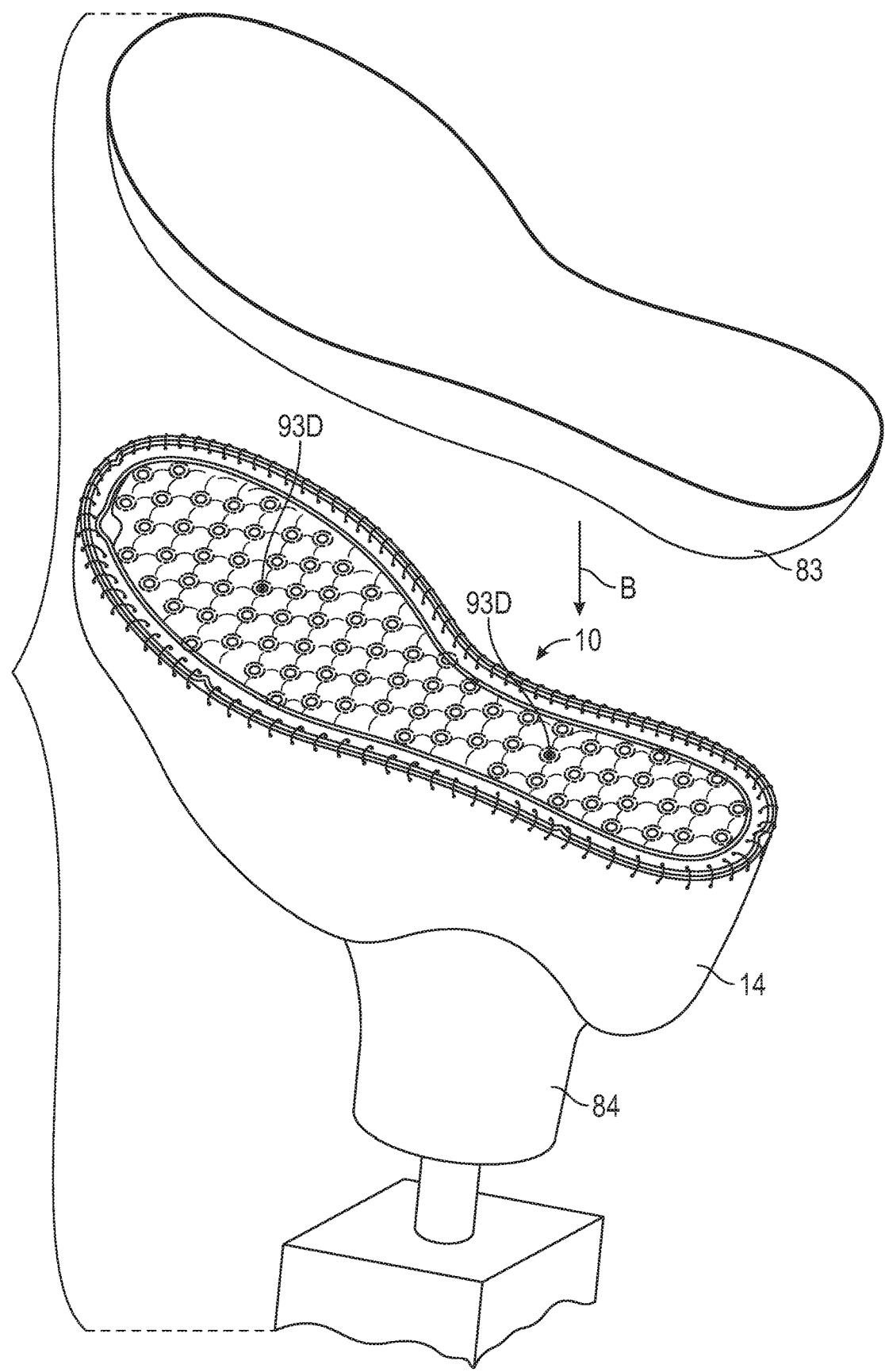
FIG. 50 is a schematic illustration of the strobel and upper of FIG. 49 on the footwear last and with the midsole of FIG. 34 being moved toward the strobel for securement to the strobel and the upper.

If step 228 is completed with the locating features of the strobel 10 and the last 84 successfully aligned, then the portion 200B of the method 200 may proceed to step 230, and the midsole 83 may be secured to the upper 14 and/or the strobel (such as strobel 10) while the upper 14 and strobel 10 are on the last 84. This is depicted in FIG. 50 by the movement of the midsole 83 in the direction of arrow B toward the strobel 10 and the upper 14. Adhesive may be applied to the midsole 83 and or to the strobel 10 and upper 14 where they interface with the midsole 83 to secure the midsole 83 to the upper 14, and/or the midsole 83 may be in a heated state that causes it to thermally bond to the strobel 10 and upper 14. In some embodiments, the assembled components may then be heated by placing them in a heater to activate the adhesive. An outsole or any other components of the sole structure 80 (not shown) may also secured to the midsole 83 or to the upper 14, and then the method 200 is complete.

The following Clauses provide example configurations of a strobel, an article of footwear, and a method of manufacturing disclosed herein.

Clause 1: An article of footwear comprising: a strobel including: a polymeric bladder defining an interior cavity and configured to retain a fluid in the interior cavity, the polymeric bladder having a peripheral flange extending around at least a portion of a perimeter of the interior cavity; and wherein the peripheral flange defines a groove extending along the peripheral flange.

Clause 2: The article of footwear of clause 1, further comprising: an upper; wherein the strobel is secured to the upper.

Clause 3: The article of footwear of clause 2, wherein the strobel is secured to the upper by a series of stitches extending through the peripheral flange in the groove.

Clause 4: The article of footwear of any of clauses 2-3, further comprising: a midsole secured to at least one of the upper or the polymeric bladder.

Clause 5: The article of footwear of any of clauses 3-4, further comprising: a lasting component disposed at the flange; wherein the series of stitches further extend through the lasting component.

Clause 6: The article of footwear of any of clauses 1-5, wherein: the polymeric bladder includes a first polymeric sheet and a second polymeric sheet; the first polymeric sheet is bonded to the second polymeric sheet at the peripheral flange; and the first polymeric sheet is joined to the second polymeric sheet at a plurality of interior welds each of which extends only partway across the interior cavity.

Clause 7: The article of footwear of clause 6, wherein: the interior welds are arranged in a pattern of rows and columns, with the rows spaced in a longitudinal direction of the strobel and the columns spaced in a transverse direction of the strobel; the interior welds of any two consecutive rows are offset from one another and the interior welds of alternate rows are aligned with one another; and the interior welds of any two consecutive columns are offset from one another and the interior welds of alternate columns are aligned with one another.

Clause 8: The article of footwear of clause 7, wherein any two adjacent interior welds in one of the rows and an interior weld in a consecutive one of the rows and in a column between the two adjacent interior welds are positioned to define corners of an equilateral triangle.

Clause 9: The article of footwear of any of clauses 6-8, wherein at least a majority of the interior welds are circular and have an equal diameter.

Clause 10: The article of footwear of any of clauses 1-9, wherein: the peripheral flange has a first weld and a second weld spaced apart from the first weld; the first weld and the second weld extend lengthwise along the peripheral flange; the groove extends lengthwise along the peripheral flange between the first weld and the second weld; the first weld is inward of the groove; and the second weld is outward of the groove.

Clause 11: The article of footwear of any of clauses 1-10, wherein the polymeric bladder has a locating feature that is at least one of a notch in an outer edge of the peripheral flange, a protrusion at the outer edge of the peripheral flange, an aperture in the polymeric bladder, or a marking on the polymeric bladder.

Clause 12: A method of manufacturing footwear comprising: securing a strobel to an upper along a groove in a peripheral flange of the strobel; wherein the strobel includes a polymeric bladder defining an interior cavity and configured to retain a fluid in the interior cavity, the peripheral flange extending around at least a portion of a perimeter of the interior cavity.

Clause 13: The method of clause 12, wherein securing the strobel to the upper is by stitching the strobel to the upper so that a series of stitches extends through the peripheral flange at the groove.

Clause 14: The method of clause 12, further comprising: forming the strobel by welding a first polymeric sheet and a second polymeric sheet to one another to define the peripheral flange having the groove, and to define a plurality of interior welds each of which extends only partway across the interior cavity.

Clause 15: The method of clause 14, wherein: the interior welds are arranged in a pattern of rows and columns, with the rows spaced in a longitudinal direction of the strobel and the columns spaced in a transverse direction of the strobel; the interior welds of any two consecutive rows are offset from one another and the interior welds of alternate rows are aligned with one another; the interior welds of any two consecutive columns are offset from one another and the interior welds of alternate columns are aligned with one another; and wherein any two adjacent interior welds in one of the rows and an interior weld in a consecutive one of the rows and in a column between the two adjacent interior welds are positioned to define corners of an equilateral triangle.

Clause 16: The method of any of clauses 14-15, wherein the strobel is a first strobel corresponding to a first footwear size, and the method further comprising: manufacturing a second strobel corresponding to a second footwear size larger than the first footwear size by welding the same or different sheets to one another to define a polymeric bladder having: an interior cavity, the polymeric bladder configured to retain a fluid in the interior cavity; and a peripheral flange extending around at least a portion of a perimeter of the interior cavity, the peripheral flange defining a groove extending along the peripheral flange; wherein welding the same or different sheets to one another includes welding interior welds in the pattern of rows and columns as on the first strobel with at least one additional row or column.

Clause 17: The method of any of clauses 12-16, further comprising: placing the upper with the strobel secured thereto on a last; wherein placing the upper with the strobel stitched thereto on the last includes aligning a locating feature on the strobel with the last; and wherein the locating feature on the strobel is at least one of a notch in an outer edge of the peripheral flange, a protrusion at the outer edge of the peripheral flange; an aperture in the polymeric bladder, or a marking on the polymeric bladder.

Clause 18: The method of clause 17, further comprising: securing a midsole to at least one of the upper or the strobel while the upper and the strobel are on the last.

Clause 19: The method of any of clauses 12-18, wherein the polymeric bladder is in an uninflated state when the strobel is secured to the upper, and the method further comprising: inflating the polymeric bladder after the strobel is secured to the upper; and sealing the interior cavity after inflating the interior cavity; wherein placing the upper with the strobel secured thereto on the last is after inflating the polymeric bladder and sealing the interior cavity.

Clause 20: The method of any of clauses 12-19, further comprising: disposing a lasting component at the flange prior to securing the strobel to the upper.

Clause 21: A strobel for an article of footwear, the strobel comprising: a polymeric bladder defining an interior cavity and configured to retain a fluid in the interior cavity, the polymeric bladder having a peripheral flange extending around at least a portion of a perimeter of the interior cavity; and wherein the peripheral flange defines a groove extending along the peripheral flange.

Clause 22: The strobel of clause 21, wherein: the polymeric bladder includes a first polymeric sheet and a second polymeric sheet; the first polymeric sheet is bonded to the second polymeric sheet at the peripheral flange; and the first polymeric sheet is joined to the second polymeric sheet at a plurality of interior welds each of which extends only partway across the interior cavity.

Clause 23: The strobel of clause 22, wherein: the interior welds are arranged in a pattern of rows and columns, with the rows spaced in a longitudinal direction of the strobel and the columns spaced in a transverse direction of the strobel; the interior welds of any two consecutive rows are offset from one another and the interior welds of alternate rows are aligned with one another; and the interior welds of any two consecutive columns are offset from one another and the interior welds of alternate columns are aligned with one another.

Clause 24: The strobel of clause 23, wherein any two adjacent interior welds in one of the rows and an interior weld in a consecutive one of the rows and in a column between the two adjacent interior welds are positioned to define corners of an equilateral triangle.

Clause 25: The strobel of any of clauses 22-24, wherein at least a majority of the interior welds are circular and have an equal diameter.

Clause 26: The strobel of any of clauses 21-25, wherein: the peripheral flange has a first weld and a second weld spaced apart from the first weld; the first weld and the second weld extend lengthwise along the peripheral flange; the groove extends lengthwise along the peripheral flange between the first weld and the second weld; the first weld is inward of the groove; and the second weld is outward of the groove.

Clause 27: The strobel of clause 26, wherein: the peripheral flange includes a first ridge protruding at an outer surface of the peripheral flange between the first weld and the groove; and the peripheral flange includes a second ridge protruding at the outer surface of the peripheral flange between the second weld and the groove.

Clause 28: The strobel of any of clauses 21-27, wherein the polymeric bladder has a locating feature that is at least one of a notch in an outer edge of the peripheral flange, an aperture in the polymeric bladder, or a marking on the polymeric bladder.

Clause 29: An article of footwear comprising: an upper; a strobel including: a polymeric bladder defining an interior cavity and configured to retain a fluid in the interior cavity, the polymeric bladder having a peripheral flange extending around at least a portion of a perimeter of the interior cavity; wherein the peripheral flange defines a groove extending along the peripheral flange; and wherein the strobel is secured to the upper by a series of stitches extending through the peripheral flange in the groove.

Clause 30: The article of footwear of clause 29, wherein: the polymeric bladder includes a first polymeric sheet and a second polymeric sheet; the first polymeric sheet is bonded to the second polymeric sheet at the peripheral flange; and the first polymeric sheet is joined to the second polymeric sheet at a plurality of interior welds each of which extends only partway across the interior cavity.

Clause 31: The article of footwear of clause 30, wherein: the interior welds are arranged in a pattern of rows and columns, with the rows spaced in a longitudinal direction of the strobel and the columns spaced in a transverse direction of the strobel; the interior welds of any two consecutive rows are offset from one another and the interior welds of alternate rows are aligned with one another; and the interior welds of any two consecutive columns are offset from one another and the interior welds of alternate columns are aligned with one another.

Clause 32: The article of footwear of clause 31, wherein any two adjacent interior welds in one of the rows and an interior weld in a consecutive one of the rows and in a column between the two adjacent interior welds are positioned to define corners of an equilateral triangle.

Clause 33: The article of footwear of any of clauses 30-32, wherein at least a majority of the interior welds are circular and have an equal diameter.

Clause 34: The article of footwear of any of clauses 29-33, wherein: the peripheral flange has a first weld and a second weld spaced apart from the first weld; the first weld and the second weld extend lengthwise along the peripheral flange; the groove extends lengthwise along the peripheral flange between the first weld and the second weld; the first weld is inward of the groove; and the second weld is outward of the groove.

Clause 35: The article of footwear of clause 34, wherein: the peripheral flange includes a first ridge protruding at an outer surface of the peripheral flange between the first weld and the groove; and the peripheral flange includes a second ridge protruding at the outer surface of the peripheral flange between the second weld and the groove.

Clause 36: The article of footwear of any of clauses 29-35, wherein the polymeric bladder has a locating feature that is at least one of a notch in an outer edge of the peripheral flange, an aperture in the polymeric bladder, or a marking on the polymeric bladder.

Clause 37: The article of footwear of any of clauses 29-36, further comprising: a midsole secured to at least one of the upper or the polymeric bladder.

Clause 38: The article of footwear of any of clauses 39-37, further comprising: a lasting component disposed at the flange; wherein the series of stitches further extends through the lasting component.

Clause 39: A method of manufacturing footwear comprising: forming a strobel by: welding a first polymeric sheet and a second polymeric sheet to one another to define a polymeric bladder having: an interior cavity, the polymeric bladder configured to retain a fluid in the interior cavity; a peripheral flange extending around at least a portion of a perimeter of the interior cavity; and wherein the welding is at the peripheral flange and the peripheral flange defines a groove extending along the peripheral flange.

Clause 40: The method of clause 39, wherein welding the first polymeric sheet and the second polymeric sheet to one another includes welding a plurality of interior welds each of which extends only partway across the interior cavity.

Clause 41: The method of clause 40, wherein: the interior welds are arranged in a pattern of rows and columns, with the rows spaced in a longitudinal direction of the strobel and the columns spaced in a transverse direction of the strobel; the interior welds of any two consecutive rows are offset from one another and the interior welds of alternate rows are aligned with one another; and the interior welds of any two consecutive columns are offset from one another and the interior welds of alternate columns are aligned with one another.

Clause 42: The method of clause 41, wherein the strobel is a first strobel corresponding to a first footwear size, and the method further comprising: manufacturing a second strobel corresponding to a second footwear size larger than the first footwear size by welding the same or different sheets to one another to define a polymeric bladder having: an interior cavity, the polymeric bladder configured to retain a fluid in the interior cavity; a peripheral flange extending around at least a portion of a perimeter of the interior cavity, the peripheral flange defining a groove extending along the peripheral flange; and wherein welding the same or different sheets to one another includes welding interior welds in the pattern of rows and columns as on the first strobel with at least one additional row or column.

Clause 43: The method of any of clauses 29-42, wherein welding the first polymeric sheet and the second polymeric sheet to one another includes welding a first weld and a second weld that are spaced apart from one another and extend lengthwise along the peripheral flange, with the groove extending lengthwise along the peripheral flange between the first weld and the second weld.

Clause 44: The method of any of clauses 29-43, further comprising: providing a locating feature on the strobel; wherein the locating feature is at least one of a notch in an outer edge of the peripheral flange, an aperture in the polymeric bladder, or a marking on the polymeric bladder.

Clause 45: A method of manufacturing footwear comprising: stitching a strobel to an upper along a groove in a peripheral flange of the strobel so that a series of stitches extends through the peripheral flange at the groove; wherein the strobel includes a polymeric bladder defining an interior cavity and configured to retain a fluid in the interior cavity, the peripheral flange extending around at least a portion of a perimeter of the interior cavity.

Clause 46: The method of clause 45, further comprising: forming the strobel by welding a first polymeric sheet and a second polymeric sheet to one another to define the peripheral flange having the groove, and to define a plurality of interior welds each of which extends only partway across the interior cavity.

Clause 47: The method of clause 46, wherein: the interior welds are arranged in a pattern of rows and columns, with the rows spaced in a longitudinal direction of the strobel and the columns spaced in a transverse direction of the strobel; the interior welds of any two consecutive rows are offset from one another and the interior welds of alternate rows are aligned with one another; and the interior welds of any two consecutive columns are offset from one another and the interior welds of alternate columns are aligned with one another.

Clause 48: The method of clause 47, wherein the strobel is a first strobel corresponding to a first footwear size, and the method further comprising: manufacturing a second strobel corresponding to a second footwear size larger than the first footwear size by welding the same or different sheets to one another to define a polymeric bladder having: an interior cavity, the polymeric bladder configured to retain a fluid in the interior cavity; a peripheral flange extending around at least a portion of a perimeter of the interior cavity, the peripheral flange defining a groove extending along the peripheral flange; wherein welding the same or different sheets to one another includes welding interior welds in the pattern of rows and columns as on the first strobel with at least one additional row or column.

Clause 49: The method of any of clauses 45-47, further comprising: placing the upper with the strobel stitched thereto on a last.

Clause 50: The method of clause 49, wherein placing the upper with the strobel stitched thereto on the last includes aligning a locating feature on the strobel with a locating feature on the last.

Clause 51: The method of clause 50, wherein the locating feature on the strobel is at least one of a notch in an outer edge of the peripheral flange, an aperture in the polymeric bladder, or a marking on the polymeric bladder.

Clause 52: The method of any of clauses 49-51, further comprising: securing a midsole to at least one of the upper or the strobel while the upper and the strobel are on the last.

Clause 53: The method of any of clauses 49-52, wherein the polymeric bladder is in an uninflated state when the strobel is stitched to the upper, and the method further comprising: inflating the polymeric bladder after the strobel is stitched to the upper; and sealing the interior cavity after inflating the interior cavity; wherein placing the upper with the strobel stitched thereto on the last is after inflating the polymeric bladder and sealing the interior cavity.

Clause 54: The method of any of clauses 45-53, further comprising: disposing a lasting component at the flange prior to stitching the strobel to the upper; wherein the series of stitches further extend through the lasting component when the strobel is stitched to the upper.

To assist and clarify the description of various embodiments, various terms are defined herein. Unless otherwise indicated, the following definitions apply throughout this specification (including the claims). Additionally, all references referred to are incorporated herein in their entirety.

An "article of footwear", a "footwear article of manufacture", and "footwear" may be considered to be both a machine and a manufacture. Assembled, ready to wear footwear articles (e.g., shoes, sandals, boots, etc.), as well as discrete components of footwear articles (such as a midsole, an outsole, an upper component, etc.) prior to final assembly into ready to wear footwear articles, are considered and alternatively referred to herein in either the singular or plural as "article(s) of footwear" or "footwear".

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The term "longitudinal" refers to a direction extending a length of a component. For example, a longitudinal direction of an article of footwear extends between a forefoot region and a heel region of the article of footwear. The term "forward" or "anterior" is used to refer to the general direction from a heel region toward a forefoot region, and the term "rearward" or "posterior" is used to refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse" refers to a direction extending a width of a component. For example, a transverse direction of an article of footwear extends between a lateral side and a medial side of the article of footwear. The transverse direction or axis may also be referred to as a lateral direction or axis or a mediolateral direction or axis.

The term "vertical" refers to a direction generally perpendicular to both the lateral and longitudinal directions. For example, in cases where a sole structure is planted flat on a ground surface, the vertical direction may extend from the ground surface upward. It will be understood that each of these directional adjectives may be applied to individual components of a sole structure. The term "upward" or "upwards" refers to the vertical direction pointing towards a top of the component, which may include an instep, a fastening region and/or a throat of an upper. The term "downward" or "downwards" refers to the vertical direction pointing opposite the upwards direction, toward the bottom of a component and may generally point towards the bottom of a sole structure of an article of footwear.

The "interior" of an article of footwear, such as a shoe, refers to portions at the space that is occupied by a wearer's foot when the article of footwear is worn. The "inner side" of a component refers to the side or surface of the component that is (or will be) oriented toward the interior of the component or article of footwear in an assembled article of footwear. The "outer side" or "exterior" of a component refers to the side or surface of the component that is (or will be) oriented away from the interior of the article of footwear in an assembled article of footwear. In some cases, other components may be between the inner side of a component and the interior in the assembled article of footwear. Similarly, other components may be between an outer side of a component and the space external to the assembled article of footwear. Further, the terms "inward" and "inwardly" refer to the direction toward the interior of the component or article of footwear, such as a shoe, and the terms "outward" and "outwardly" refer to the direction toward the exterior of the component or article of footwear, such as the shoe. In addition, the term "proximal" refers to a direction that is nearer a center of a footwear component, or is closer toward a foot when the foot is inserted in the article of footwear as it is worn by a user. Likewise, the term "distal" refers to a relative position that is further away from a center of the footwear component or is further from a foot when the foot is inserted in the article of footwear as it is worn by a user. Thus, the terms proximal and distal may be understood to provide generally opposing terms to describe relative spatial positions.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. An article of footwear comprising:
   a strobel including:
      a polymeric bladder defining an interior cavity and configured to retain a fluid in the interior cavity, the polymeric bladder having a peripheral flange extending around at least a portion of a perimeter of the interior cavity;
   wherein:
      the peripheral flange defines a groove extending along the peripheral flange;
      the peripheral flange has a first weld and a second weld spaced apart from the first weld;
      the first weld and the second weld extend lengthwise along the peripheral flange;
      the groove extends lengthwise along the peripheral flange between the first weld and the second weld;
      the first weld is inward of the groove; and
      the second weld is outward of the groove.

2. The article of footwear of claim 1, further comprising: an upper; wherein the strobel is secured to the upper.

3. The article of footwear of claim 2, wherein the strobel is secured to the upper by a series of stitches extending through the peripheral flange in the groove.

4. The article of footwear of claim 2, further comprising: a midsole secured to at least one of the upper or the polymeric bladder.

5. The article of footwear of claim 3, further comprising: a lasting component disposed at the peripheral flange; wherein the series of stitches further extend through the lasting component.

6. The article of footwear of claim 1, wherein:
the polymeric bladder includes a first polymeric sheet and a second polymeric sheet;
the first polymeric sheet is bonded to the second polymeric sheet at the peripheral flange; and
the first polymeric sheet is joined to the second polymeric sheet at a plurality of interior welds.

7. The article of footwear of claim 6, wherein:
the interior welds are arranged in a pattern of rows and columns, with the rows spaced in a longitudinal direction of the strobel and the columns spaced in a transverse direction of the strobel;
the interior welds of any two consecutive rows are offset from one another and the interior welds of alternate rows are aligned with one another; and
the interior welds of any two consecutive columns are offset from one another and the interior welds of alternate columns are aligned with one another.

8. The article of footwear of claim 7, wherein any two adjacent interior welds in one of the rows and an interior weld in a consecutive one of the rows and in a column between the two adjacent interior welds are positioned to define corners of an equilateral triangle.

9. The article of footwear of claim 6, wherein at least a majority of the interior welds are circular and have an equal diameter.

10. The article of footwear of claim 1, wherein the polymeric bladder has a locating feature that is at least one of a notch in an outer edge of the peripheral flange, a protrusion at the outer edge of the peripheral flange, an aperture in the polymeric bladder, or a marking on the polymeric bladder.

11. The article of footwear of claim 1, wherein:
the groove, the first weld, and the second weld are on a distal surface of the peripheral flange;
the peripheral flange defines an additional groove extending along a proximal surface of the peripheral flange;
the peripheral flange has an additional first weld and an additional second weld spaced apart from the additional first weld on the proximal surface of the peripheral flange;
the additional first weld and the additional second weld extend lengthwise along the peripheral flange, and the additional groove extends lengthwise along the peripheral flange between the additional first weld and the additional second weld;
the additional first weld is inward of the additional groove; and
the additional second weld is outward of the additional groove.

12. The article of footwear of claim 1, wherein:
the peripheral flange includes a first ridge protruding at an outer surface of the peripheral flange between the first weld and the groove; and
the peripheral flange includes a second ridge protruding at the outer surface of the peripheral flange between the second weld and the groove.

* * * * *